(12) United States Patent
Sedaghat et al.

(10) Patent No.: US 8,826,199 B2
(45) Date of Patent: Sep. 2, 2014

(54) SYSTEM AND METHOD FOR DEVELOPMENT OF A SYSTEM ARCHITECTURE

(75) Inventors: Reza Sedaghat, Oakville (CA); Anirban Sengupta, Scarborough (CA)

(73) Assignee: Ryerson University, Toronto, Ontario (CA)

( * ) Notice: Subject to any disclaimer, the term of this patent is extended or adjusted under 35 U.S.C. 154(b) by 561 days.

(21) Appl. No.: 13/118,139

(22) Filed: May 27, 2011

(65) Prior Publication Data

US 2012/0303560 A1     Nov. 29, 2012

(51) Int. Cl.
*G06F 17/50*  (2006.01)
(52) U.S. Cl.
USPC ........... 716/100; 716/110; 716/132; 716/136; 716/138
(58) Field of Classification Search
CPC ....... G06F 17/50; G06F 2217/08; G06F 9/50; G06N 7/02
USPC ............. 716/100, 110, 132, 136, 138; 706/13
See application file for complete search history.

(56) References Cited

U.S. PATENT DOCUMENTS

| | | | | |
|---|---|---|---|---|
| 7,657,416 | B1 * | 2/2010 | Subasic et al. | 703/13 |
| 8,397,204 | B2 * | 3/2013 | Sengupta et al. | 716/138 |

OTHER PUBLICATIONS

Sengupta et al., "Rapid design space exploration by hybrid fuzzy search approach for optimal architecture determination of multi objective computing systems", Microelectronics Reliability, vol. 51 (2011) pp. 502-512: Journal homepage: www.elsevier.corn/locate/microel.
Sengupta et al., "A high level synthesis design flow with a novel approach for efficient design space exploration in case of multi parametric optimization objective", Microelectronics Reliability, Science Direct, Elsevier, vol. 50 (3) Mar. 2010, pp. 424-437.
De Micheli G, "Synthesis and optimization of digital systems", McGraw-Hill Inc., pp. 188-189.
Sengupta et al., "A framework for fast design space exploration using fuzzy search for VLSI computing architectures", Electrical and Computer Engineering, Ryerson University, Toronto, Canada.
Haubelt et al., "Accelerating Design Space Exploration Using Pareto-Front Arithmetic's", Proceedings of Asia and South Pacific Design Automation Conference (ASP-DAC), (2003).
Matthias Gries, Methods for evaluating and covering the design space during early design development Integration, the VLSI journal, Elsevier, 38, (2004), pp. 131-183.
Gallagher et al., "A family of compact genetic algorithms for intrinsic evolvable hardware", IEEE Trans. Evol. Comput., vol. 8, No. 2, pp. 1-126, (Apr. 2004).

(Continued)

*Primary Examiner* — Sun Lin
(74) *Attorney, Agent, or Firm* — Norton Rose Fulbright Canada LLP

(57) ABSTRACT

Methods, systems, and computer readable medium for developing a system architecture that involves defining resource constraints for kinds of resources and constraint values for optimization parameters, and defining a design space as variants, where each variant is a vector. Satisfying sets of variants are determined for optimization parameters by assigning membership values to each variant of a universe of discourse set and performing a fuzzy search of a universe of discourse set using the corresponding membership values. A set of variants is determined based on an intersection of the satisfying sets of variants. An ordered list of variants is generated by sorting the set of variants and a variant is selected based on a position of the variant in the ordered list for use in developing the system architecture.

46 Claims, 20 Drawing Sheets

(56) References Cited

OTHER PUBLICATIONS

Torbey et al., "High-level synthesis of digital circuits using genetic algorithms", in Proc. Int. Conf. Evol. Comput., May 1998, pp. 224-229.
Lev Kirischian, "Multi-parametric optimization of the modular computer architecture", Int. J Technology, Policy and Management, (2006), vol. 6, No. 3, pp. 327-346.
Lev Kirischian, "Optimization of parallel task execution on the adaptive reconfigurable group organized computing system", Proc of International Conference PARALEC, (2000), Canada, pp. 150-154.
Salivahanan et al., "Digital Signal Processing", Tata McGraw-Hill Publishing Company Limited, (2006) pp. 439-444.
Schreiber et al., "PICO-NPA: high level synthesis of nonprogrammable hardware accelerators", J VLSI Signal Process 2002, 31: 127-42.
Das, "A preference ordering among various Pareto optimal alternatives", Struct Multidiscip Optim 1999; 18(1): 30-5.
Krishnan et al., "A genetic algorithm for the design space exploration of datapaths during high-level synthesis", IEEE Trans Evol Comput 2006; 10(3), June.
Knight, "Performing scheduling and storage optimization simultaneously using genetic algorithms", Proc IEEE Midwest Symp Circ Syst 1998: 284-7.
Ascia et al., "Efficient design space exploration for application specific systems-on-a-chip", J Syst Architect 2007; 53:733-50.
Pimentel et al., "A systematic approach to exploring embedded system architectures at multiple abstraction levels", IEEE Trans Comput 2006; 55(2): 99-112.
Mohanty et al., "Rapid design space exploration of heterogeneous embedded systems using symbolic search and multi-granular simulation", In: Proceedings of the joint conference on languages, compilers and tools for embedded systems: software and compilers for embedded systems; 2002, p. 18-27.
Zitzler et al., "Spea2: improving the strength Pareto evolutionary algorithm for multiobjective optimization", In: Proceedings of the conference on evolutionary methods for design, optimisation, and control; 2002. p. 19-26.
Banerjee et al., "Design space exploration of real-time multi-media MPSoCs with heterogeneous scheduling policies", In: Proceedings of the international conference on hardware/software codesign (CODES + ISSS); 2006, p. 16-21.
Mamagkakis et al., "Automated exploration of Pareto-optimal configurations in parameterized dynamic memory allocation for embedded systems", In: Proceedings of the design, automation and test in Europe conference (DATE); 2006; p. 874-5.
Gupta et al., "Processor evaluation in an embedded systems design environment", In: Proceedings of the 13th international conference on VLSI design; 2000, p. 98-103.
Coussy et al., "High-level synthesis from algorithm to digital circuit", Springer, 2008, 300 p.
Zeng et al., "A novel framework of optimizing modular computing architecture for multi objective VLSI designs" In: Proceedings of IEEE 21st international conference on microelectronics (ICM); 2009, p. 322-5.
Zadeh, "The concept of a linguistic variable and its application to approximate reasoning", Information sciences, American Elsevier Publishing Company; 1975.
ISE 9.2i Quick Start Tutorial, Xilinx ISE 9.2i, Software manuals and help, <http://www.xilinx.com/support/sw_manuals/xilinx92/download/>.
<http://www.xilinx.com/itp/xilinx92/books/manuals.pdf>.
Antola et al., "Semiconcurrent error detection in data paths", IEEE Trans Comput 2001; 50(5); 449-65.
Jain et al., "An efficient pipeline VLSI architecture for lifting-based 2d-discrete wavelet transform", In: Proceedings of the international symposium on circuits and systems (ISCAS); 2007; p. 1377-80.

\* cited by examiner

Arrangement of time of execution in decreasing order from the top to the bottom element using the proposed algorithm

SYSTEM AND METHOD FOR DEVELOPMENT OF A SYSTEM ARCHITECTURE

FIELD

The described embodiments relate to systems and methods of developing a system architecture, and in particular, relate to systems and methods of developing a system architecture based on a plurality of optimization parameters.

BACKGROUND

The design and development of systems requires extensive analysis and assessment of the design space, not only due to the assorted nature of design parameters, but also due to the diversity in architecture for implementation. Given specifications and system requirements, the aim of designers is to reduce a large and complex design space into a set of feasible design solutions meeting performance objectives and functionality.

For systems based on operational constraints the selection of an optimal architecture for system design is an important step in the development process. Design space architecture can have innumerable design options for selection and implementation based on the parameters of optimization. Selection of the optimal architecture from the design space that satisfies all the performance parameter objectives may be useful for the present generation of System-on-chip (SoC) designs and Very Large Scale Integration (VLSI) design. As it is possible to implement different functions of a system on different hardware components, the architecture design space becomes more complex to analyze. In the case of high level synthesis, performing design space exploration to choose candidate architecture by concurrently satisfying many operating constraints and performance parameters is considered an important stage in the whole design flow. Since the design space is huge and complex there exists a desire to efficiently explore candidate architectures for the system design based on the application to be executed. The method for exploration of candidate architecture should not only be less in terms of complexity factor and time but should also explore the variant in an efficient way meeting specifications provided. The process of high-level synthesis design is very complicated and descriptive and is usually performed by system architects. Depending on the application, the process of defining the problem, performing design space exploration and the other steps required for its successful accomplishment may be very time consuming. Furthermore, recent advancements in areas of communications and multimedia have led to the growth of a wide array of applications requiring huge data processing at minimal power expense. Such data hungry applications demand satisfactory performance with power efficient hardware solutions. Hardware solutions should satisfy multiple contradictory performance parameters such as power consumption and time of execution, for example. Since the selection process for the best design architecture is complex, an efficient approach to explore the design space for selecting a design option is desirable.

SUMMARY

In a first aspect, some embodiments of the invention provide a method of developing a system architecture comprising:

defining a plurality of resources constraints $maxN_{R1}, \ldots maxN_{Rn}$, for a plurality of kinds of resources $R1 \ldots Rn$, wherein each resource constraint $maxN_{Ri}$ is a maximum number, $1 \leq i \leq n$, of a kind of resources $Ri$ available to construct the system architecture, wherein n is an integer greater than 1;

defining a plurality of constraint values comprising a constraint value for each optimization parameter of at least three optimization parameters for the system architecture, wherein the at least three optimization parameters comprise a final optimization parameter;

defining a design space as a plurality of variants representing different combinations of a number of each kind of resource $R1, \ldots Rn$ available to construct the system architecture, wherein each variant is a vector of the form:

$$V_n = (N_{R1}, \ldots N_{Rn})$$

wherein $N_{Ri}$ $1 \leq i \leq n$ represents the number of the kind of resource $Ri$, wherein based on the resource constraints, $1 \leq N_{Ri} \leq maxN_{Ri}$;

determining a plurality of satisfying sets of variants by, for each of the optimization parameters except for the final optimization parameter:

generating a universe of discourse set by sorting the plurality of variants of the design space;

assigning a membership value to each variant of the universe of discourse, wherein each membership value is within the interval [0,1], wherein for each variant of the universe of discourse set, the membership value assigned to that respective variant indicates a position of the respective variant in the universe of discourse set;

determining a satisfying set of variants from the universe of discourse set by determining a border variant of the universe of discourse set, wherein each variant of the satisfying set substantially satisfies the constraint value for the optimization parameter, wherein the border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter, and wherein the border variant is determined by performing a fuzzy search of the universe of discourse set using the corresponding membership values;

determining a set of variants based on an intersection of the plurality of satisfying sets of variants for the optimization parameters except the final optimization parameter;

for the final optimization parameter:

generating an ordered list of variants by sorting the set of variants;

selecting a variant from the set of variants based on a position of the variant in the ordered list of variants; and developing the system architecture using the selected variant.

In accordance with some embodiments described herein, the developed system architecture comprises, for each kind of resource $Ri$ in the plurality of kinds of resources $R1 \ldots Rn$, the number $Ni$ of that kind of resource defined by the selected variant.

In accordance with some embodiments described herein, the membership value assigned to each variant of the universe of discourse set is determined by a membership function based on the position of the variant in the universe of discourse set, and an order of the first and last element of the universe of discourse set.

In accordance with some embodiments described herein, if the optimization parameter represents a time of execution constraint then the membership function is of the form:

$$\tau_X = \frac{x - \beta}{\alpha - \beta}$$

or else the membership function is of the form:

$$\tau_X = \frac{x - \alpha}{\beta - \alpha}$$

wherein x is the position of the variant in the universe of discourse set, $\tau_x$ is the assigned membership value of the variant that is in the xth position in the universe of discourse set, α and β are an order of the first and last element of the universe of discourse set, wherein α is 1 and β is the total number of the variants in the universe of discourse set.

In accordance with some embodiments described herein, performing a fuzzy search comprises:
    calculating an initial membership value, wherein the initial membership value is a function of a maximum value of the optimization parameter, a minimum value of the optimization parameter, and a value for the border variant based on the constraint value of the respective optimization parameter;
    determining a closest variant from the variants of the universe of discourse set, wherein the closest variant is the variant having a membership value that is closest to the initial membership value;
    calculating an optimization parameter value for the closest variant;
    calculating a new initial membership value;
    determining a new closest variant from the variants of the universe of discourse set, wherein the closest variant is the variant having a membership value that is closest to the calculated new initial membership value;
    if the new closest variant has already been checked then determining an unchecked variant having a membership value that is the next membership value and set the new closest variant to be the unchecked variant;
    calculating an optimization parameter value for the new closest variant;
    determining if the border variant is found;
    if the border variant is still not found then return back to the step of calculating a new initial membership value, else end.

In accordance with some embodiments described herein, the initial membership value is calculated based on the following function:

$$\tau_{ini} = \frac{V_{Border} - \text{Min}}{\text{Max} - \text{Min}}$$

wherein $\tau_{ini}$ is the initial membership value, $V_{Border}$ is the constraint value of the respective optimization parameter, Min and Max are the minimum and maximum values for the respective optimization parameter.

In accordance with some embodiments described herein, if the optimization parameter value for the closest variant is less than the constraint value of the respective optimization parameter then the new initial membership value is calculated using a function of the form:

$$\frac{\tau_{Max} - \tau_V}{\tau_B - \tau_V} = \frac{\text{Max} - V_{Variant}}{V_{Border} - V_{Variant}}$$

or else the new initial membership value is calculated using a function of the form:

$$\frac{\tau_{Min} - \tau_V}{\tau_B - \tau_V} = \frac{\text{Min} - V_{Variant}}{V_{Border} - V_{Variant}}$$

wherein $\tau_{Max}$ is the assigned membership value of the variant that is in the maximum position in the universe of discourse set, $\tau_{Min}$ is the assigned membership value of the variant that is the minimum position in the universe of discourse set, $\tau_V$ is the assigned membership value of the variant in the sorted universe of discourse, $\tau_B$ is the calculated new initial membership value, $V_{Border}$ is the constraint value of the respective optimization parameter, $V_{Variant}$ is the optimization parameter value and Max is the maximum value for the respective optimization parameter.

In accordance with some embodiments described herein, for each of the plurality of optimization parameters:
    defining a priority factor function for each kind of resource R1, . . . Rn, wherein a priority factor function defines a rate of change of the optimization parameter with respect to a change in a number $N_{Ri}$ of the corresponding kind of resource Ri, 1≤i≤n;
    calculate a priority factor for each kind of resource R1, . . . Rn available to construct the system architecture, using the corresponding priority factor function for the respective optimization parameter; and
    wherein the universe of discourse set is generated by sorting the variants of the design space based on a relative magnitude of the calculated priority factors.

In accordance with some embodiments described herein, the method further comprises:
    determining a priority order by sorting the calculated priority factors based on a relative magnitude of the calculated priority factors; and
    wherein the universe of discourse set is sorted based on the priority order for the respective optimization parameter.

In accordance with some embodiments described herein, the method further comprises selecting the selected variant using the priority order for the final optimization parameter.

In accordance with some embodiments described herein, the design space is sorted to construct the universe of discourse set using a tree as follows:
    for each optimization parameter, assign to the kind of resource R1, . . . Rn available to construct the system architecture with the highest priority factor a level one of the tree with all its variants as branch nodes, wherein level one refers to a root node of the tree, the kind of resource R1, . . . Rn available to construct the system architecture with the next highest priority factor a level two of the tree with all its variants as branch nodes . . . the kind of resource R1, . . . Rn available to construct the system architecture with the lowest priority factor a level n of the with all the variants as leaf nodes such that the leaf nodes are level n+1.

In accordance with some embodiments described herein, the system architecture comprises a Register Transfer Level data path circuit.

In accordance with some embodiments described herein, the system architecture comprises a Register Transfer Level control timing sequence.

In accordance with some embodiments described herein, the Register Transfer Level data path circuit is configured to generate output data as a result of performing a sequence of operations on data using Register Transfer Level modules, wherein the Register Transfer Level modules include the number of each kind of resources represented by the selected variant.

In accordance with some embodiments described herein, the Register Transfer Level modules are selected from the group consisting of registers for storage of data, memory modules, latches for sinking of data, multiplexers and demultiplexers.

In accordance with some embodiments described herein, the kinds of resources R1, . . . Rn are selected from the group consisting of adders, subtractors, clock oscillators, multipliers, divider, comparator, Arithmetic Logic Unit (ALU), integrator, summer and other functional modules.

In accordance with some embodiments described herein, the optimization parameters are selected from the group consisting of hardware area, cost, time of execution, and power consumption.

In accordance with some embodiments described herein, the Register Transfer Level control timing sequence provides a control configuration for a data path circuit to provide timing and synchronization required by data traversing through the Register Transfer Level modules of the data path circuit.

In accordance with some embodiments described herein, the final optimization parameter is a hardware area of a total number of all kinds of resources R1, . . . Rn, and wherein, for the hardware area, the priority factor function of each kind of resource R1, . . . Rn is an indicator of a change of area contributed by a change in the number of the kind of resource Ri, wherein $1 \leq i \leq n$.

In accordance with some embodiments described herein, for the hardware area, the priority factor for each kind of resource R1, . . . Rn that is not a clock oscillator is calculated from $N_{Ri}$, $\Delta N_{Ri}$, $K_{Ri}$ wherein $N_{Ri}$ is the number of the kind of resource Ri, $K_{Ri}$ is an area occupied by the kind of resource Ri, $\Delta N_{Ri} \cdot K_{Ri}$ is a change of area contributed by the kind of resource Ri, wherein Ri is a member of the kinds of resources R1, . . . Rn; and, for the hardware area, the priority factor function of resource Ri that is a clock oscillator is calculated from $\Delta A(R_{clk})$ $N_{Rclk}$, $R_{clk}$, wherein $R_{clk}$ is a clock oscillator used to construct the system architecture, $\Delta A(R_{clk})$ is a change of area occupied by clock oscillators, $N_{Rclk}$ is a number of clock oscillators.

In accordance with some embodiments described herein, for the hardware area, the priority factor for each kind of resource R1, . . . Rn that is not a clock oscillator is of $$PF(Ri) = \frac{\Delta N_{Ri} \cdot K_{Ri}}{N_{Ri}}$$

and wherein, for the hardware area, the priority factor function of resource Ri that is a clock oscillator is of the form:

$$\frac{\Delta A(R_{clk})}{N_{Rclk}}$$

In accordance with some embodiments described herein, the plurality of optimization parameters comprise a time of execution of a total number of all kinds resources R1, . . . Rn, and wherein, for the time of execution, the priority factor function for each kind of resource R1, . . . Rn is a function of the rate of change of a cycle time with a change in the number $N_{Ri}$ of the kind of resources Ri at a maximum clock period, wherein $1 \leq i \leq n$ and Ri is a member of the kinds of resources R1, . . . Rn.

In accordance with some embodiments described herein, the priority factor function for the time of execution of the resources R1, . . . Rn that is not a clock oscillator is calculated by $N_{Ri}$, $T_{Ri}$, $T_p^{max}$, wherein $N_{Ri}$ is the number of the kind of resource Ri, $T_{Ri}$ a number of clock cycles required by the kind of resource Ri to finish each operation, $T_p$ is the time period of the clock, $T_p^{max}$ is the maximum clock period; and, for the time of execution, the priority factor function of resource Ri that is a clock oscillator is calculated by $R_{clk}$, $N_{Ri}$, $T_{Ri}$, $R_{clk}$, $N_{Rclk}$, where $R_{clk}$ is a clock oscillator used to provide necessary clock frequency to the system, $N_{Ri}$ is the number of the kind of resource Ri, $N_{Rclk}$ is the number of clock oscillators, $T_{Ri}$ a number of clock cycles required by the kind of resource Ri to finish each operation.

In accordance with some embodiments described herein, the priority factor function for the time of execution of the resources R1, . . . Rn that is not a clock oscillator is of the form:

$$PF(R_i) = \frac{\Delta N_{Ri} T_{Ri}}{N_{Ri}} (T_p^{max})$$

and wherein, for the time of execution, the priority factor function of resource Ri that is a clock oscillator is of the form:

$$PF(R_{clk}) = \frac{N_{R1} \cdot T_{R1} + N_{R2} \cdot T_{R2} \ldots + N_{Rn} \cdot T_{Rn}}{N_{Rclk}} (\Delta T_p)$$

In accordance with some embodiments described herein, the plurality of optimization parameters comprise a time of execution of a total number of all kinds resources R1, . . . Rn, and wherein, for the time of execution, the priority factor function for each kind of resource R1, . . . Rn is a function of a difference between the time of execution when resource Ri, wherein i is of the interval [1,n], is at its minimum value when all other resources are at their maximum value and the time of execution when resource Ri is at its maximum value when all other resources are at their minimum values.

In accordance with some embodiments described herein, the priority factor function for the time of execution of the resources R1, . . . Rn that is not a clock oscillator is calculated by $N_{Ri}$, $T_{Rn}^{Max}$, $T_{Rn}^{Min}$ wherein $N_{Ri}$ is the number of the kind of resource Ri, $T_{Rn}^{Max}$ and $T_{Rn}^{Min}$ are the maximum and minimum value of the execution time when resource Rn is maximum and minimum, respectively, at maximum clock frequency all other resources being maximum, wherein, for the time of execution, the priority factor function of resource Ri that is a clock oscillator is calculated by $N_{Rclk}$, $T_{Rclk}^{Max}$, $T_{Rclk}^{Min}$ where $N_{Rclk}$ is the number of clock oscillators $T_{Rclk}{}^{Max}$ and $T_{Rclk}{}^{Min}$ are maximum and minimum values of execution time when the clock period is maximum and minimum respectively, and all available resources have a maximum value.

In accordance with some embodiments described herein, the priority factor function for the time of execution of the resources R1, . . . Rn that is not a clock oscillator is of the form:

$$PF(Rn) = \frac{T_{Rn}^{Max} - T_{Rn}^{Min}}{N_{Rn}}$$

and wherein, for the time of execution, the priority factor function of resource Ri that is a clock oscillator is of the form:

$$PF(Rclk) = \frac{T_{Rclk}^{Max} - T_{Rclk}^{Min}}{N_{Rclk}}$$

In accordance with some embodiments described herein, the plurality of optimization parameters comprise a power consumption of the resources R1, . . . Rn, and wherein, for the power consumption, the priority factor function for each kind of resource R1, . . . Rn is a function of a change in power consumption per unit area due to deviation of clock frequency from maximum to minimum and a change in the number $N_{Ri}$ of the kind of resource Ri at maximum clock frequency, wherein $1 \leq i \leq n$, and Ri is a member of the kinds of resources R1, . . . Rn.

In accordance with some embodiments described herein, the priority factor function for the power consumption of the resources R1, . . . Rn that is not a clock oscillator is calculated by $N_{Ri}$, $K_{Rn}$, $\Delta N_{Ri}$, $(p_c)^{max}$, $p_c$ wherein $N_{Ri}$ is the number of resource Ri, $K_{Rn}$ is an area occupied by resource Ri, $\Delta N_{Rn} \cdot K_{Rn}$ is a change of area contributed by resource Ri, $p_c$ is power consumed per area unit resource at a particular frequency of operation, $(p_c)^{max}$ is power consumed per area unit resource at a maximum clock frequency; and for the power consumption, the priority factor function of resource Ri that is a clock oscillator is calculated by $N_{Ri}$, $T_{Ri}$, $R_{clk}$, $N_{Rclk}$, $p_c$ where $R_{clk}$ is a clock oscillator used to provide necessary clock frequency to the system, $N_{Ri}$ is the number of the kind of resource Ri, $T_{Rn}$ a number of clock cycles required by resource Ri to finish each operation, $p_c$ is power consumed per area unit of resource at a particular frequency of operation.

In accordance with some embodiments described herein, the priority factor function for the power consumption of the resources R1, . . . Rn that is not a clock oscillator is of the form:

$$PF(Ri) = \frac{\Delta N_{Ri} \cdot K_{Ri}}{N_{Ri}} (p_c)^{max}$$

and wherein, for the power consumption, the priority factor function of resource Ri that is a clock oscillator is of the form:

$$PF(Rclk) = \frac{N_{R1} \cdot T_{R1} + N_{R2} \cdot T_{R2} \ldots + N_{Rn} \cdot T_{Rn}}{N_{Rclk}} (\Delta p_c)$$

In accordance with some embodiments described herein, the plurality of optimization parameters comprise a total cost of the total number of all kinds resources R1, . . . Rn, and wherein, for the total cost, the priority factor function for each kind of resource R1, . . . Rn is an indicator of change in total cost of the total number of all kinds resources R1, . . . Rn with respect to a change in the number of the kind of resource Ri and the cost per unit resource, wherein $1 \leq i \leq n$.

In accordance with some embodiments described herein, for the cost, the priority factor function for each kind of the resources R1, . . . Rn that is not a clock oscillator is calculated by $N_{Ri}$, $K_{Ri}$, $\Delta N_{Ri}$, $C_{Ri}$, wherein $N_{Ri}$ is the number of the kind of resource Ri, $K_{Ri}$ is an area occupied by the kind of resource Ri, $\Delta N_{Ri} \cdot K_{Ri}$ is a change of area contributed by the kind of resource Ri, $C_{Ri}$ is the cost per area unit of the kind of resource Ri; and wherein, for the cost, the priority factor function of resource Ri that is a clock oscillator is calculated by $R_{clk}$, $N_{Rclk}$, $\Delta A(R_{clk})$, $C_{Rclk}$, wherein $R_{clk}$ is a clock oscillator used to provide necessary clock frequency to the system, $\Delta A(R_{clk})$ is a change of area occupied by clock oscillators, $N_{Rclk}$ is a total number of clock oscillators available to construct the system architecture, $C_{Rclk}$ is the cost per area unit of clock oscillators.

In accordance with some embodiments described herein, for the cost, the priority factor function for each kind of the resources R1, . . . Rn that is not a clock oscillator is of the form:

$$PF(Ri) = \frac{\Delta N_{Ri} \cdot K_{Ri} \cdot C_{Ri}}{N_{Ri}}$$

and wherein, for the cost, the priority factor function of resource Ri that is a clock oscillator is of the form:

$$PF(R_{clk}) = \frac{A(R_{clk}) \cdot C_{Rclk}}{N_{Rclk}}$$

In accordance with some embodiments described herein, the method further comprises, for each optimization parameter, determining the satisfying set of variants from the universe of discourse set using the border variant.

In accordance with some embodiments described herein, the method further comprises, for each of the plurality of optimization parameters, determining whether the constraint value for the optimization parameter is valid by:
    determining a minimum value for the optimization parameter;
    determining a maximum value for the optimization parameter;
    determining whether the constraint value is greater than or equal to the minimum value for the optimization parameter and whether the constraint value is less than or equal to the maximum value for the optimization parameter;
    if the constraint value is greater than or equal to the minimum value for the optimization parameter and the constraint value is less than equal than or equal to the maximum value for the optimization parameter, determining that the constraint value is valid; and
    otherwise, determining that the constraint value is invalid and prompting for correction.

In accordance with some embodiments described herein, the method further comprises determining whether the set of variants is valid by determining whether the set of variants is null; and upon determining that the set of variants is not valid, relaxing the constraint values for each optimization parameter by predetermined percentage.

In accordance with some embodiments described herein, the method further comprises representing the combination of the number of resources R1, ... Rn of the selected variant in a temporal and a spatial domain using a sequencing and binding graph and a plurality of registers.

In accordance with some embodiments described herein, the method further comprises determining a multiplexing scheme for the resources R1, ... Rn of the selected variant, with inputs, outputs, operations, interconnections and time steps.

In accordance with some embodiments described herein, the method further comprises producing a Register Transfer Level data path circuit using the multiplexing scheme.

In accordance with some embodiments described herein, the method further comprises producing an integrated circuit using the system architecture.

In accordance with some embodiments described herein, the set of variants based on the intersection of the satisfying sets of variants is a pareto set of variants.

In another aspect, embodiments described herein provide a non-transitory computer-readable storage medium comprising instructions for execution on a computing device, wherein the instructions, when executed, perform acts of a method of developing a system architecture, wherein the method comprises:

defining a plurality of resources constraints $maxN_{R1}$, ... $maxN_{Rn}$, for a plurality of kinds of resources R1 ... Rn, wherein each resource constraint $maxN_{Ri}$ is a maximum number, $1 \le i \le n$, of a kind of resources Ri available to construct the system architecture, wherein n is an integer greater than 1;

defining a plurality of constraint values comprising a constraint value for each optimization parameter of at least three optimization parameters for the system architecture, wherein the at least three optimization parameters comprise a final optimization parameter;

defining a design space as a plurality of variants representing different combinations of a number of each kind of resource R1, ... Rn available to construct the system architecture, wherein each variant is a vector of the form:

$$V_n = (N_{R1}, \ldots N_{Rn})$$

wherein $N_{Ri}$ $1 \le i \le n$ represents the number of the kind of resource Ri, wherein based on the resource constraints, $1 \le N_{Ri} \le maxN_{Ri}$;

determining a plurality of satisfying sets of variants by, for each of the optimization parameters except for the final optimization parameter:

generating a universe of discourse set by sorting the plurality of variants of the design space;

assigning a membership value to each variant of the universe of discourse, wherein each membership value is within the interval [0,1], wherein for each variant of the universe of discourse set, the membership value assigned to that respective variant indicates a position of the respective variant in the universe of discourse set;

determining a satisfying set of variants from the universe of discourse set by determining a border variant of the universe of discourse set, wherein each variant of the satisfying set substantially satisfies the constraint value for the optimization parameter, wherein the border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter, and wherein the border variant is determined by performing a fuzzy search of the universe of discourse set using the corresponding membership values;

determining a set of variants based on an intersection of the plurality of satisfying sets of variants for the optimization parameters except the final optimization parameter;

for the final optimization parameter:

generating an ordered list of variants by sorting the set of variants;

selecting a variant from the set of variants based on a position of the variant in the ordered list of variants; and developing the system architecture using the selected variant.

In a further aspect, embodiments described herein provide a system of developing a system architecture comprising:

a resource constraint module defining a plurality of resources constraints $maxN_{R1}$, ... $maxN_{Rn}$, for a plurality of kinds of resources R1 ... Rn, wherein each resource constraint $maxN_{Ri}$ is a maximum number, $1 \le i \le n$, of a kind of resources Ri available to construct the system architecture, wherein n is an integer greater than 1;

an optimization parameter constraint module for defining a plurality of constraint values comprising a constraint value for each optimization parameter of at least three optimization parameters for the system architecture, wherein the at least three optimization parameters comprise a final optimization parameter;

a design space module for defining a design space as a plurality of variants representing different combinations of a number of each kind of resource R1, ... Rn available to construct the system architecture, wherein each variant is a vector of the form:

$$V_n = (N_{R1}, \ldots N_{Rn})$$

wherein $N_{Ri}$ $1 \le i \le n$ represents the number of the kind of resource Ri, wherein based on the resource constraints, $1 \le N_{Ri} \le maxN_{Ri}$;

a satisfying set module for determining a plurality of satisfying sets of variants by, for each of the optimization parameters except for the final optimization parameter:

generating a universe of discourse set by sorting the plurality of variants of the design space;

assigning a membership value to each variant of the universe of discourse, wherein each membership value is within the interval [0,1], wherein for each variant of the universe of discourse set, the membership value assigned to that respective variant indicates a position of the respective variant in the universe of discourse set;

determining a satisfying set of variants from the universe of discourse set by determining a border variant of the universe of discourse set, wherein each variant of the satisfying set substantially satisfies the constraint value for the optimization parameter, wherein the border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter, and wherein the satisfying set module interacts with a fuzzy search module for determining the border variant by performing a fuzzy search of the universe of discourse set using the corresponding membership values;

an intersection module for determining a set of variants based on an intersection of the plurality of satisfying sets of variants for the optimization parameters except the final optimization parameter;

a selection module for selecting a variant for use in developing the system architecture by, for the final optimization parameter:
generating an ordered list of variants by sorting the set of variants;
selecting a variant from the set of variants based on the ordered list of variants; and a system architecture module for developing the system architecture using the selected variant.

In another aspect, embodiments described herein provide a method of determining a variant representing a combination of a number of each kind of resource R1, . . . Rn available for constructing a system architecture comprising:

defining a plurality of resources constraints $maxN_{R1}$, . . . $maxN_{Rn}$, for a plurality of kinds of resources R1 . . . Rn, wherein each resource constraint $maxN_{Ri}$ is a maximum number, 1≤i≤n, of a kind of resources Ri available to construct the system architecture, wherein n is an integer greater than 1;

defining a plurality of constraint values comprising a constraint value for each optimization parameter of at least three optimization parameters for the system architecture, wherein the at least three optimization parameters comprise a final optimization parameter;

defining a design space as a plurality of variants representing different combinations of a number of each kind of resource R1, . . . Rn available to construct the system architecture, wherein each variant is a vector of the form:

$$V_n = (N_{R1}, \ldots N_{Rn})$$

wherein $N_{Ri}$ 1≤i≤n represents the number of the kind of resource Ri, wherein based on the resource constraints, $1 \leq N_{Ri} \leq maxN_{Ri}$;

determining a plurality of satisfying sets of variants by, for each of the optimization parameters except for the final optimization parameter:
generating a universe of discourse set by sorting the plurality of variants of the design space;
assigning a membership value to each variant of the universe of discourse, wherein each membership value is within the interval [0,1], wherein for each variant of the universe of discourse set, the membership value assigned to that respective variant indicates a position of the respective variant in the universe of discourse set;
determining a satisfying set of variants from the universe of discourse set by determining a border variant of the universe of discourse set, wherein each variant of the satisfying set substantially satisfies the constraint value for the optimization parameter, wherein the border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter, and wherein the border variant is determined by performing a fuzzy search of the universe of discourse set using the corresponding membership values;

determining a set of variants based on an intersection of the plurality of satisfying sets of variants for the optimization parameters except the final optimization parameter;

for the final optimization parameter:
generating an ordered list of variants by sorting the set of variants; and
selecting a variant from the set of variants based on a position of the variant in the ordered list of variants.

In a further aspect, embodiments described herein provide a method of developing a system architecture comprising:

defining a plurality of resources constraints $maxN_{R1}$, . . . $maxN_{Rn}$, for a plurality of kinds of resources R1 . . . Rn, wherein each resource constraint $maxN_{Ri}$ is a maximum number, 1≤i≤n, of a kind of resources Ri available to construct the system architecture, wherein n is an integer greater than 1;

defining a plurality of constraint values comprising a constraint value for each optimization parameter of at least three optimization parameters for the system architecture, wherein the at least three optimization parameters comprise a final optimization parameter;

defining a design space as a plurality of variants representing different combinations of a number of each kind of resource R1, . . . Rn available to construct the system architecture, wherein each variant is a vector of the form:

$$V_n = (N_{R1}, \ldots N_{Rn})$$

wherein $N_{Ri}$ 1≤i≤n represents the number of the kind of resource Ri, wherein based on the resource constraints, $1 \leq N_{Ri} \leq maxN_{Ri}$;

determining a plurality of satisfying sets of variants by, for each of the optimization parameters except for the final optimization parameter:
generating a universe of discourse set by sorting the plurality of variants of the design space;
determining a satisfying set of variants from the universe of discourse set by determining a border variant of the universe of discourse set, wherein each variant of the satisfying set substantially satisfies the constraint value for the optimization parameter, wherein the border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter;

determining a set of variants based on an intersection of the plurality of satisfying sets of variants for the optimization parameters except the final optimization parameter;

for the final optimization parameter:
generating an ordered list of variants by sorting the set of variants;
selecting a variant from the set of variants based on a position of the variant in the ordered list of variants; and developing the system architecture using the selected variant.

wherein the design space is sorted to construct the universe of discourse set using a tree having n+1 levels of nodes as follows:

for each optimization parameter, assigning to each kind of resource R1, . . . Rn available to construct the system architecture a level 1 to n of the tree based on the relative magnitude of its priority factor, wherein level 1 is a root node in the tree;

a level one of the tree with all its variants as branches, wherein level one refers to a root node of the tree, the kind of resource R1, . . . Rn available to construct the system architecture with the next highest priority factor a level two of nodes of the tree with all its variants as branches the kind of resource R1, . . . Rn available to construct the system architecture with the lowest priority factor a level n of nodes of the tree with all the variants as branches; and generating a tree structure by representing the kind of resource Ri assigned level i 1≤i≤n as one or more nodes in the tree based on the number of branches from the one or more nodes of the level i−1 except for level one which is a root node, wherein each node in level i has a number of branches $maxN_{Ri}$ and representing all variants of the design space as leaf nodes at a level n+1 of the tree, each leaf node connected by a branch to a node of the level n of the tree, wherein each variant corresponds to a path from the root node at level one of the tree to the leaf node representing that variant at level n+1 of the tree.

In another aspect, embodiments described herein provide a method of developing a system architecture comprising:

defining a plurality of resources constraints $maxN_{R1}$, . . . $maxN_{Rn}$, for a plurality of kinds of resources R1 . . . Rn, wherein each resource constraint $maxN_{Ri}$ is a maximum number, 1≤i≤n, of a kind of resources Ri available to construct the system architecture, wherein n is an integer greater than 1;

defining a plurality of constraint values comprising a constraint value for each optimization parameter of at least three optimization parameters for the system architecture, wherein the at least three optimization parameters comprise a final optimization parameter;

defining a design space as a plurality of variants representing different combinations of a number of each kind of resource R1, . . . Rn available to construct the system architecture, wherein each variant is a vector of the form:

$$V_n = (N_{R1}, \ldots N_{Rn})$$

wherein $N_{Ri}$, 1≤i≤n represents the number of the kind of resource Ri, wherein based on the resource constraints, $1 \le N_{Ri} \le maxN_{Ri}$;

determining a plurality of satisfying sets of variants by, for each of the optimization parameters:

generating a universe of discourse set by sorting the plurality of variants of the design space;

assigning a membership value to each variant of the universe of discourse, wherein each membership value is within the interval [0,1], wherein for each variant of the universe of discourse set, the membership value assigned to that respective variant indicates a position of the respective variant in the universe of discourse set;

determining a satisfying set of variants from the universe of discourse set by determining a border variant of the universe of discourse set, wherein each variant of the satisfying set substantially satisfies the constraint value for the optimization parameter, wherein the border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter, and wherein the border variant is determined by performing a fuzzy search of the universe of discourse set using the corresponding membership values;

determining a set of variants based on an intersection of the plurality of satisfying sets of variants for the optimization parameters;

generating an ordered list of variants by sorting the set of variants;

selecting a variant from the set of variants based on a position of the variant in the ordered list of variants; and developing the system architecture using the selected variant.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

Figure 1:
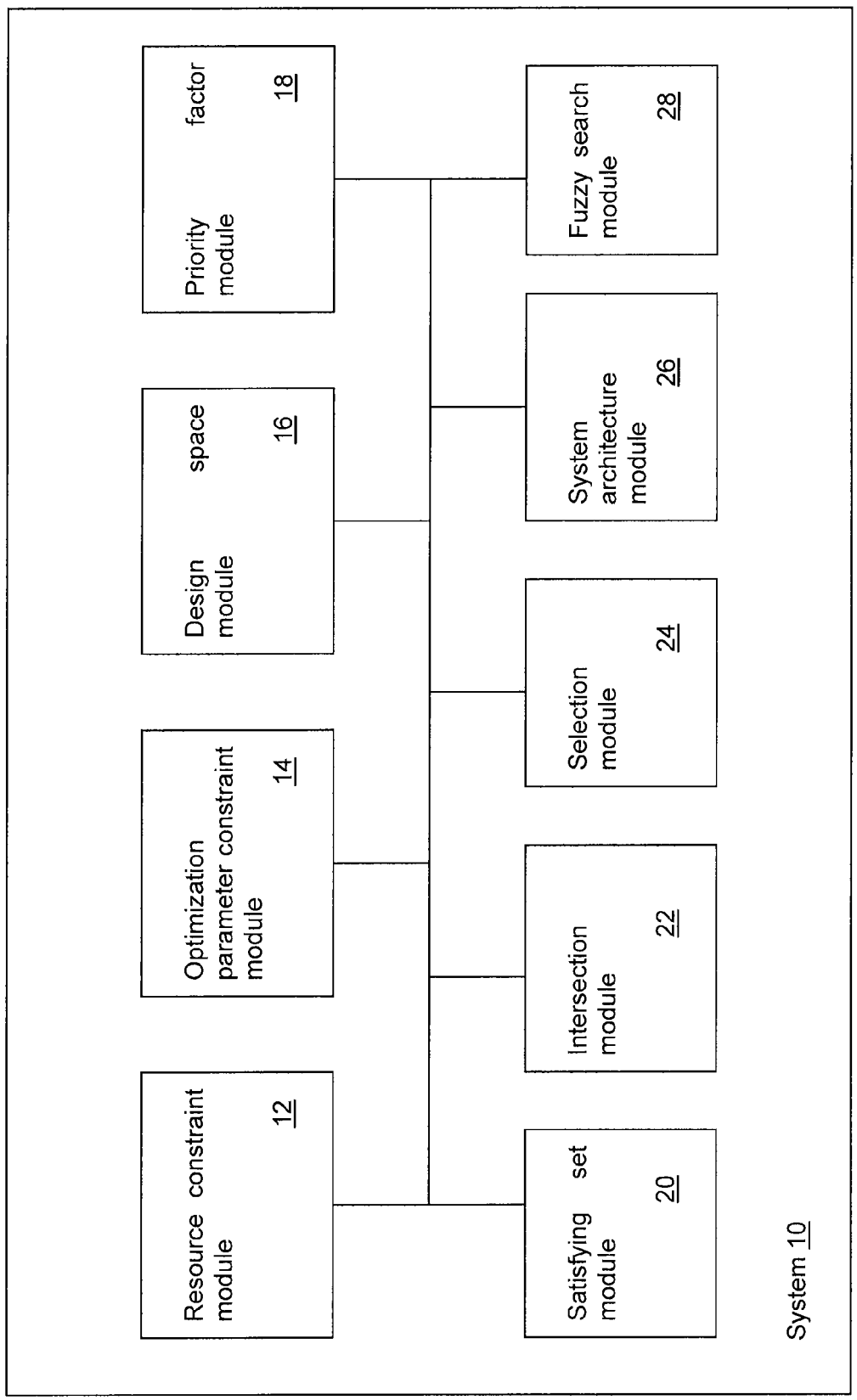
FIG. 1 illustrates a block diagram of a system for developing a system architecture in accordance with embodiments described herein.

The drawings, described below, are provided for purposes of illustration, and not of limitation, of the aspects and features of various examples of embodiments of the invention described herein. The drawings are not intended to limit the scope of the applicants' teachings in any way. For simplicity and clarity of illustration, elements shown in the figures have not necessarily been drawn to scale. The dimensions of some of the elements may be exaggerated relative to other elements for clarity. Further, where considered appropriate, reference numerals may be repeated among the figures to indicate corresponding or analogous elements.

DESCRIPTION OF EXEMPLARY EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The embodiments of the systems and methods described herein may be implemented in hardware or software, or a combination of both. However, these embodiments may be implemented in computer programs executing on programmable computers, each computer including at least one processor, a data storage system (including volatile and non-volatile memory and/or storage elements), and at least one communication interface. For example, the programmable computers may be a server, network appliance, set-top box, embedded device, computer expansion module, personal computer, laptop, personal data assistant, or mobile device. Program code is applied to input data to perform the functions described herein and to generate output information. The output information is applied to one or more output devices, in known fashion. In some embodiments, the communication interface may be a network communication interface. In some embodiments, the communication interface may be a software communication interface, such as those for inter-process communication. In still other embodiments, there may be a combination of communication interfaces.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Embodiments described herein may provide Design Space Exploration (DSE) with multi parametric objective in High Level Synthesis (HLS) which involves assessing variants of an architecture design space to find an optimum (or near optimum) solution or variant for the architecture design according to the system requirements specified. Due to the time to market pressure, the cost of solving the problem of architecture variant selection by exhaustive analysis may be forbidden. The tradeoffs linked to the selection of the appropriate variant during architecture evaluation may require careful assessment for efficient design space exploration. Further DSE requires satisfying multiple (and in some cases conflicting) objective conditions and constraints such as increase in accuracy of evaluation during DSE with simultaneous speedup in the exploration process. Embodiments described herein may provide DSE based on a fuzzy search technique for architecture design space evaluation and variant selection. Other embodiments described herein may provide a hybrid design space exploration based on a combination of a fuzzy search technique and priority factors for architecture evaluation and selection. Further embodiments described herein may provide a hybrid design space exploration based on a combination of a fuzzy search technique and a hierarchical tree structure.

Complex Digital Signal Processing (DSP) Very Large Scale Integration (VLSI) designs may be possible due to DSE techniques. These techniques may provide the platform for superior designing by applying the most suitable architecture variant according to the user specifications and constraints. Each step in the design process may require efficient usage of the existing conditions and resources. Optimization may also be required and may only be achieved by setting system unconstrained parameters in such a way so as to maximize performance while satisfying multiple design specifications including multiple optimization parameter constraints and resource constraints. The HLS design process used for the development of the multi-objective VLSI designs and the complex system-on-chip designs may be characterized by combined use of heterogeneous techniques, methodologies and significant decision making strategies with which an architectural model is gradually carved out step by step on the basis of the user specifications and system requirements. Furthermore, an ever-wide array of embedded Application Specific Integrated Circuits (ASICs) have been designed and deployed to satisfy the explosive growth in increase of demand of electronic devices. All the application domains ranging from highly efficient but less flexible ASICs to the highly complex System-on-Chip (SoC) designs require proficient multi objective optimized design methodology where the cost of analyzing the architectural variants for selection meets the design objectives specified. Proliferation of the mentioned VLSI circuits in today's modern portable and other high end electronic devices may be possible due to efficient DSE methodologies. Embodiments described herein may provide a new framework for DSE with a fuzzy search approach to explore the architecture design space with reduced analysis time for the evaluation and selection of the architecture with multiple optimization parameter requirements or constraints such as hardware area, time of execution and power consumption.

The high level synthesis methodology may contain a sequence of tasks to convert the abstract behavioral description of the algorithm into its respective structural block at register transfer (RT) level. The design at the RT level may comprise functional units such as ALU's, storage elements, registers, busses and interconnections. HLS may offer advantages such as productivity gains and efficient DSE. Performing DSE at a higher level of abstraction may pay more dividend than at lower levels of abstraction i.e. transistor level or logic level. Traditional high level synthesis design methodology may be much simpler than modern design techniques. In general the initial step of synthesis is to compile the behavioral specification into an internal representation. The next step is to apply high level transformation techniques with the aim to optimize the behavior as per the desired performance. In order to realize the structure, a final step is to perform scheduling to determine the time at which each operation is executed and the allocation, which is synthesizing the necessary hardware to perform the operations. Scheduling can be of two different classes: time constrained scheduling and resource constrained scheduling. Time constrained scheduling refers to finding the minimum cost schedule that satisfies the given set of constraints with the given maximum number of control steps. Resource constraint scheduling on the other hand refers to finding the fastest possible schedule that satisfies the given set of constraints with the given maximum number of resources. Resource constraints may be generally specified by the area occupied by the functional units such as adders/subtractors, multipliers, dividers and ALUs. Although the data path of the system consists of registers and interconnections they are not considered to be included as resource constrained because they are difficult to specify. High level synthesis can be broadly divided into the following steps: input description, internal representation, design space exploration, allocation, scheduling and binding. Therefore the final structure at the RT level may include the data path and the control path. The new generation of system designs may require multi parametric optimization strategies in HLS while simultaneously utilizing rapid and efficient DSE approaches for finding the best suitable architecture.

Embodiments described herein may avoid constructing hierarchical structures for architecture evaluation and thereby may minimize time overhead. Further embodiments described herein may avoid evolutionary algorithms that may be slow in finding the global optimum solution and do not always guarantee the selection of global optimum and might eventually end up in finding the local minima. Embodiments described herein consider multi objective problems (such as area, delay and power consumption, for example). Embodiments described herein may avoid using a genetic algorithm, which may be inherently slow in nature and does not always guarantee reaching the global optimum solution. The chances of yielding the local minima always exist. Due to current time to market pressure, the objective specification has become equally important as intended functionality of the system. So exploration approaches should not just produce the correct optimal architecture but should also be able to find the optimal solution with increased acceleration to satisfy the time to market pressure conditions. Embodiments described herein may be capable of accurately and rapidly evaluating the design space for finding the optimal design solution and can thereby assist the designers in finding the best architecture for the design with increased acceleration.

Embodiments described herein use a fuzzy search technique to search the universe of discourse set (the sorted design space) to identify variants that satisfy constraint values for optimization parameters and resource constraints. Embodiments described herein may be directed to a design flow starting with the real specification and formulation to receive the constraint values as input, and eventually obtaining the register transfer level structure performing DSE. As an illustrative example, three optimization parameters may be optimized during the following demonstration of design flow for high level synthesis; however, more than three optimization parameters may be optimized and different combinations of parameters may be optimized. This illustrative example will be based on the following optimization parameters: power consumption, time of execution and hardware area of the resources, but another example includes cost of resources.

Reference is first made to FIG. 1, which illustrates a block diagram of a system 10 for developing a system architecture in accordance with embodiments described herein. System may include a resource constraint module 12, an optimization parameter constraint module 14, a design space module 16, a priority factor module 18, a satisfying set module 20, an intersection module 22, a selection module 24, a system architecture module 26, and a fuzzy search module 28.

System 10 may be implemented using a server which includes a memory store, such as database(s) or file system(s), or using multiple servers or groups of servers distributed over a wide geographic area and connected via a network. System 10 has a network interface for connecting to network in order to communicate with other components, to serve web pages, and perform other computing applications. System 10 may reside on any networked computing device including a processor and memory, such as an electronic reading device, a personal computer, workstation, server, portable computer, mobile device, personal digital assistant, laptop, smart phone, WAP phone, an interactive television, video display terminals, gaming consoles, and portable electronic devices or a combination of these. System 10 may include a microprocessor that may be any type of processor, such as, for example, any type of general-purpose microprocessor or microcontroller, a digital signal processing (DSP) processor, an integrated circuit, a programmable read-only memory (PROM), or any combination thereof. System 10 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. System 10 may include one or more input devices, such as a keyboard, mouse, camera, touch screen and a microphone, and may also includes one or more output devices such as a display screen and a speaker. System 10 has a network interface in order to communicate with other components by connecting to any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Resource constraint module 12 is operable to define a plurality of resources constraints $maxN_{R1}, \ldots maxN_{Rn}$, for a plurality of kinds of resources $R1 \ldots Rn$. Each resource constraint $maxN_{Ri}$ is a maximum number, $1 \leq i \leq n$, of a kind of resources Ri available to construct the system architecture, where n is an integer greater than 1. Examples of resources include adders, subtractors, clock oscillators, multipliers, dividers, comparators, Arithmetic Logic Units (ALU), integrators, summers and other functional modules. An example of a resources constraint is a maximum amount of each type of resource available to construct the system architecture.

Optimization parameter constraint module 14 is operable to define constraint values comprising a constraint value for each optimization parameter of at least three optimization parameters for the system architecture. The at least three optimization parameters comprise a final optimization parameter. Examples of optimization parameters include hardware area, cost of resources, time of execution, and power consumption.

Design space module 16 is operable to define a design space as a plurality of variants representing different combinations of a number of each kind of resource $R1, \ldots Rn$ available to construct the system architecture. Each variant is a vector of the form:

$$V_n = (N_{R1}, \ldots N_{Rn})$$

wherein $N_{Ri}$ $1 \leq i \leq n$ represents the number of the kind of resource Ri, where based on the resource constraints, $1 \leq N_{Ri} \leq maxN_{Ri}$;

Satisfying set module 20 is operable to generate a universe of discourse set by sorting the plurality of variants of the design space. Satisfying set module 20 is operable to determine a satisfying, or near satisfying, set of variants from the universe of discourse set by determining a border variant of the universe of discourse set. Each variant of the satisfying set satisfies (or nearly satisfies) the constraint value for the optimization parameter. If a variant obeys the constraints or exceeds the constraint value by an acceptable amount, such as 5-10% for example, or some other configured amount, then the variant may satisfy or nearly satisfy the constrain value respectively. The border variant is the last variant of the universe of discourse set to satisfy (or nearly satisfy) the constraint value for the optimization parameter such that all variants to one side of the border variant in the universe of discourse set satisfy (or nearly satisfy) the constraint value for the optimization parameter and all variants to the other side of the border variant in the universe of discourse set do not satisfy the constraint value for the optimization parameter. Satisfying set module 20 is operable to generate a universe of discourse set by sorting the variants of the design space using priority factors, an arrangement criterion function, a hierarchical tree structure, a priority order, and other sorting methodologies. Satisfying set module 20 is operable to determine a satisfying set of variants for each of the optimization parameters except for the final optimization parameter. Satisfying set module 20 is operable to interact with fuzzy search module 28 to determine the satisfying set of variants by searching the universe of discourse set.

Fuzzy search module 28 is operable to conduct a fuzzy search of a universe of discourse set to identify the border variant. Fuzzy search module 28 is operable to assign a membership value to each variant of the universe of discourse, where each membership value is from the interval [0,1]. A membership value assigned to a variant of the universe of discourse set indicates the position of the respective variant in the universe of discourse set. Fuzzy search module 28 is operable to search the variants of the design space based on the assigned membership values. In general, searching the design space to identify a set of variants that represents a combination of resources to construct a system architecture in view of constraint values for optimization parameters and resource constraints can be a tedious and time consuming task. The search may demand great accuracy and elaborate analysis of the variants in the design space. System 10 is operable to implement a fuzzy search of the universe of discourse set (the sorted design space) to identify variants in a relatively short period of time, as compared to an exhaustive search for example.

Satisfying set module 20 is operable to determine a satisfying set of vectors for each of the optimization parameters (except the final optimization parameter) by interacting with fuzzy search module 28 to determine the border variant from the universe of discourse set. Fuzzy search module 28 is operable to determine the border variant by conducting a fuzzy search of the universe of discourse set using the corresponding membership values.

Intersection module 22 is operable to determine a set of variants based on an intersection of the satisfying sets of variants for the optimization parameters.

Selection module 24 is operable to select a variant for use in developing the system architecture by, for the final optimization parameter, generating an ordered list of variants by sorting the set of variants, and selecting a variant from the set of variants based on the ordered list of variants.

System architecture module 26 is operable to develop the system architecture using the selected variant. The system architecture may comprise a Register Transfer Level data path circuit and a Register Transfer Level control timing sequence. The Register Transfer Level data path circuit is configured to generate output data as a result of performing a sequence of operations on data using Register Transfer Level modules. The Register Transfer Level modules include the number of each kind of resources represented by the selected variant. Examples of Register Transfer Level modules include registers for storage of data, memory modules, latches for sinking of data, multiplexers and demultiplexers. The Register Transfer Level control timing sequence provides a control configuration for a data path circuit to provide timing and synchronization required by data traversing through the Register Transfer Level modules of the data path circuit.

In accordance with some embodiments, satisfying set module 20 is operable to interact with priority factor module 18 to generate the universe of discourse set. System 10 may include a priority factor module 18 that is operable to define, for each optimization parameters, a priority factor function for each kind of resource $R1, \ldots Rn$. A priority factor function defines a rate of change of the optimization parameter with respect to a change in a number $N_{Ri}$ of the corresponding kind of resource Ri, $1 \leq i \leq n$. Examples of priority factor functions are illustrated herein in relation to hardware area, execution time, cost, and power consumption. Other priority factor functions may also be used by system 10 for these optimization parameters, and for other optimization parameters.

Figure 2:
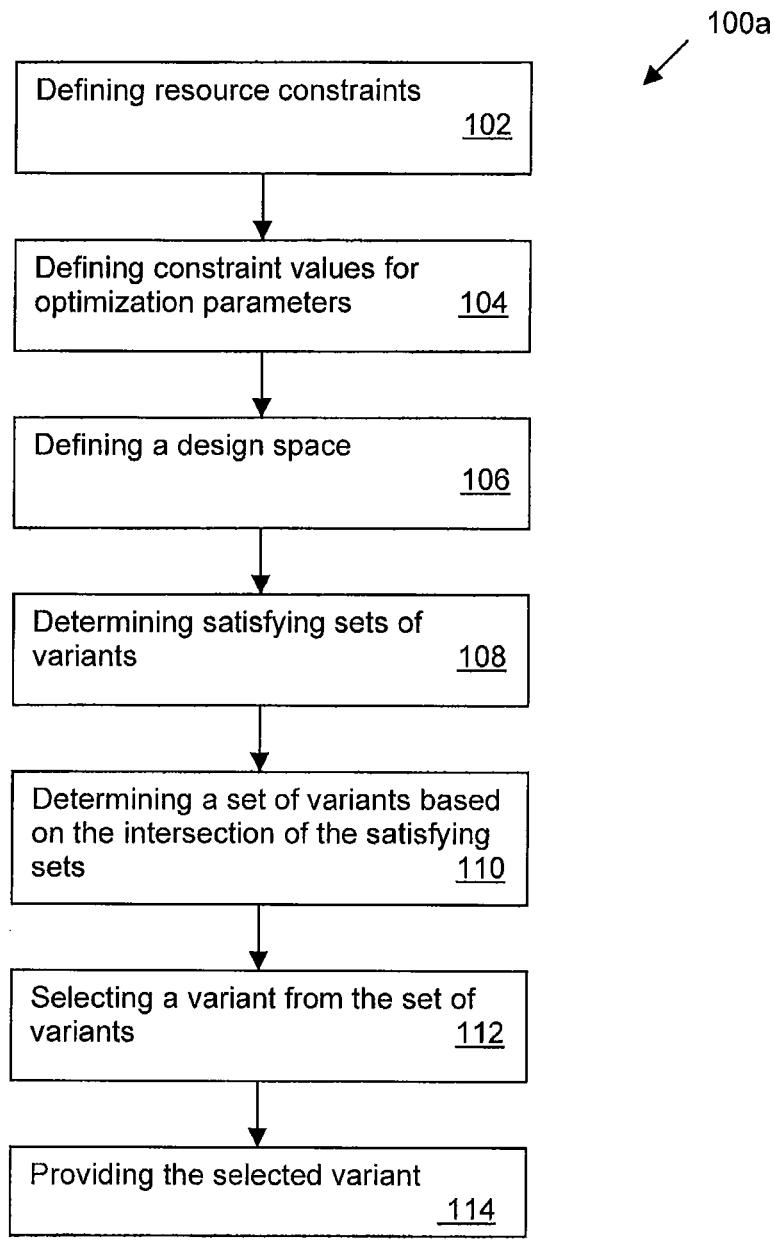
FIG. 2 illustrates a flow chart of a method of determining a variant representing a combination of a number of each kind of resource available to construct a system architecture in accordance with embodiments described herein.
Figure 3:
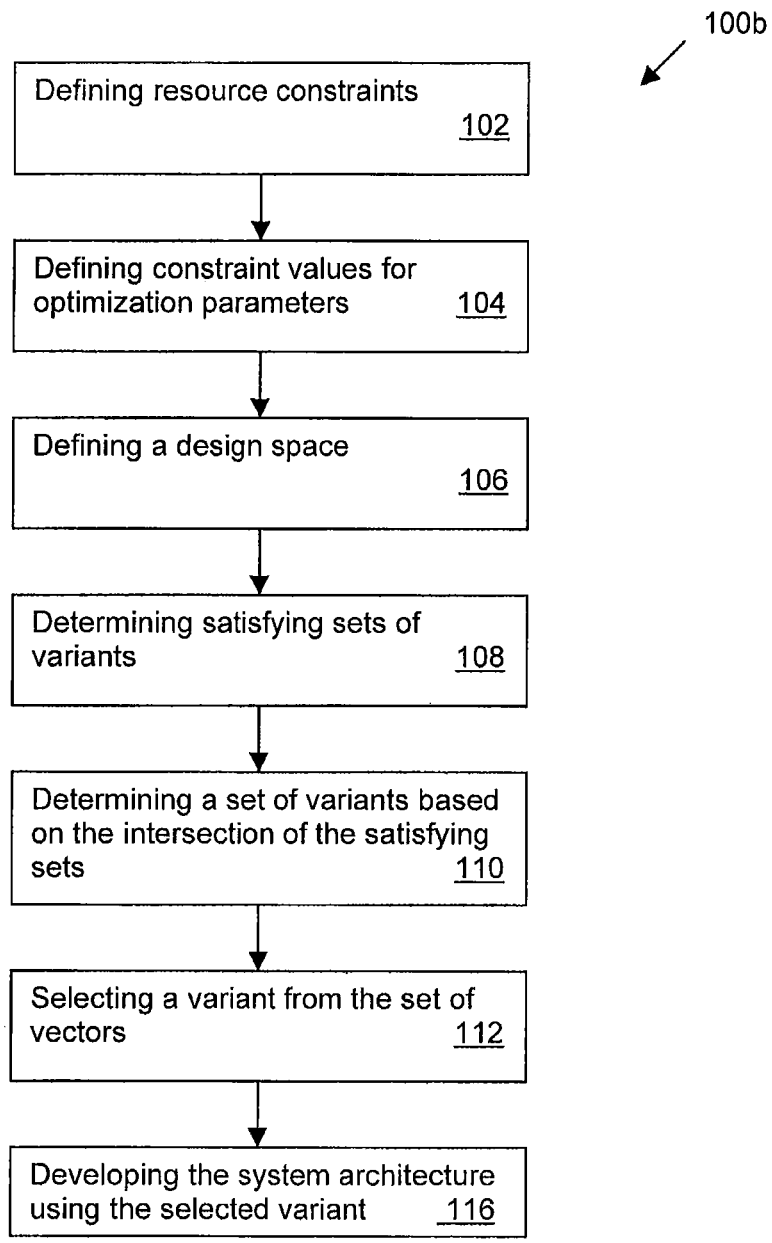
FIG. 3 illustrates a flow chart of a method of developing a system architecture in accordance with embodiments described herein.

Reference is first made to FIG. 2 which illustrates a flow chart of a method 100a of determining a variant representing a combination of a number of each kind of resource available to construct a system architecture in accordance with embodiments described herein, and FIG. 3 which illustrates a flow chart of a method 100b of developing a system architecture in accordance with embodiments described herein.

At step 102, system 10 defines resources constraints $maxN_{R1}, \ldots maxN_{Rn}$, for a plurality of kinds of resources R1 ... Rn, wherein each resource constraint $maxN_{Ri}$ is a maximum number, $1 \leq i \leq n$, of a kind of resources Ri available to construct the system architecture, n being an integer greater than 1. Examples of kinds of resources include adders, subtractors, clock oscillators, multipliers, divider, comparator, ALU, integrator, summer and other functional modules. This step may be part of the problem description and technical specifications definition stage, which provides input data for the high level synthesis tools. Resource constraints may also include specifications and data regarding the kind resources such as number of clock cycles required for each operation, area occupied by each unit of each kind of resource, cost of each unit of each kind of resource, power consumed by each unit of each kind of resource, and so on.

At step 104, system 10 defines a constraint value for each of at least three optimization parameters for the system architecture, wherein the at least three optimization parameters comprise a final optimization parameter. Examples of optimization parameters include hardware area, cost, time of execution, and power consumption. A constraint value may be a maximum or minimum value for a respective optimization parameter. For example, if an optimization parameter is power consumption then a constraint value may be a maximum power consumption for the system architecture. The optimization parameters include a final optimization parameter, which provides a frame of reference to evaluate the set of variants to select a variant for developing the system architecture. The developed system architecture comprises, for each kind of resource Ri in the plurality of kinds of resources R1 ... Rn, the number Ni of that kind of resource defined by the selected variant.

In accordance with embodiments described herein, system 10 is operable to validate the constraint values for the optimization parameters.

System 10 performs this validation step as a first screening level of check by performing a Minimum-Maximum evaluation for the constraint to verify whether the constraints specified are valid and feasible.

System 10 is operable to perform this validation using the following example inputs: Module Library, Data Flow Graph (or Mathematical function) of the application and constraints values. System 10 is operable to produce the following output: the decision whether the design process continues or terminates (i.e. constraints are valid or invalid). System 10 is operable to perform the validation according to the following algorithm:

Repeat for all the constraints values specified
{
1. Calculate the minimum value of the optimization parameter under consideration. For the parameter discussed in the supporting document, calculate the minimum value of the hardware area (power consumption)/execution time based on the minimum resource/maximum resource (considering that whichever parameter among hardware area, power consumption or execution time is the first user constraint) using any one of the functions described below based on the user requirement:

In case of hardware Area:

$$A_{min} = (N_{R1} \cdot K_{R1} + N_{R2} \cdot K_{R2} + \ldots + N_{Rn} \cdot K_{Rn}) + A(R_{clk})$$

where, $N_{Ri}$ represents the number of resource $R_i$ and is equal to 1 for all cases. Therefore for calculating the minimum area, $N_{R1} = N_{R2} = N_{R3} = \ldots = N_{Rn} = 1$. Also '$K_{Ri}$' represents the area occupied per unit resource 'Ri' which is obtained from the user as input. $A(R_{clk})$ refers to the area of clock oscillator used as a resource providing the necessary clock frequency to the system. '$K_{Ri}$' represents the area occupied per unit resource 'Ri' ($1 \leq i \leq n$).

In case of power consumption:

$$P_{min} = (N_{R1} \cdot K_{R1} + N_{R2} \cdot K_{R2} + \ldots + N_{Rn} \cdot K_{Rn}) \cdot p_c$$

Therefore for calculating the minimum area, $N_{R1} = N_{R2} = N_{R3} = \ldots = N_{Rn} = 1$. Moreover, '$p_c$' is the slowest clock frequency available in the module library which consumes the least power per unit area.

In case of execution time:

$$T_{exe} = [L + (N-1) \cdot T_c]$$

'L' and '$T_c$' should be calculated based on minimum resources considering $N_{R1} = N_{R2} = N_{R3} = \ldots = N_{Rn} = 1$. 'L' represents latency of execution, 'Tc' represents the cycle time of execution during data pipelining. Also, 'N' is the number of sets of data to be pipelined obtained from library (users input).

2. Calculate the maximum value of the optimization parameter under consideration. Calculate the maximum value of the hardware area based on the minimum resource (considering that hardware area is the first user constraint) using the function described below:

In case of hardware Area:

$$A_{max} = (N_{R1} \cdot K_{R1} + N_{R2} \cdot K_{R2} + \ldots + N_{Rn} \cdot K_{Rn}) + A(R_{clk})$$

Where, $N_{Ri}$ represents the number of resource $R_i$. Therefore for calculating the maximum area, $N_{R1} = N_{R2} = N_{R3} = \ldots = N_{Rn} =$ Maximum resource of certain functional unit specified by user in the library. Also '$K_{Ri}$' represents the area occupied per unit resource 'Ri' which is obtained from the user as input.

In case of power consumption:

$$P_{max} = (N_{R1} \cdot K_{R1} + N_{R2} \cdot K_{R2} + \ldots + N_{Rn} \cdot K_{Rn}) \cdot p_c$$

Therefore for calculating the minimum area, $N_{R1} = N_{R2} = N_{R3} = \ldots = N_{Rn} =$ Maximum resource of certain functional unit specified by user in the library. Moreover, '$p_c$' is the fastest clock frequency available in the module library which consumes the maximum power per unit area.

In case of execution time:

$$T_{min} = [L + (N-1) \cdot T_e]$$

'L' and '$T_c$' should be calculated based on maximum resources considering $N_{R1} = N_{R2} = N_{R3} = \ldots = N_{Rn} =$ Maximum resource of certain functional unit specified by user in the library.

Check if Constraint specified satisfies the upper threshold (maximum value) and lower threshold (minimum value) of the parameter calculated above in steps 1 and 2. In other words, let the constraint for hardware area is '$A_{const}$', constraint for power consumption is '$P_{const}$' and constraint for execution time is '$T_{const}$'. Then, the following conditions are checked:

$$A_{min} \leq A_{const} \leq A_{max} \text{(For Hardware area)}$$

$$T_{min} \leq T_{const} \leq T_{max} \text{(For Execution time)}$$

$$P_{min} \leq P_{const} \leq P_{max} \text{(For Power consumption)}$$

If the above conditions satisfy then, the design process continues
Elseif the above conditions fail then the design process stops and prompt for correction of constraint values.
}
END At step 106, system 10 defines a design space as a plurality of variants representing different combinations of a number of each kind of resource R1, . . . Rn available to construct the system architecture. Each variant is a vector of the form:

$$V_n = (N_{R1}, \ldots N_{Rn})$$

where $N_{Ri}$ 1≤i≤n represents the number of the kind of resource Ri, wherein based on the resource constraints, 1≤$N_{Ri}$≤max$N_{Ri}$.

This initial arrangement of variants of the design space can be made in any order. The design space is used by system 10 to visualize the total architectural variants available to construct the system architecture. The design space can change based on the resources available to construct the system architecture, as defined by the resource constraints. The design space is created according to the resource constraints for total available resources available to construct the system architecture and can represent all different combinations of each kind of available resource, or a subset thereof.

At step 108, system 10 determines a plurality of satisfying sets of variants. Specifically, system 10 is operable to determine at least one satisfying set for each optimization parameter. In some examples, system 10 is operable to determine at least one satisfying set for each optimization parameter except for the final optimization parameter. Each variant in the satisfying set of variants for a given optimization parameter satisfies the constraint value(s) for the respective optimization parameter.

Figure 4:
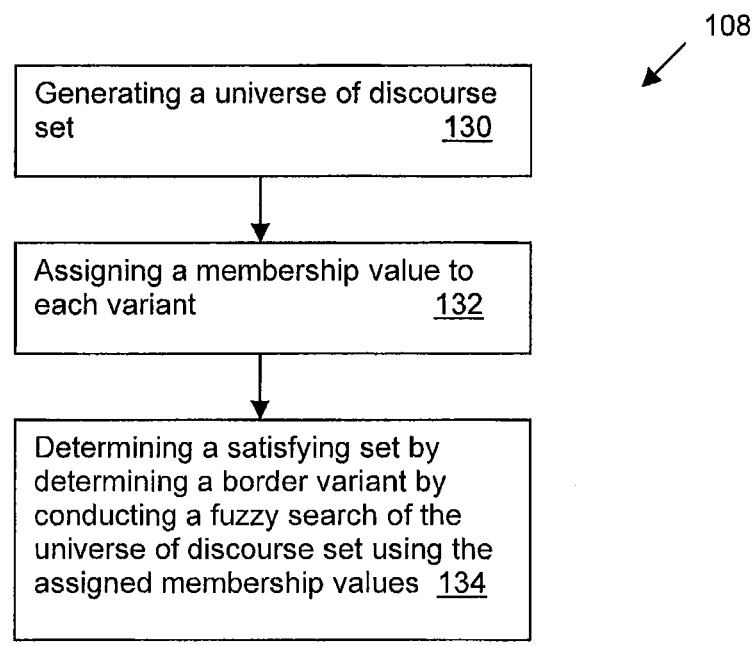
FIG. 4 illustrates a flow chart of a method for determining a satisfying set of variants for an optimization parameter in accordance with embodiments described herein.

Referring now to FIG. 4, there is shown a flowchart of a method of determining a satisfying set of variants for an optimization parameter. In accordance with some embodiments described herein, system 10 is operable to implement the method 134 for each optimization parameter, except the final optimization parameter, in order to determine a satisfying set of variants for each optimization parameter.

At step 130, system 10 generates a universe of discourse set by sorting the variants of the design space. System 10 is operable to sort the variants of the design space using various sorting methodologies. For example, system 10 is operable to sort the variants of the design space using priority factors, a hierarchical tree structure, a priority order, and an arrangement criterion function. Further details in relation to sorting the variants to generate the universe of discourse set will be described in relation to FIGS. 7, 8, 9, and 10.

At step 132, system 10 assigns a membership value to each variant of the universe of discourse, where each membership value is from the interval [0,1]. The resulting set of assigned membership values may be referred to herein as a fuzzy set. The fuzzy set may be the same size as the universe of discourse set, such that there is a 1-1 mapping between an assigned membership value and a variant. The membership value assigned to a variant of the universe of discourse set indicates the position of the respective variant in the universe of discourse set. For example, if a variant is an extreme position in the universe of discourse set (such as the first element or last element, for example) then the membership value assigned to that variant will indicate that the variant is in an extreme position. Such a membership value may also be in an extreme position in the fuzzy set. As another example, in accordance with some embodiments, a variant that is the xth position in the universe of discourse set may be assigned a membership value that is in the xth position in the fuzzy set.

In accordance with embodiments described herein, system 10 is operable to determine a satisfying set of architectural variants for each optimization parameter by performing a fuzzy search of the universe of discourse set. A variant is a vector that represents a combination of a number of each kind of resource available to construct the system architecture. A fuzzy search is a search based on fuzzy logic decision making. Fuzzy logic decision making based searching during DSE in high level synthesis may reduce the number of architectural variants to be analyzed for selection of an optimal system architecture, as compared to an exhaustive search for example.

Fuzzy set theory involves manipulation of the fuzzy linguistic variables. The basic difference between the classical set theory and the fuzzy set theory is the assignment of every element x, a value from the interval [0, 1] instead of the two element set {0, 1}, where x∈U, U being the set of elements. In fuzzy set theory, the characteristic function is generalized to a membership function that assigns a membership value to every element 'x' in the set of elements U. The membership function $\mu_F$ of a fuzzy set F is a function:

$$\mu_F : U \rightarrow [0,1]$$

The set of sorted variants is referred to herein as the universe of discourse set. The architectural variants of the universe of discourse set are assigned membership values from the interval [0,1] such that the variants are represented in the form of a fuzzy set of membership values between 0 and 1. Each variant corresponds to an assigned membership value in the fuzzy set based on the characterized membership function. The membership value will be assigned to each variant in such a way so as to reflect the way that the variants of the universe of discourse set are sorted. That is, each assigned membership value indicates the position of the corresponding variant in the universe of discourse set. For example, the assigned membership values are either increasing or decreasing from the left to the right of the extreme of the fuzzy set to reflect the increasing or decreasing order of the corresponding variants in the universe of the discourse set. In this theory, only the variants in the extreme positions in the universe of discourse set optimization parameter values (which are the minimum and the maximum values or maximum and minimum optimization parameter values) are calculated at the beginning. The membership value of the variants between the two variants in the extreme positions will be considered to be directly proportional to the position of the variants in the sorted arrangement. The membership value of a variant can be calculated by the equations (1) or (2) depending on the kind of optimization parameter being considered:

$$\tau = \frac{x - \alpha}{\beta - \alpha} \quad (1)$$

$$\text{Or, } \tau = \frac{x - \beta}{\alpha - \beta} \quad (2)$$

If the optimization parameter is a time of execution then system 10 is operable to calculate the membership values assigned to the variants using equation (2) is used, otherwise system 10 is operable to calculate the membership values assigned to the variants using equation (1).

The optimization parameter value of the variant is assumed to be proportional to the position of the variant in the universe of discourse set (i.e. the sorted design space). In equation (1)

and (2), 'x' is the position of the variant; represents the assigned membership value of the variant which is the x$^{th}$ position in the universe of discourse set; 'α' and 'β' are the order of the first element and the last element in the universe of discourse set, thus 'α' is equal to 1 and 'β' is equal to the total number of variants in the universe of discourse set.

A graphical representation of the above function represents a straight line which will aid in finding the border variant. The border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter. For example, the border variant will be the first variant that satisfies the constraint value for the optimization parameter execution time constraint and the border variant is the last variant that satisfies the constraint value for the optimization parameter area or power.

Figure 6:
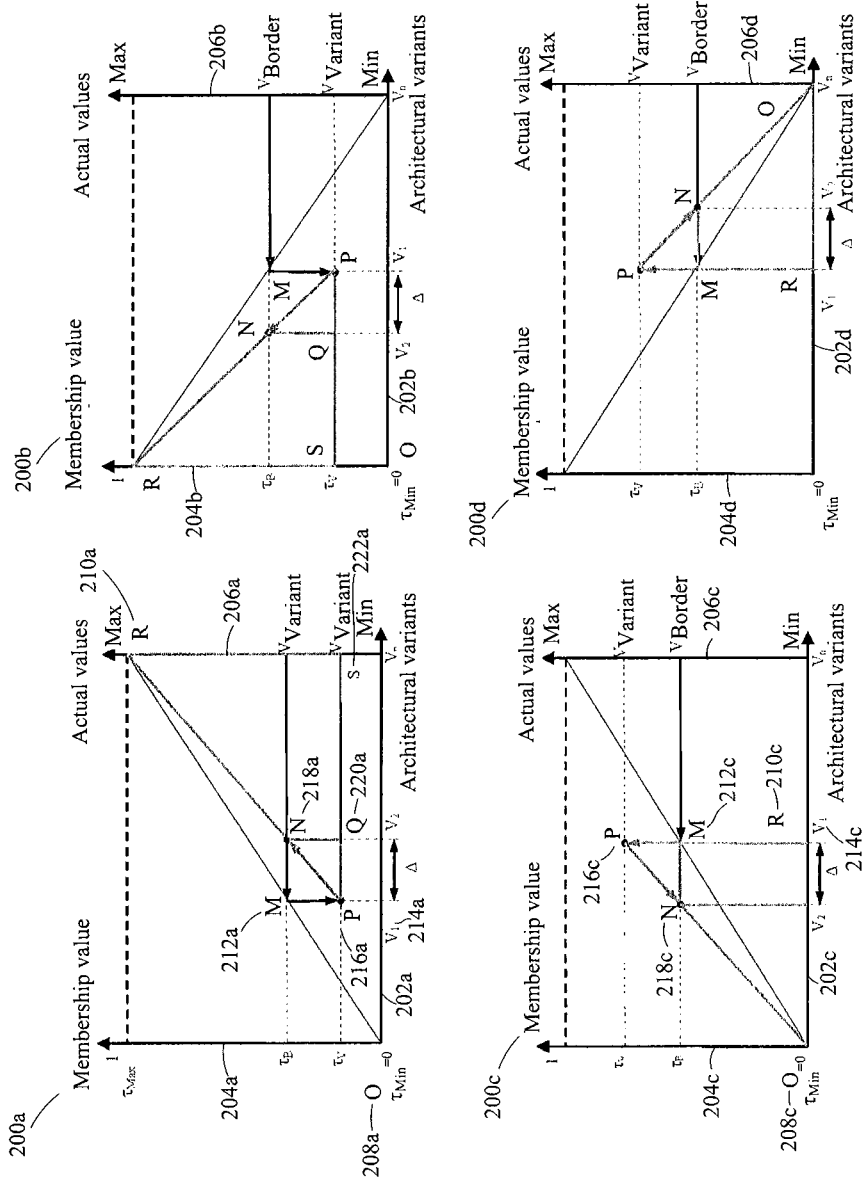
FIG. 6 illustrates a graphical representation of a fuzzy search of the universe of discourse set based on assigned membership values in accordance with embodiments described herein

Referring now to FIG. 6, there is shown graphical representations 200a, 200b, 200c, 200d of a fuzzy search algorithm used to search for the border variant in accordance with embodiments described herein. In particular, there is shown graphical representations 200a, 200c of the fuzzy search algorithm for searching a greater and lesser optimization parameter value, respectively, such as hardware area or power consumption, and graphical representations 200b, 200d of the fuzzy search algorithm for searching a greater and lesser optimization parameter value, respectively, such as execution time. The x-axes 202a, 202b, 202c, 202d of the graphical representations 200a, 200b, 200c, 200d refer to the architectural variants of the universe of discourse set. The y-axes right side 206a, 206b, 206c, 206d refer to the optimization parameter values of the variants and the y-axes left side 204a, 204b, 204c, 204d refer to the membership values assigned to the variants. The variable 'τ$_B$' refers to the membership value for the border variant for the optimization parameter. Similarly, 'τ$_B$' is the membership value for the variant under test and V$_{Variant}$ is its respective value. Similarly, 'τ$_{Min}$' and 'τ$_{Max}$' are the membership values assigned to the minimum and maximum variants in the universe of discourse set, while 'Max' and 'Min' are its respective optimization parameter values.

The increasing trend line from left to right of the graphical representations 200a, 200c for area and power consumption optimization parameters and the decreasing in trend line from left to right of the graphical representations 200b, 200d for execution time optimization parameter are represented by membership values assigned to each variant in the universe of discourse set. The optimization parameter value of each variant may be directly proportional to its assigned membership value.

The trend line shown in the graphical representations 200a, 200c for area and power consumption optimization parameters represents the increase in membership values assigned to each variant in universe of discourse set for area and power consumption optimization parameters. The trend line shown in the graphical representations 200b, 200d for execution time represents the decrease in membership values assigned to each variant in the universe of discourse set for the execution time optimization parameter. The assigned membership values may not be calculated using separate functions for each variant but instead are calculated by applying equations (1) and (2) to all variants in the universe of discourse set. System 10 is operable to sort the variants of the design space for each optimization parameter to generate a universe of discourse set for each optimization parameter and also operable to assign membership values to each variant in a way that preserves the order of the variants. For example, the variant in the xth position of the universe of discourse set may be assigned a membership value that has the xth position with respect to the other assigned membership values. This is because actual optimization parameter values of the variants in the design space may be proportional (e.g. directly proportional) to the membership values assigned to those variants.

A graphical representation 200a illustrates the increase in membership value for the area (or power consumption) optimization parameter to illustrate that the actual area optimization parameter value for the variants increases in the universe of discourse set for area. The optimization parameter values for the variants are approximated by the straight line from points O 208a to R 210a drawn from origin to the maximum. The point M 212a refers to the point in the line corresponding to the constraint value for the respective optimization parameter (V$_{Border}$) system 10. The point 'V$_1$' 214a indicates the initial variant closest to the calculated initial membership value (τ$_{ini}$). The point P 216a is a point in the straight line corresponding to the assigned membership value (τ$_v$) and the optimization parameter value (V$_{Variant}$) of variant 'V$_1$'. Now if for example, the optimization parameter value (V$_{Variant}$) calculated is less than the constraint value (V$_{Border}$), then the search should be performed between points P 216a and point R 210a. A second straight line from points P 216a and R 210a is approximated for the increase in membership values assigned to variants for the area/power optimization parameter. In this straight line point N 218a corresponds to the constraint value for the optimization parameter. Using the similarity between the triangles Δ PNQ (created by points P 216a, N 218a, and Q 220a) and Δ PRS (created by points P 216a, R 210a, and S 222a) the following function (3) can be attained:

$$\frac{\tau_{Max} - \tau_V}{\tau_B - \tau_V} = \frac{\text{Max} - V_{Variant}}{V_{Border} - V_{Varient}} \quad (3)$$

System 10 is operable to conduct a similar analysis for graphical representation 220b with a decreasing trend line for the time of execution optimization parameter. The trend line shows the decrease in magnitude of membership value based on the decrease in actual execution time optimization parameter values of the variants in the universe of discourse set for the time of execution optimization parameter.

A graphical representation 200c illustrates the increase in trend line for area optimization parameter (or power consumption optimization parameter). The point 'M' 212c refers to the point on the trend line corresponding to the constraint value for the optimization parameter (V$_{Border}$). The point 'V$_1$' 214c indicates the initial variant closest to the calculated initial membership value (τ$_{ini}$). The point 'P' 216c is a point in the trend line corresponding to the actual membership value (τ$_v$) and the actual optimization parameter value of the variant (V$_{variant}$) of variant 'V$_1$'. For example, if the calculated variant optimization parameter value is more than the constraint value for the optimization parameter (V$_{Border}$) then the system 10 should perform the search between points 'P' 216c and point 'O' 208c. System 10 is operable to approximate a second straight line for the increase in membership values for area optimization parameter (or power consumption optimization parameter), and the point 'N' 218c is a point corresponding to the constraint value for the optimization parameter (V$_{Border}$). Now using the similarity between the triangles Δ MPN (created by points M 212c, P 216c, and N 218c) and Δ RPO (created by points R 210*c*, P 216*c*, and O 208*c*) the following function (4) can be derived:

$$\frac{\tau_{Min} - \tau_V}{\tau_B - \tau_V} = \frac{Min - V_{Variant}}{V_{Border} - V_{Varient}} \quad (4)$$

System 10 is operable to conduct a similar analysis for graphical representation 200*d* with a decreasing trend line for the time of execution optimization parameter to derive the function (4) above. The trend line shows the decrease in value of membership value based in the decrease in actual execution time optimization parameter values for the variants.

System 10 is operable to assign membership values to each variant of the universe of discourse set for each optimization parameter based on the trend line (increasing or decreasing) for the optimization parameter, by using equations (1) or (2) for example. System 10 is operable to calculate the membership value assigned to a given variant as a function of the position of the variant in the universe of discourse set, and the order of the first and last elements of the universe of discourse set, namely 1 and the total number of variants in the universe of discourse set.

Referring back to FIG. 4, at step 134, system 10 determines a satisfying set of variants from the universe of discourse set by determining a border variant. Each vector of the satisfying set satisfies (or nearly satisfies) the constraint value for the optimization parameter. The border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter. System 10 determines the border variant by performing a fuzzy search of the universe of discourse set using the corresponding membership values assigned to the variants of the universe of discourse set.

Figure 5:
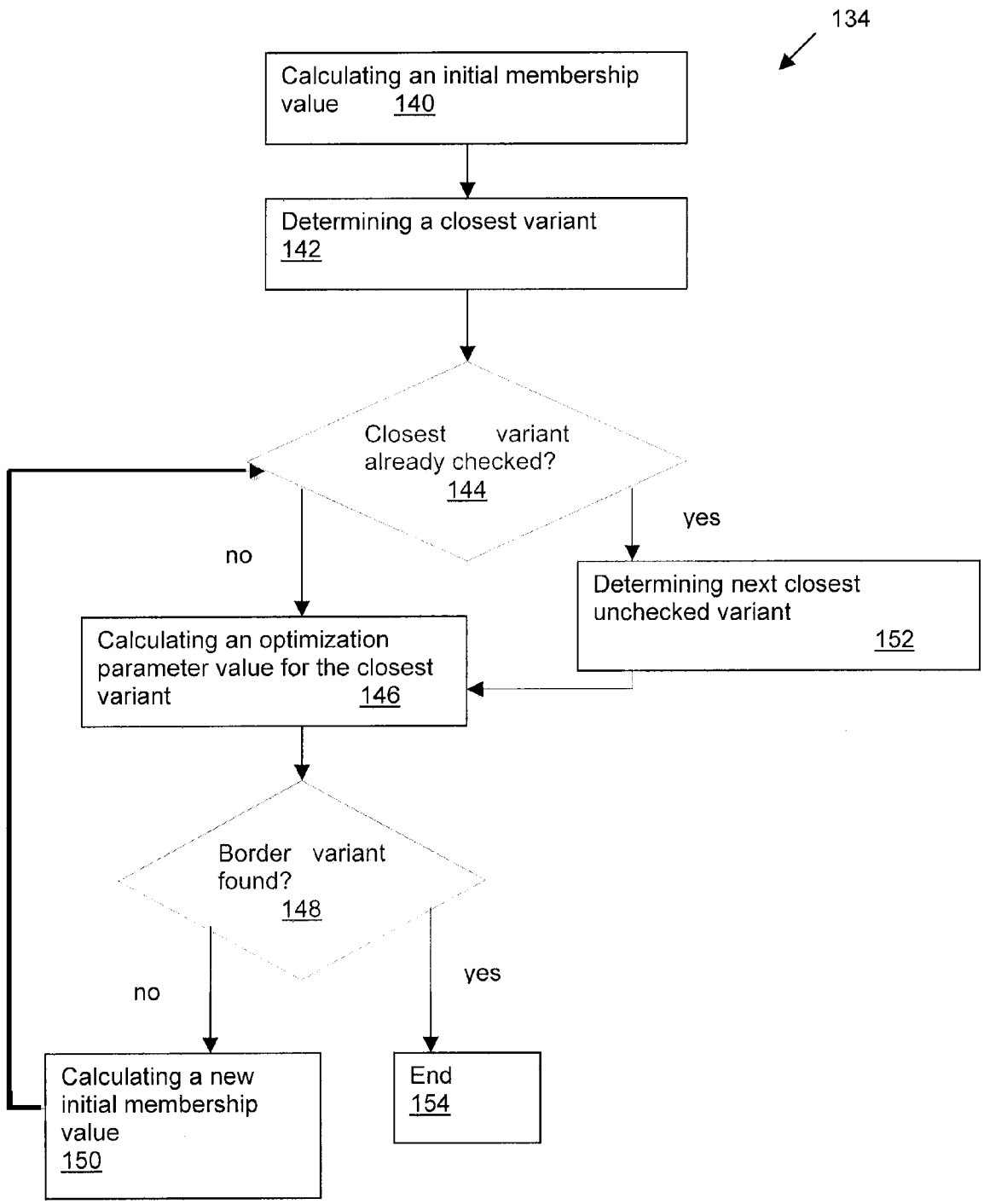
FIG. 5 illustrates a flow chart of a method of conducting a fuzzy search of the universe of discourse set in accordance with embodiments described herein.

Referring now to FIG. 5 there is shown a flowchart of a method 134 of determining the border variant by conducting a fuzzy search of the universe of discourse set using the assigned membership values. The fuzzy search algorithm may be used as a means for searching the design space to identify the border variant after it has been sorted to generate the universe of discourse set. In accordance with some embodiments described herein, system 10 is operable to implement the method 134 for each optimization parameter, except the final optimization parameter, in order to identify the border variant in the universe of discourse set for each optimization parameter.

At step 140, system 10 calculates an initial membership value. System 10 is operable to calculate the initial membership value as a function of a maximum value of the optimization parameter, a minimum value of the optimization parameter, and a value for the border variant based on the constraint value of the respective optimization parameter.

In accordance with some embodiments, system 10 calculates the initial membership value based on the following function (5):

$$\tau_{ini} = \frac{V_{Border} - Min}{Max - Min} \quad (5)$$

wherein $\tau_{ini}$ is the initial membership value, $V_{Border}$ is the constraint value for the respective optimization parameter value, Min and Max are the minimum and maximum values for the respective optimization parameter.

At step 142, system 10 determines the variant (from the variants of the universe of discourse set) that is assigned a membership value that is closest to the initial membership value, which is referred to herein as the closest variant.

At step 144, system 10 determines whether it has already considered or checked the closest variant while implementing the method 134.

If the system 10 has not already checked that closest variant, then at step 146, system 10 calculates an optimization parameter value for the respective closest variant. Each optimization parameter may be expressed as a function and that respective function may be used to determine the optimization parameter value for a given variant.

At step 148, system 10 determines whether the border variant is found. System 10 is operable to determine whether a border variant is found based on a termination condition. For example, if the universe of discourse is sorted in increasing order, such as for power consumption and hardware area, then system 10 is operable to implement the following termination condition: continue fuzzy search until a last variant at position i which satisfies $V_{border}$ is found where the variant at position i+1 (if position i is not the first position) does not satisfy (or nearly satisfy) $V_{border}$. That is, the border variant has not been found until system 10 determines the last variant in position i for which Pi<=$V_{border}$ and is the variant with the optimization parameter value that is most closest to $V_{border}$. As another example, if the universe of discourse is sorted in decreasing order, such as for time of execution, then system 10 is operable to implement the following termination condition: continue fuzzy search until a first variant at position i which satisfies $V_{border}$ is found where the variant at position i−1 (if position i is not the first position) does not satisfy (or nearly satisfy) $V_{border}$. That is, the border variant has not been found until system 10 determines the first variant in position i for which Pi>=$V_{border}$ and is the variant with the optimization parameter value that is most closest to $V_{border}$.

If the border variant has not been found, at step 150, system 10 calculates a new initial membership value and returns to step 144 to determine the closest variant for the new initial membership value. That is, system 10 returns to step 144 to determine the variant (from the variants of the universe of discourse set) that is assigned a membership value that is closest to the new initial membership value.

In accordance with some embodiments, system 10 is operable to calculate the new initial membership value based on whether the optimization parameter value of the variant is less than or greater than a value for the border variant which is based on the constraint value of the optimization parameter, which may be referred to as $V_{Border}$.

In accordance with some embodiments, system 10 is operable to calculate the new initial membership value as a function of the assigned membership value of the variant that is in the maximum position in the universe of discourse set, the assigned membership value of the variant that is the minimum position in the universe of discourse set, the constraint value of the optimization parameter, the assigned membership values for the variants in the universe of discourse set, the optimization parameter value of the closest variant, the minimum optimization parameter value of the variants for the respective optimization parameter and the maximum optimization parameter value of the variants for the respective optimization parameter.

For example, in accordance with some embodiments, if the optimization parameter value for the closest variant is less than the constraint value of the optimization parameter then system 10 may calculate the new initial membership value using a function (3) of the form:

$$\frac{\tau_{Max} - \tau_V}{\tau_B - \tau_V} = \frac{Max - V_{Variant}}{V_{Border} - V_{Varient}} \quad (3)$$

Or else, system 10 may calculate the new initial membership value using a function (4) of the form:

$$\frac{\tau_{Min} - \tau_V}{\tau_B - \tau_V} = \frac{Min - V_{Variant}}{V_{Border} - V_{Varient}} \quad (4)$$

wherein $\tau_{Max}$ is the assigned membership value of the variant that is in the maximum position in the universe of discourse set, $\tau_{Min}$ is the assigned membership value of the variant that is the minimum position in the universe of discourse set, $\tau_V$ is the assigned membership value of the variant in the universe of discourse set, $\tau_B$ is the calculated new initial membership value, $V_{Border}$ is the constraint value of the optimization parameter, $V_{Variant}$ is the optimization parameter value of the closest variant, and Max is the maximum optimization parameter value of the variants for the respective optimization parameter.

If at step 144, system 10 determines that the closest variant has already been checked, then at step 152, system 10 determines an unchecked variant having a membership value that is the next membership value and set the new closest variant to be the unchecked variant.

For example, in accordance with some embodiments described herein, system 10 may first compare the optimization parameter value of the closest variant to the constraint value for the optimization parameter. If system 10 determines that the optimization parameter value of the closest variant is less than the constraint value for the optimization parameter, then system 10 is operable to determine whether the variant assigned a membership value that is the next higher membership value has been checked, and if not then system 10 sets that unchecked variant as the closest variant and proceeds to step 146. If system 10 determines that the optimization parameter value of the closest variant is more than the constraint value for the optimization parameter, then system 10 is operable to determine whether the variant assigned a membership value that is the next lower membership value has been checked, and if not then system 10 sets that unchecked variant as the closest variant and proceeds to step 146.

If at step 148, system 10 determines that the border variant has been found then the method 134 ends at step 154. System 10 is operable to determine whether a border variant is found based on the termination condition described above. In addition, if at step 152, the system 10 determines that the optimization parameter value of the closest variant is equal to the constraint value for the optimization parameter, the system 10 is operable to determine that the border variant has been found at step 148 and the method 134 ends at step 154.

The border variant indicates the last variant of the universe of discourse to satisfy (or nearly satisfy) the constraint value of the respective optimization parameter. As an example, if the optimization parameter is hardware area or power consumption then the universe of discourse set may sort the variants in increasing order of magnitude and the border variant may indicate the last variant to satisfy (or nearly satisfy) the constraint value. If the optimization parameter is execution time then the universe of discourse set may sort the variants in decreasing order of magnitude and the border variant is the first variant to satisfy (or nearly satisfy) the constraint value.

Referring back to FIGS. 2 and 3, after system 10 determines the satisfying sets of variants, at step 110, system 10 determines a set of variants based on an intersection of the satisfying sets of vectors for the optimization parameters. That is, the set of variants includes variants that are in each of the satisfying sets of variants. In accordance with some embodiments, each variant in the set of variants satisfies (or nearly satisfies) the constraint values for each optimization parameter. In some embodiments, the final optimization parameter may have a constraint value that is defined in such a way that a satisfying set of variants cannot be determined independently of the satisfying sets of variants for the other optimization parameters. For example, the constraint value for the final optimization parameter may be defined as the minimum value for the respective final optimization parameter provided that the other constraint values have been met. For such an example, each variant in the set of variants satisfies (or nearly satisfies) the constraint values for each optimization parameter except the final optimization parameter, based on how the constraint value for the final optimization parameter is defined. In accordance with some embodiments, the set of variants may be referred to as the pareto-optimal set.

In accordance with some embodiments, system 10 is operable determine whether the constraint values are valid using the set of variants. System 10 performs this constraints validation check by determining if the set of variants is absolutely vacant. A vacant set of variants signifies that the constraint values provided are too tight/strict. If so, the strict constraint values of the given optimization parameter need to be relaxed to a certain extent. The algorithm for used by system 10 to detect the problem and resolve is described below:

1. Let the variant vectors obtained in the set of vectors (P) after applying the proposed design space exploration approach be P={$V_a, V_b, V_c \ldots, V_n$}, where $V_a, V_b, V_c \ldots, V_n$ are vectors of the design space that are elements of the set of vectors.
2. If the set of vectors, P=φ (Null), then there exists no variants in the set P. This indicates that the constraint values are too tight and it needs to be relaxed. This is because there exist no variant vector from the design space that simultaneously obeyed the constraint values. Proceed to step #4.
3. Else if P≠φ (not null), then there exists variants in the Pareto set, P. Continue the design process and stop the validation.
4. Relax the constraint values by a predetermined percentage, such as 5% for example, to set new constraint values for the optimization parameter. Using this illustrative example, the constraint for hardware area is '$A_{const}$', constraint for power consumption is '$P_{const}$' and constraint for execution time is '$T_{const}$', then depending on the user specified constraints, the new constraint values after applying the relaxation phase is as follows:

a) $A_{const}(\text{new}) = A_{const}(\text{original}) + 5\%$ of $A_{const}(\text{original})$ b) $T_{const}(\text{new}) = T_{const}(\text{original}) + 5\%$ of $T_{const}(\text{original})$ c) $P_{const}(\text{new}) = P_{const}(\text{original}) + 5\%$ of $P_{const}(\text{original})$ At step 112, system 10 selects a variant from the set of variant. System 10 is operable to select a vector by sorting the variants in the set of variants, ranking the vectors or otherwise evaluating the variants from the set of variants in order to generate an ordered list of variants. System 10 is operable to select a variant based on a position of the variant in the ordered list of variants. For example, the constraint value for the final optimization parameter may be a minimum value provided the constraint values for all other optimization parameters are satisfied. In such a case, system 10 is operable to evaluate each vector of the set of vectors in view of the final optimization parameter function, priority function for final optimization parameter, or other function that may be used to evaluate the variants in view of the final optimization parameter. System 10 is operable to sort the set of variants using the various sorting methodologies described herein in relation to FIGS. 7, 8, 9, and 10. After the variants in the set of variants are sorted system 10 is operable to select the first or last variant to satisfy (or nearly or substantially satisfy) the constraint value for the final optimization parameter depending on whether the variants are sorted in decreasing or increasing order, respectively. In some cases, the selected variant will be in the first or last position in the sorted set of variants depending on whether the variants are sorted in decreasing or increasing order. The selected variant defines a combination of a number of each kind of resource available to construct the system architecture, which satisfies or nearly satisfies the constraint values for the optimization parameters and the resource constraints. If the vectors of the satisfying set obey the constraints or exceed the value by an acceptable amount, such as 5-10% for example, or some other configured acceptable amount, then the vectors are said to satisfy or nearly satisfy (or substantially satisfy) the constrain respectively. The selected variant should concurrently optimize the optimization parameters while meeting the specifications and constraints provided.

In accordance with some embodiments, system 10 is operable to determine a satisfying set of variants for each optimization parameter including the final optimization parameter. Then system 10 determines the set of variants based on the intersection of the satisfying sets of variants for all optimization parameters. Each variant in the set of variants should satisfy (or nearly satisfy) all constraint values. System 10 selects a variant from the set of variants by sorting or ranking the variants to generate an ordered list of variants. System 10 selects a variant from the set of variants based on a position of the variant in the ordered list of variants.

At step 114, system 10 provides the selected variant for use in developing the system architecture. System 10 is operable to provide the selected variant by transmitting data represented the selected variant, displaying a representation of the selected variant, storing data representing the selected variant on shared memory for access by another system or component, print a representation of the selected vector or otherwise output the selected variant.

Alternatively or additionally, at step 116, system 10 develops the system architecture using the selected variant. The developed system architecture may comprise, for each kind of resource Ri in the plurality of kinds of resources R1 . . . Rn, the number Ni of that kind of resource defined by the selected variant.

In accordance with some embodiments, the system architecture may include a Register Transfer Level data path circuit and a Register Transfer Level control timing sequence. The Register Transfer Level data path circuit may be configured to generate output data as a result of performing a sequence of operations on data using Register Transfer Level modules, where the Register Transfer Level modules include the number of each kind of resources represented by the selected variant. Examples of Register Transfer Level modules include registers for storage of data, memory modules, latches for sinking of data, multiplexers and demultiplexers. The Register Transfer Level control timing sequence provides a control configuration for a data path circuit to provide timing and synchronization required by data traversing through the Register Transfer Level modules of the data path circuit.

System 10 is operable to represent the combination of the number of resources R1, . . . Rn of the selected variant in a temporal and a spatial domain using a sequencing and binding graph and a plurality of registers. System 10 is operable to determine a multiplexing scheme for the resources R1, . . . Rn of the selected variant, with inputs, outputs, operations, interconnections and time steps. System 10 is operable to produce the Register Transfer Level data path circuit using the multiplexing scheme System 10 is operable to produce an integrated circuit, such as a FPGA or ASIC for example, using the system architecture.

Referring now to FIGS. 7, 8, 9 and 10 there is shown flow chart diagrams of methods 130*a*, 154*a*, 154*b*, 130*b* of sorting the variants of the design space to generate a universe of discourse set in accordance with embodiments described herein. As explained herein these methods 130*a*, 154*a*, 154*b*, 130*b* may also be used to generate an ordered list of variants by sorting the set of variants determined based on the intersection of the satisfying sets, with respect to a particular optimization parameter, such as the final optimization parameter or other optimization parameter.

Figure 7:
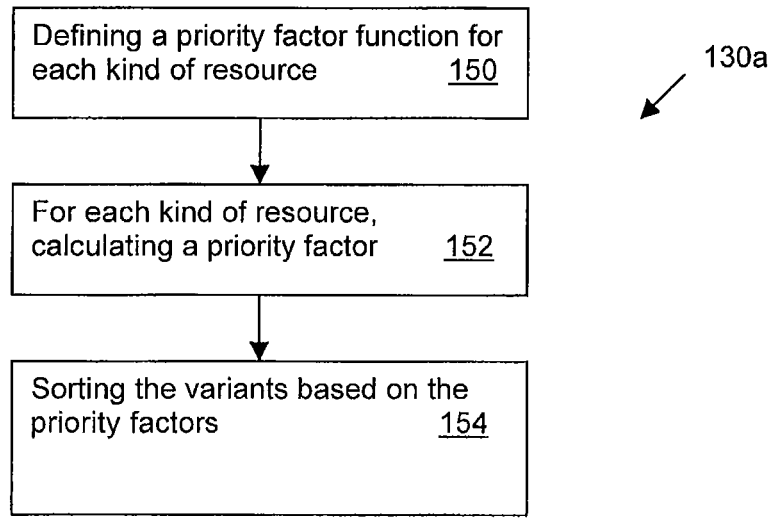
FIG. 7 illustrates a flow chart of a method of generating a universe of discourse set in accordance with embodiments described herein.

Referring to FIG. 7, at step 150, for each of the plurality of optimization parameters, system 10 is operable to define a priority factor function for each kind of resource R1, . . . Rn. A priority factor function defines a rate of change of the optimization parameter with respect to a change in a number $N_R$, of the corresponding kind of resource Ri, $1 \le i \le n$. Examples of priority factor functions, including an analysis as to how the priority factor functions are derived, are described in detail in the Applicants' U.S. patent application Ser. No. 12/974,925 filed Dec. 21, 2010, the entire contents of which is hereby incorporated by reference.

The term Priority Factor (PF) will be used herein as an example approach to sorting the variants of the design space. The PF may be used as a determining factor which helps judge the influence of a particular resource on the variation of the optimization parameters such as area, time of execution, power consumption, and so on. System 10 is operable to use the PF will be used later to organize the architecture design space consisting of variants in increasing or decreasing order of magnitude.

The optimization parameters may include hardware area, cost, time of execution, and power consumption, each of which may be defined by a optimization parameter function. As explained in Applicants' U.S. patent application Ser. No. 12/974,925 filed Dec. 21, 2010, system 10 is operable to generate the priority factor functions by applying partial derivatives to the optimization parameter function and by using the theory of approximation by differentials.

An optimization parameter may be hardware area of a total number of all kinds of resources R1, . . . Rn. As an example, the total hardware area may be represented by the following function (6):

$$A = \Sigma A(R_i) \tag{6}$$

where A represents the hardware area of the total number of all kinds of resources R1, . . . Rn, A(Ri) is the hardware area of the total number of resource Ri, where Ri denotes a resource available to construct the system architecture, $1 \le i \le n$.

Area can be expressed as the sum of the resources i.e. adder/subtractor, multiplier, divider etc and also the clock frequency oscillator. Therefore for a system with 'n' functional resources equation (6) can also be represented as shown in equation (7):

$$A = (N_{R1} \cdot K_{R1} + N_{R2} \cdot K_{R2} + \ldots + N_{Rn} \cdot K_{Rn}) + A(R_{clk}) \quad (7)$$

Where $N_{Ri}$ represents the number of resource $R_i$ and '$K_{Ri}$' represents the area occupied per unit resource 'Ri' (1<=i<=n);

For the optimization parameter hardware area, the system 10 is operable to define for hardware area a priority factor function of each kind of resource R1, ... Rn that is an indicator of a change of area contributed by a change in the number of the kind of resource Ri, wherein 1≤i≤n. System 10 uses the optimization parameter hardware area to determine how a variation in area is affected by the change of a number of a certain resource so the priority factor for hardware area may be the rate of change of area with respect to the change in a number of resources.

For example, for the hardware area, system 10 is operable to define the priority factor for each kind of resource R1, ... Rn that is not a clock oscillator as a function of $N_{Ri}$, $\Delta N_{Ri}$, $K_{Ri}$ wherein $N_{Ri}$ is the number of the kind of resource Ri, $K_{Ri}$ is an area occupied per unit resource Ri, $\Delta N_{Ri}$ is the difference in number of a maximum and minimum resource Ri, $\Delta N_{Ri} \cdot K_{Ri}$ is a change of area contributed by the kind of resource Ri, wherein Ri is a member of the kinds of resources R1, ... Rn. For each resource Ri that is a clock oscillator system 10 is operable to define the priority factor as a function of $\Delta A(R_{clk})$, $N_{Rclk}$, $R_{clk}$, wherein $R_{clk}$ is a clock oscillator used to construct the system architecture, $\Delta A(R_{clk})$ is a change of area occupied by clock oscillators, $N_{Rclk}$ is a number of clock oscillators.

As a specific example, for the hardware area, system 10 is operable to use a priority factor (8) for each kind of resource R1, ... Rn that is not a clock oscillator of the form:

$$PF(Ri) = \frac{\Delta N_{Ri} \cdot K_{Ri}}{N_{Ri}} \quad (8)$$

For the hardware area, system 10 is operable to use a priority factor function (9) of resource Ri that is a clock oscillator of the form:

$$\frac{\Delta A(R_{clk})}{N_{Rcl}} \quad (9)$$

Another optimization parameter may be a time of execution of a total number of all kinds resources R1, ... Rn. The time of execution can be represented by the following optimization parameter function (10):

$$T_{exe} = [L + (D-1) \cdot T_c] \cdot T_p \quad (10)$$

where L represents latency of execution, $T_c$ represents the cycle time, D represents the number of data elements to be processed, and $T_p$ represents the time period of the clock.

For the time of execution, system 10 is operable to use a priority factor function for each kind of resource R1, ... Rn that is a function of the rate of change of a cycle time with a change in the number $N_{Ri}$ of the kind of resources Ri at a maximum clock period, wherein 1≤i≤n and Ri is a member of the kinds of resources R1, .... Rn.

For example, system 10 is operable to use a priority factor function for the time of execution of the resources R1, ... Rn that is not a clock oscillator that is a function of $N_{Ri}$, $T_{Ri}$, $T_p^{max}$, wherein $N_{Ri}$ is the number of the kind of resource Ri, $T_{Ri}$ a number of clock cycles required by the kind of resource Ri to finish each operation, $T_p$ is the time period of the clock, $T_p^{max}$ is the maximum clock period. For resource Ri that is a clock oscillator, system 10 is operable to use a priority factor function that is a function of $R_{clk}$, $N_{Ri}$, $T_{Ri}$, $R_{clk}$, $N_{Rclk}$, where $R_{clk}$ is a clock oscillator used to provide necessary clock frequency to the system, $N_{Ri}$ is the number of the kind of resource Ri, $N_{Rclk}$ is the number of clock oscillators, $T_{Ri}$ a number of clock cycles required by the kind of resource Ri to finish each operation.

As a specific example, system 10 is operable to use a priority factor function (11) for the time of execution of the resources R1, ... Rn that is not a clock oscillator of the form:

$$PF(R_i) = \frac{\Delta N_{Ri} T_{Ri}}{N_{Ri}} (T_p^{max}) \quad (11)$$

System 10 is operable to use a priority factor function (12) of resource Ri that is a clock oscillator of the form:

$$PF(R_{clk}) = \frac{N_{R1} \cdot T_{R1} + N_{R2} \cdot T_{R2} \ldots + N_{Rn} \cdot T_{Rn}}{N_{Rclk}} (\Delta T_p) \quad (12)$$

As another example, for the time of execution, system 10 is operable to use a priority factor function for each kind of resource R1, ... Rn that is a function of a difference between the time of execution when resource Ri, wherein i is of the interval [1,n], is at its minimum value when all other resources are at their maximum value and the time of execution when resource Ri is at its maximum value when all other resources are at their minimum values.

System 10 is operable to use a priority factor function for the time of execution of the resources R1, ... Rn that is not a clock oscillator that is a function $N_{Ri}$, $T_{Rn}^{Max}$, $T_{Rn}^{Min}$ wherein $N_{Ri}$ is the number of the kind of resource Ri, $T_{Rn}^{Max}$ and $T_{Rn}^{Min}$ are the maximum and minimum value of the execution time when resource Rn is maximum and minimum, respectively, at maximum clock frequency all other resources being maximum.

System 10 is operable to use a priority factor function of resource Ri that is a clock oscillator that is a function of $N_{Rclk}$, $T_{Rclk}^{Max}$, $T_{Rclk}^{Min}$ where $N_{Rclk}$ is the number of clock oscillators $T_{Rclk}^{Max}$ and $T_{Rclk}^{Min}$ are maximum and minimum values of execution time when the clock period is maximum and minimum respectively, and all available resources have a maximum value.

As a specific example of such a priority factor function for the time of execution of the resources R1, ... Rn that is not a clock oscillator, system 10 is operable to use a priority factor function (13) of the form:

$$PF(Rn) = \frac{T_{Rn}^{Max} - T_{Rn}^{Min}}{N_{Rn}} \quad (13)$$

System 10 is operable to use a priority factor function (14) for resource Ri that is a clock oscillator of the form:

$$PF(Rclk) = \frac{T_{Rclk}^{Max} - T_{Rclk}^{Min}}{N_{Rclk}} \quad (14)$$

System 10 is operable to determine the $T_{Rn}^{Max}$ in the above equations (13)(14) using the following algorithm.

System 10 is operable to analyze the architecture configuration needed to calculate the $T_{Rn}^{Max}$. By definition '$T_{Rn}^{Max}$' is the maximum execution time at maximum clock frequency when resource 'Rn' is minimum and all other resources being maximum. Therefore the architecture needed to calculate $T_{Rn}^{Max}$ and Rn=1 and rest of the resources Ri=$N_{Max}$, where i=any real integer number (any other resource type) except n (i≠n), $N_{Max}$=Maximum number of resource Ri specified by the user in the specification and Rclk=Max.

System 10 is operable to use the architecture configuration analyzed above to determine the Latency (L) from the scheduling graph and Cycle time from the pipelined timing diagram for D' sets of pipelined data based on the user specified user module library specifications.

System 10 is operable to determine the $T_{exe}$ using the function (10):

$$T_{exe}=[L+(D-1)\cdot T_c]\cdot T_p$$

where 'L' represents latency of execution, '$T_c$' represents the cycle time, 'D' denotes the number of data elements to be processed and '$T_p$' is the time period of the clock.

System 10 is operable to determine the $T_{Rn}^{Min}$ in the above equation by implementing the following algorithm:

System 10 is operable to analyze the architecture configuration needed to calculate $T_{Rn}^{Min}$. Based on the definition, the architecture needed to calculate $T_{Rn}^{Min}$ is Rn=maximum, rest of the resources Ri=$N_{Max}$ and Rclk=Max; where i=any real integer number (any other resource type) except n (i≠n) and $N_{Max}$=Maximum number of resource Ri specified by the user in the specification.

System 10 is operable to use the architecture configuration analyzed to determine the Latency L from the scheduling graph and cycle time from the pipelined timing diagram for the application for 'D' sets of pipelined data based on the user specified user module library specifications.

System 10 is operable to determine the $T_{exe}$ using the function (10):

$$T_{exe}=[L+(D-1)\cdot T_c]\cdot T_p$$

Where 'L' represents latency of execution, '$T_c$' represents the cycle time, 'D' denotes the number of data elements to be processed and '$T_p$' is the time period of the clock.

System 10 is operable to determine the $T_{Rclk}^{Max}$ in the above equations (13) (14) by analyzing the architecture configuration needed to calculate the $T_{Rclk}^{Max}$. By definition '$T_{Rclk}^{Max}$' is the maximum execution time, when resource 'Rclk' is minimum clock frequency and all other resources are maximum. Therefore the architecture required to calculate $T_{Rclk}^{Max}$ is Rclk=Minimum clock frequency (Maximum clock period), rest of the resources Ri=$N_{Max}$, where i signifies any resource type except 'clk' (i≠clk) and $N_{Max}$=Maximum number of resource Ri specified by the user in the specification.

System 10 is operable to determine the Latency and Cycle time for the application for 'D' sets of pipelined data based on the user specified user module library specifications using the architecture configuration analyzed.

System 10 is operable to determine the $T_{exe}$ using the function (10):

$$T_{exe}=[L+(D-1)\cdot T_c]\cdot T_p$$

where 'L' represents latency of execution, '$T_c$' represents the cycle time, 'D' denotes the number of data elements to be processed and '$T_p$' is the time period of the clock.

System 10 is operable to determine the $T_{Rclk}^{Min}$ in the above equation by analyzing the architecture configuration needed to calculate the $T_{Rclk}^{Min}$. By definition: '$T_{Rclk}^{Min}$' is the minimum execution time, when resource 'Rclk' is maximum clock frequency and all other resources being maximum. Therefore the architecture needed to calculate $T_{Rclk}^{Min}$ is Rclk=Maximum clock frequency (Minimum clock period), rest of the resources Ri=$N_{Max}$; where i signifies any resource type except 'clk' (i≠clk) and $N_{Max}$=Maximum number of resource Ri specified by the user in the specification.

System 10 is operable to determine the Latency and Cycle time for the application for 'D' sets of pipelined data based on the user specified user module library specifications using the architecture configuration analyzed above.

System 10 is operable to determine the $T_{exe}$ using the function (10):

$$T_{exe}=[L+(D-1)\cdot T_c]\cdot T_p$$

where 'L' represents latency of execution, '$T_c$' represents the cycle time, 'D' denotes the number of data elements to be processed and '$T_p$' is the time period of the clock.

The above priority factor functions for time of execution indicate the average change in execution time with the change in number of a particular resource and change in clock frequencies, respectively. System 10 is operable to use a priority faction function to calculate a real number, which may be referred to as a priority factor, which represents the extent to which a change in number of a particular resource contributes to the change in execution time.

Another optimization parameter is a power consumption of the resources R1, . . . Rn. The total power consumption of the resources R1, . . . Rn can be represented by the following function (15):

$$P = \sum_{i=1}^{n} (N_{Ri} \cdot K_{Ri}) \cdot p_c \quad (15)$$

where $N_{Ri}$ is the number of resource Ri, $K_{Rn}$ is an area occupied per unit of resource Ri, and $p_c$ is power consumed per area unit resource at a particular frequency of operation.

For power consumption, system 10 is operable to use a priority factor function for each kind of resource R1, . . . Rn that is a function of a change in power consumption per unit area due to deviation of clock frequency from maximum to minimum and a change in the number $N_{Ri}$ of the kind of resource Ri at maximum clock frequency, where 1≤i≤n, and Ri is a member of the kinds of resources R1, . . . Rn.

For power consumption, the priority factor function may indicate the rate of change in the total power consumption with the change in the number of resources at maximum clock frequency, in accordance with embodiments described herein. The maximum clock frequency may be considered because the total power consumption is maximum at this frequency. Hence, the change in the number of a specific resource at maximum clock frequency will influence the change in the total power consumption the most, compared to the change at other clock frequencies.

For the power consumption optimization parameter, for the resources R1, . . . Rn that is not a clock oscillator, system 10 is operable to use a priority factor function that is a function of $N_{Ri}$, $K_{Rn}$, $\Delta N_{Ri}$, $(p_c)^{max}$, $p_c$ where $N_{Ri}$ is the number of resource Ri, $K_{Rn}$ is an area occupied by resource Ri, $\Delta N_{Rn} \cdot K_{Rn}$ is a change of area contributed by resource Ri, $p_c$ is power consumed per area unit resource at a particular frequency of operation, $(p_c)^{max}$ is power consumed per area unit resource at a maximum clock frequency. For resource Ri that is a clock oscillator, system 10 is operable to use a priority factor function that is a function of $N_{Ri}$, $T_{Ri}$, $R_{clk}$, $N_{Rclk}$, $p_c$ where $R_{clk}$ is a clock oscillator used to provide necessary clock frequency to the system, $N_{Ri}$ is of the number of the kind of resource Ri, $T_{Rn}$ a number of clock cycles required by resource Ri to finish each operation, $p_c$ is power consumed per area unit of resource at a particular frequency of operation.

For power consumption, as a specific example, for resources R1, . . . Rn that is not a clock oscillator, system 10 is operable to use a priority factor function (16) of the form:

$$PF(Ri) = \frac{\Delta N_{Ri} \cdot K_{Ri}}{N_{Ri}} (p_c)^{max} \qquad (16)$$

For resource Ri that is a clock oscillator, system 10 is operable to use a priority factor function (17) of the form:

$$PF(Rclk) = \frac{N_{R1} \cdot T_{R1} + N_{R2} \cdot T_{R2} \ldots + N_{Rn} \cdot T_{Rn}}{N_{Rclk}} (\Delta p_c) \qquad (17)$$

Another example optimization parameter is a total cost of the total number of all kinds resources R1, . . . Rn.

As noted herein the total area can be defined by the following functions (18) (19):

$$A = \Sigma A(Ri) \qquad (18)$$

$$A = (N_{R1} \cdot K_{R1} + N_{R2} \cdot K_{R2} + \ldots + N_{Rn} \cdot K_{Rn}) + A(R_{clk}) + N_{RM} \cdot K_{Rm} \qquad (19)$$

where 'NRi' represents the number of resource 'Ri', '$K_{Ri}$' represents the area occupied per unit resource 'Ri', '$N_{RM}$' represents the number of memory elements present (such as registers) and '$K_{RM}$' represents the area occupied by each memory element. Let the total cost of all resources in the system is '$C_R$'. Further, cost per area unit of the resource (such as adders, multipliers etc) is given as '$C_{Ri}$', the cost per area unit of the clock oscillator is '$C_{Rclk}$' and finally the cost per area unit of memory element is '$C_{RM}$'. Therefore total cost of the resources may be defined by the following function (20):

$$C_R = (N_{R1} \cdot K_{R1} + N_{R2} \cdot K_{R2} + \ldots + N_{Rn} \cdot K_{Rn}) \cdot C_{Ri} + A(R_{clk}) \cdot C_{Rclk} + N_{RM} \cdot K_{RM} \cdot C_{RM} \qquad (20)$$

For the total cost, the priority factor function for each kind of resource R1, . . . Rn is an indicator of change in total cost of the total number of all kinds resources R1, . . . Rn with respect to a change in the number of the kind of resource Ri and the cost per unit resource, where $1 \leq i \leq n$.

For the cost, the priority factor function for each kind of the resources R1, . . . Rn that is not a clock oscillator may be a function of $N_{Ri}$, $K_{Ri}$, $\Delta N_{Ri}$, $C_{Ri}$, wherein $N_{Ri}$ is the number of the kind of resource Ri, $K_{Ri}$ is an area occupied by the kind of resource Ri, $\Delta N_{Ri} \cdot K_{Ri}$ is a change of area contributed by the kind of resource Ri, $C_{Ri}$ is the cost per area unit of the kind of resource Ri. For the cost, the priority factor function of resource Ri that is a clock oscillator may be a function of $R_{clk}$, $N_{Rclk}$, $\Delta A(R_{clk})$, $C_{Rclk}$, wherein $R_{clk}$ is a clock oscillator used to provide necessary clock frequency to the system, $\Delta A(R_{clk})$ is a change of area occupied by clock oscillators, $N_{Rclk}$ is a total number of clock oscillators available to construct the system architecture, $C_{Rclk}$ is the cost per area unit of clock oscillators.

As a specific example, for the cost, the priority factor function (21) for each kind of the resources R1, . . . Rn that is not a clock oscillator may be of the form:

$$PF(Ri) = \frac{\Delta N_{Ri} \cdot K_{Ri} \cdot C_{Ri}}{N_{Ri}} \qquad (21)$$

The priority factor function (22) of resource Ri that is a clock oscillator may be of the form:

$$PF(R_{clk}) = \frac{A(R_{clk}) \cdot C_{Rclk}}{N_{Rclk}} \qquad (22)$$

At step 152, for each of the plurality of optimization parameters, system 10 is operable calculate a priority factor for each kind of resource R1, . . . Rn available to construct the system architecture, using the corresponding priority factor function for the respective optimization parameter. The priority factors provide a measure of the change in an optimization parameter with the change in number of a specific kind of resource.

At step 154, system 10 is operable to sort the variants of the design space to generate the universe of discourse set based on a relative magnitude of the calculated priority factors.

Figure 8:
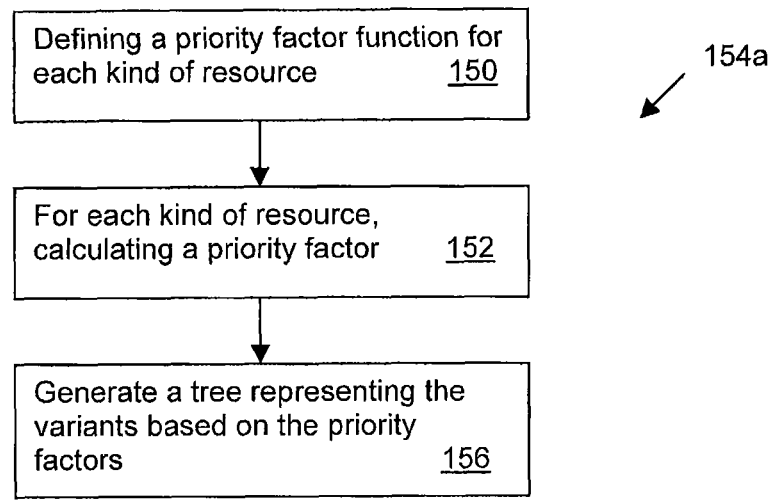
FIG. 8 illustrates a flow chart of a method of sorting the design space based on priority factors in accordance with embodiments described herein.

As an example of sorting based on the relative magnitude of the calculated priority factors, referring to FIG. 8, at step 156, system 10 is operable to generate a tree representing the sorted design space based on the priority factors.

System 10 is operable to generate the tree by, for each optimization parameter, assigning to the kind of resource Ri with the highest priority factor a level one of the tree represented by a root node with maxN$_R$; branches, as each branch represents a variant for that kind of resource. Further, system 10 is operable to, for the kind of resource Rm with the next highest priority factor, assign a level two of the tree represented by nodes at each branch extending from the level 1 above. Each node in level two has maxN$_{Rm}$ branches, as each branch represents a variant for that kind of resource Rm. System 10 is operable to continue to assign a tree level to each kind of resource in this manner until level n is assigned to a kind of resource R1 . . . Rn. Finally system 10 represents all variants as nodes at level n+1 of the tree, with a node at each branch extending from the level n above. That is, the number of branches extending from level n should correspond to the number of variants in the design space.

Figure 9:
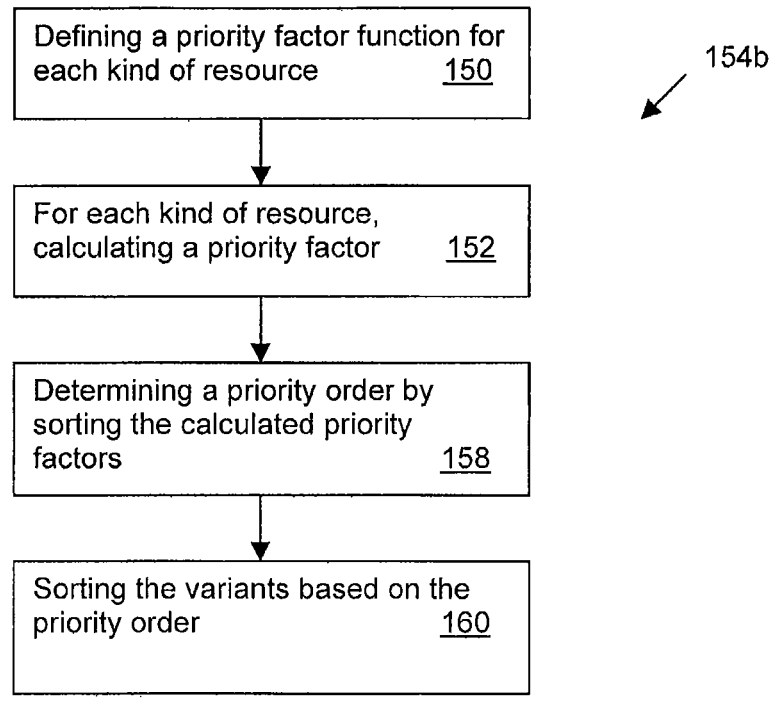
FIG. 9 illustrates a flow chart of another method of sorting the design space based on priority factors in accordance with embodiments described herein.

As another example of sorting based on the relative magnitude of the calculated priority factors, referring to FIG. 9, at step 158, system 10 is operable to determine a priority order for the respective optimization parameter by sorting the calculated priority factors based on a relative magnitude of the calculated priority factors. For example, according to the priority factors calculated, the priority order may be arranged so that the resource with the lowest priority factor is assigned the highest priority order while the resource with the highest priority factor is assigned the lowest priority order. The priority order of the resources increases with the decrease in priority factor of the resources.

At step 160, system 10 is operable to sort the variants of the design space to generate the universe of discourse set based on the priority order for the respective optimization parameter. Further, system 10 is operable to select the selected variant using the priority order for the final optimization parameter.

Figure 12:
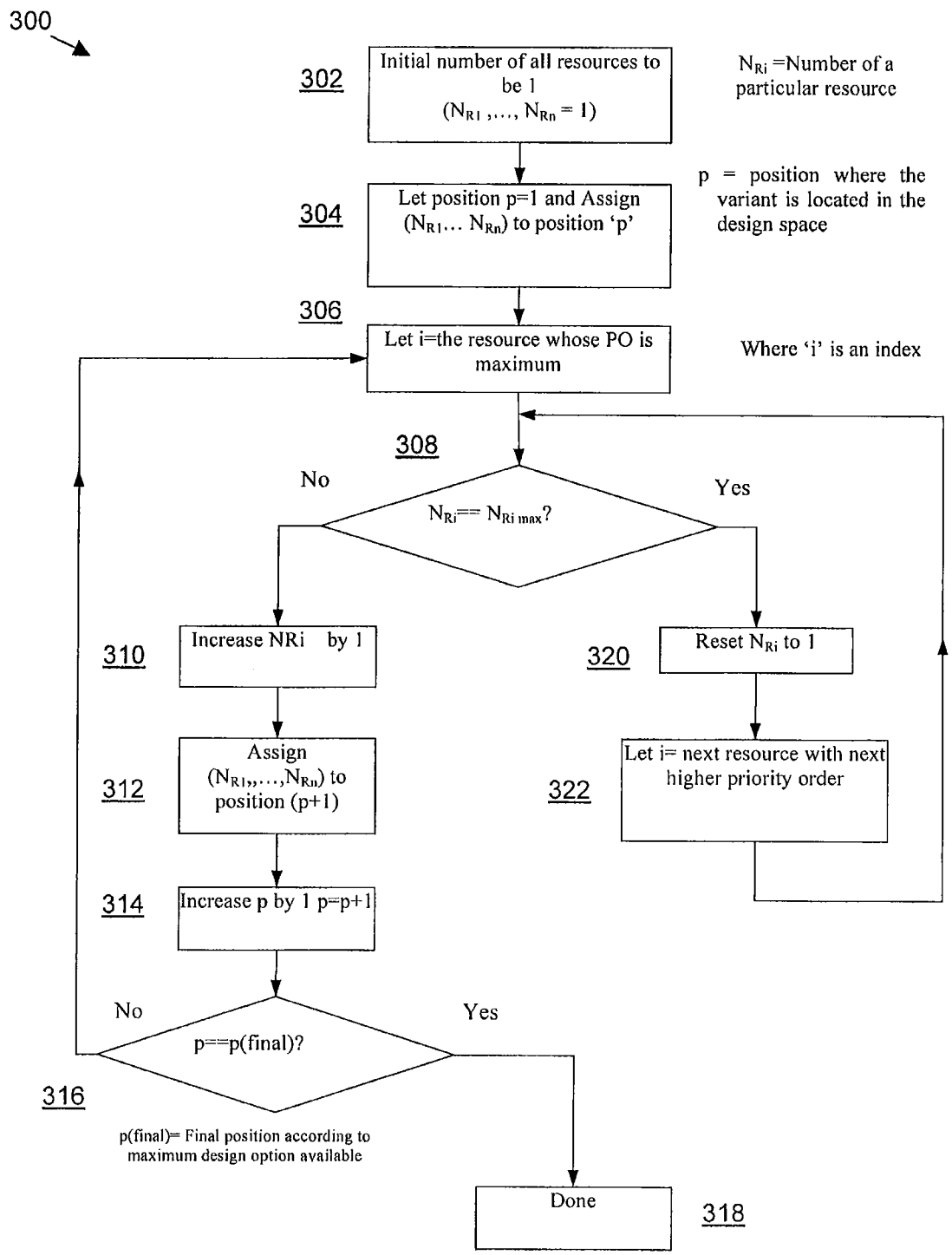
FIG. 12 illustrates a flow chart of a method of generating a universe of discourse set in accordance with an example embodiment.

Referring now to FIG. 12, which illustrates flow chart of a method 300 for generating an ordered list of vectors by arranging the random design space in an organized increasing order for the power consumption parameter in accordance with an example embodiment. The arrangement is based on priority order (PO) sequencing from step 158 (FIG. 9). In this example, the variants will be placed in such a way that the variant first in the set will have the least/greatest value for the respective optimization parameter and the variant last in the set will have the greatest/least value for the respective optimization parameter.

Let $N_{Ri}$ represent the number of a particular resource Ri, and at step 302, the initial number of all kinds of resources is set to one, $N_{R1}, \ldots N_{Rn}=1$.

Let position 'p' represent the position where a particular variant vector is located within the arranged design space, and at step 304, the position 'p' is set to one (p=1) and the variant vector $(N_{R1}, \ldots N_{Rn})$ is assigned to position 'p'.

Let 'i' be an index, and at step 306, 'i' represents the resource whose PO is maximum.

Let $N_{Rimax}$ (also referred to herein as $maxN_{Ri}$) represent the maximum number of a kind of resource Ri, at step 308, it is determined whether $N_{Ri}=N_{Rimax}$.

If $N_{Ri}$ does not equal $N_{Rimax}$, then at step 310, $N_{Ri}$ is increased by one.

At step 312, variant vector $(N_{R1}, \ldots N_{Rn})$ is assigned to position 'p+1'.

At step 314, position 'p' is increased by one, p=p+1.

Let p(final) be the final position according to the maximum number of design options available, which is the number of vectors of the design space, and at step 316, it is determined whether p=p(final).

If p does not equal p(final) then method 300 returns to step 306.

If p does equal p(final) then method 300 proceeds to step 318 and ends.

If $N_{Ri}$ equals $N_{Rimax}$, then at step 320, $N_{Ri}$ is reset to one.

At step 322, i represents the next resource with the next higher PO, and the method returns to step 308.

Figure 10:
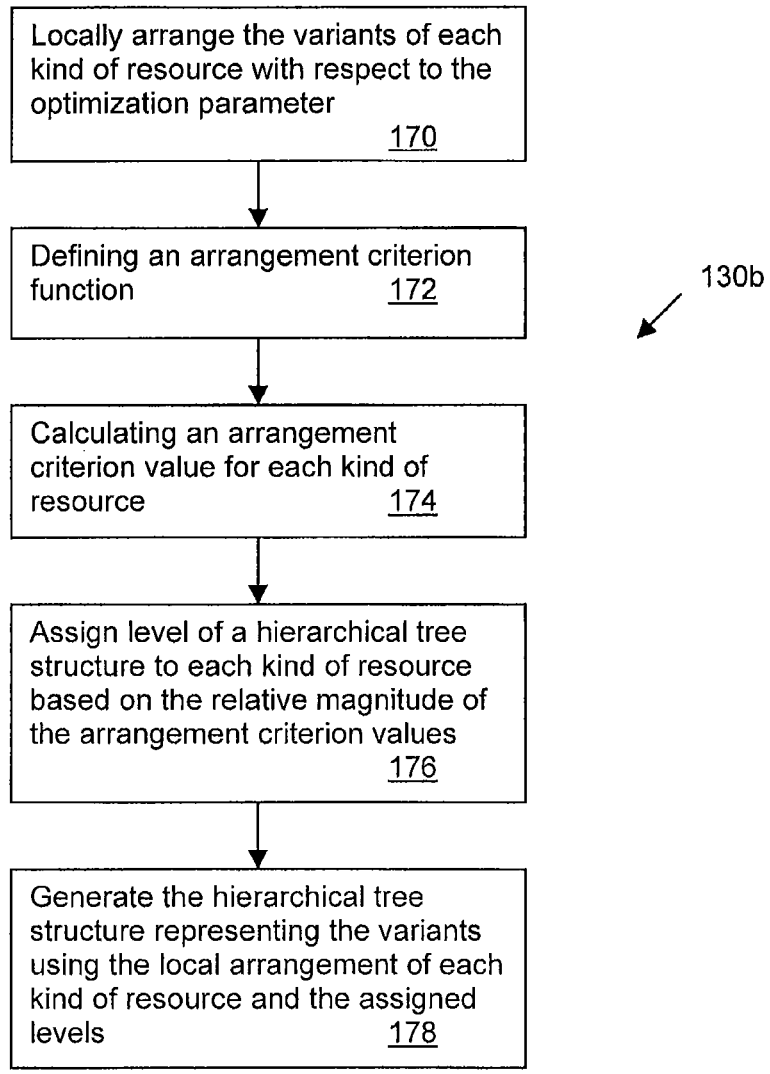
FIG. 10 illustrates a flow chart of a method of generating a universe of discourse set in accordance with embodiments described herein.

Referring now to FIG. 10, there is shown another example sorting method 130b for generating the universe of discourse set. This method sorts the variants in order, increasing or in some cases decreasing order depending on the optimization parameter, using a hierarchical tree structure.

At step 170, system 10 is operable to locally arrange the variants of each kind of resource Ri in order (decreasing or in some cases increasing depending on the optimization parameter) with respect to optimization parameter. For each kind of resource Ri, system 10 is operable to arrange the variants in increasing order by number of that kind of resource from 1 to $MaxN_{Ri}$.

At step 172, system 10 is operable to define an arrangement criterion function for arranging each kind of resource. In accordance with some embodiments, system 10 is operable to define one arrangement criterion function for use in relation to all types of optimization parameters. The arrangement criterion function may be based on a value of the optimization parameter with the maximum number of resources, a value of the optimization parameter with the minimum number of resources, and the number of variants of the respective kind of resource.

For example, for all types of optimization parameters and for each kind of resource, system 10 is operable to use the following arrangement criterion function (23):

$$K(Ri) = \frac{P_{smax}(Ri) - P_{smin}(Ri)}{mi - 1} \quad (23)$$

where $P_{smax}$ represents the value of the optimization parameter with the maximum number of resources, $P_{smin}$ represents the value of the optimization parameter with a critical variant configuration, and mi is the number of variants of resource Ri. The critical variant configuration may be a function of the minimum number of resource Ri with the maximum number of all others kinds of resources.

At step 174, system 10 is operable to calculate an arrangement criterion value for each kind of resource using the arrangement criterion function.

At step 176, system 10 is operable to assign a level of a hierarchical tree structure to each kind of resource based on the relative magnitude of the arrangement criterion values. For example, system 10 is operable to assign the kind of resource with the highest value to level 1, the kind of resource with the second highest value to level 2, and so on.

At step 178, system 10 is operable to generate a hierarchical tree structure based on the relative magnitude of the calculated arrangement criterion values. System 10 is operable to generate the tree structure as described at step 156 of FIG. 8 except system 10 uses the relative magnitude of the calculated arrangement criterion values instead of the relative magnitude of the priority factor functions. Each leaf node (node with no children branches) at level n+1 represents a variant of the design space (partial or full) that is sorted in increasing/decreasing order of magnitude with respect to the optimization parameter from left to right. The branches from each level of nodes represent the variants of the kind of resource corresponding to that level in order as per the local arrangement determined at step 170, namely 1 to $maxN_{Ri}$. Each variant is determined based on the path from the root node at level 1 to the leaf node that corresponds to the variant, where each branch represents the number of a kind of resource that corresponds to the level of node the branch stems from in the hierarchical tree structure.

An illustrative example will be explained with reference to FIGS. 2 to 9.

Referring to FIG. 2, at step 102, system 10 defines the following resource constraints based on specifications received as input data, where each resource constraint corresponds to a maximum number $N_{Ri}$, $1 \leq i \leq n$, of each kind of resource R1, ... Rn available to construct the system architecture:

3 adder/subtractor units.
    4 multiplier units
    2 clock frequency oscillators: 50 MHz and 200 MHz The following example specifications are also received by system 10 for each kind of resource R1, ... Rn:

No. of clock cycles needed for multiplier to finish each operation: 4 clock cycles (cc)
    No. of clock cycles needed by the adder/subtractor: 2 cc
    Area occupied by each adder/subtractor: 20 area units (a.u.) on the chip. (e.g. 20 CLB on an FPGA)
    Area occupied by each multiplier: 100 a.u. on the chip. (e.g. 100 CLB on an FPGA)
    Area occupied by the 50 MHz clock oscillator: 4 a.u.
    Area occupied by the 200 MHz clock oscillator: 10 a.u.
    Power consumed at 50 MHz: 10 milli-watt (mW)/a.u.
    Power consumed at 200 MHz: 40 mW/a.u.

At step 104, system 10 defines the following constraint values for each of at least three optimization parameters based on received input data:

Maximum power consumption: 8 W
Maximum time of execution: 140 μs (For 1000 sets of data)
Hardware area of resources: Minimum while satisfying the above constraints.

In this illustrative example, power consumption, time of execution and hardware area of the resources are three optimization parameters with constraint values to be satisfied. In this example, hardware area is the final optimization parameter as its constraint value is defined as a minimum value while satisfying the other constraint values, so a satisfying set of variants cannot be determined for this optimization parameter independently of the other optimization parameters. Hardware area typically is a major design objective, but for the current generation of multi objective VLSI computing systems such as the portable devices (e.g. mp3 players, PDA's, mobile etc), power consumption may also act a major design constraint. Hence power consumption has been used as an example for an optimization parameter with a specified constraint value. This is an arbitrary example only and execution time, power or cost may be used as final optimization parameters.

During the problem formulation stage for high level synthesis the mathematical model of the application may be used to define the behavior of the algorithm. The model suggests the input/output relation of the system architecture and the data dependency present in the function. For this illustrative example a digital IIR Butterworth filter may be used as a benchmark to demonstrate the design space exploration approach in accordance with embodiments described herein. The choice of the IIR Butterworth filter is arbitrary and other filters may be used. The transfer function of a second order digital IIR Butterworth filter can be given as:

$$H(z) = \frac{Y(z)}{X(z)} = \frac{z^3 + 3z^2 + 3z + 1}{6z^3 + 2z} \quad (24)$$

$$y(n) = 0.167x(n) + 0.5x(n-1) + 0.5x(n-2) + 0.167x(n-3) - 0.33y(n-2) \quad (25)$$

where H(z) denotes the transfer function of the filter in the frequency domain and x(n), x(n−1), x(n−2), x(n−3) represent the input variables for the filter respectively in time domain, y(n) and y(n−2) represent the present output of the filter and the previous output of the filter in the time domain.

At step 106, system 10 defines the design space for this illustrative example as follows:

| |
|---|
| V1 = (1, 1, 1) |
| V2 = (1, 2, 1) |
| V3 = (1, 3, 1) |
| V4 = (1, 4, 1) |
| V5 = (1, 1, 2) |
| V6 = (1, 2, 2) |
| V7 = (1, 3, 2) |
| V8 = (1, 4, 2) |
| V9 = (2, 1, 1) |
| V10 = (2, 2, 1) |
| V11 = (2, 3, 1) |
| V12 = (2, 4, 1) |
| V13 = (2, 1, 2) |
| V14 = (2, 2, 2) |
| V15 = (2, 3, 2) |
| V16 = (2, 4, 2) |
| V17 = (3, 1, 1) |
| V18 = (3, 2, 1) |
| V19 = (3, 3, 1) |
| V20 = (3, 4, 1) |

-continued

| |
|---|
| V21 = (3, 1, 2) |
| V22 = (3, 2, 2) |
| V23 = (3, 3, 2) |
| V24 = (3, 4, 2) |

At step 108, system 10 determines a satisfying set of vectors for the optimization parameters that are not the final optimization parameter, namely, power consumption and time of execution. As noted herein, in accordance with some embodiments, system 10 is operable to determine satisfying set of vectors for all the optimization parameters and at step 110 determine a set of vectors based on the intersection of the satisfying set of vectors for all the optimization parameters.

System 10 is operable to determine a satisfying set of variants as described in FIG. 4 for each optimization parameter, except the final optimization parameter. At step 130, system is operable to sort the design space to generate a universe of discourse set. As described herein system 10 is operable to sort the design space using a variety of methodologies.

As an illustrative example, system 10 is operable to sort the design space as described in FIGS. 7 to 9.

System 10 implements steps 150 and 152 for each optimization parameter except for the final optimization parameter, which for this example are power consumption and time of execution.

At step 150, system 10 defines the priority factor function for the optimization parameters power consumption as per equations (16) (17) described herein and reproduced below for ease of reference:

$$PF(Rn) = \frac{\Delta N_{Rn} \cdot K_{Rn}}{N_{Rn}} \cdot (p_c)^{max} \quad (16)$$

$$PF(Rclk) = \frac{N_{R1} \cdot T_{R1} + N_{R2} \cdot T_{R2} + \ldots + N_{Rn} \cdot T_{Rn}}{N_{Rclk}} \cdot (\Delta p_c) \quad (17)$$

'$N_{Ri}$' represents the number of resource of the kind of resource Ri, '$K_{Ri}$' represents the area occupied per unit resource Ri and '$p_c$' denotes the power consumed per area unit resource at a particular frequency of operation. Where '$T_{Ri}$' represents the number of clock cycles needed by resource 'Ri' (1<=i<=n) to finish each operation. In the above equations, the maximum clock frequency was considered because the total power consumption is maximum (i.e. $(p_c)^{max}$) at this frequency. Hence, the change in the number of a specific resource at maximum clock frequency will influence the change in the total power consumption (P) the most, compared to the change at other clock frequencies. $\Delta p_c$ is the difference in power consumption at maximum and minimum frequency.

At step 152, for each kind of resource available to construct the system architecture, system 10 calculates a priority factor using the priority factor function for the power consumption optimization parameter. For power consumption optimization parameter, system 10 calculates the following priority factors for each kind of resource:

For resource adder/subtractor (R1): PF(R1)=533.33
For resource multiplier (R2): PF(R2)=3000
For resource clock oscillator ($R_{clk}$): PF(Rclk)=6900

At step 154, system 10 sorts the variants of the design space based on the calculated priority factors for each kind of resource in order to generate the universe of discourse set.

Referring now to FIG. 8, there is shown an example method 154a of sorting the variants of the design space based on the priority factors. At step 156, system 10 generates a hierarchical tree structure 250 (FIG. 11) representing the universe of discourse set based on the priority factors by assigning a level of the tree to each resource based on the relative magnitude of the corresponding calculated priority factor.

In order to generate the hierarchical tree structure, system 10 is operable to assign the resource type with highest priority factor at Level L1 represented as a root node with branches corresponding to each of its variants. The resource type with next highest priority factor at L2 with all its variants as branches, continuing in this manner until system 10 reaches the resource type with lowest priority factor and assigns it last level of the tree with all its variants as branches of the tree. The hierarchical tree structure represents the sorted variants as leaf nodes from the branches of the last assigned level.

Since the priority factor for resource Rclk is the highest it is assigned level L1 of the hierarchical tree structure. Since the priority factor for resource R2 multiplier is the next highest hence it is assigned level 2 of the hierarchical tree structure. Finally, the priority factor for resource (R1) adder/subtractor is the lowest so it is assigned the last level of the hierarchical tree structure.

After assigning levels to each kind of resource, system 10 is operable to construct a representation of the hierarchical tree structure based on the assigned levels.

Figure 11:
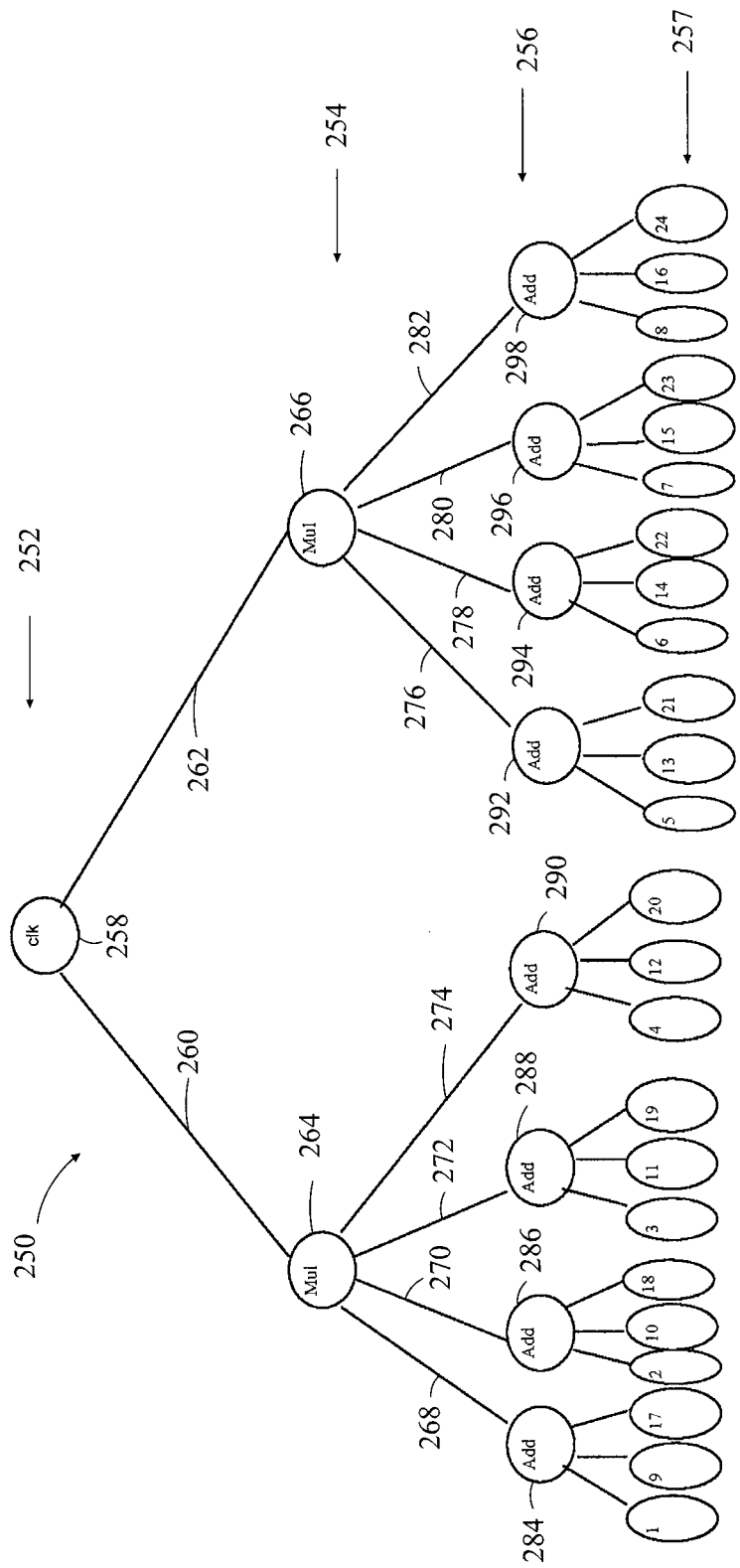
FIG. 11 illustrates an example hierarchical tree structure in accordance with embodiments described herein.

Referring now to FIG. 11, there is shown a representation of the hierarchical tree structure 250 for the power consumption optimization parameter for this example in accordance with embodiments described herein.

In this example, system 10 constructs a hierarchical tree structure 250 with three levels L1 252, L2 254, L3 256. The resource Rclk is assigned L1 252 and is represented as a root node 258 with two branches 260, 262 since it has two variants. The resource R2 multiplier is assigned L2 254 and is represented as two nodes 264, 266 (corresponding to the two branches 260, 262). Each of the two nodes 264, 266 has four branches 268, 270, 272, 274, 276, 278, 280, 282 since the resource R2 multiplier has four variants. The resource R1 adder/subtractor is assigned L3 256 and is represented as eight nodes 284, 286, 288, 290, 292, 294, 296, 298 (corresponding to the eight branches 268, 270, 272, 274, 276, 278, 280, 282). Each of the nodes 284, 286, 288, 290, 292, 294, 296, 298 has three branches since the resource R1 adder/subtractor has three variants.

System 10 uses the hierarchical tree structure 250 to sort the variants of the design space to generate the universe of discourse set. The variants are indicated as the final leaves in the tree as they correspond to the specific combination of resources represented by the path in the tree from root to leaf. That is, each path from L1 to L3 represents a combination of resources, which in turn corresponds to a variant. For example, the path from the resource Rclk at the root node 252 to branch 260 represents the subset of variants with one of resource Rclk and the path from the resource Rclk at the root node 252 to branch 262 represents the subset of variants with two of resource Rclk. The path from resource R2 multiplier node 264 to branch 268 represents that subset of variants with one of resource R2 multiplier, the path from resource R2 multiplier node 264 to branch 270 represents that subset of variants with two of resource R2 multiplier, the path from resource R2 multiplier node 264 to branch 272 represents that subset of variants with three of resource R2 multiplier, and so on. This also applies to the resource R1 adder/substractor nodes 284, 286, 288, 290, 292, 294, 296, 298 and branches that extend to the leaves that correspond to the variants.

Accordingly, the hierarchical tree structure 250 sorts the variants of the design space to generate the following universe of discourse set=(V1, V9, V17, V2, V10, V18, V3, V11, V19, V4, V12, V20, V5, V13, V21, V6, V14, V22, V7, V15, V23, V8, V16, V24).

Referring now to FIG. 9, there is shown another example method 154b of sorting the variants of the design space based on the priority factors.

At step 158, system 10 determines a priority order based on the relative magnitude of the priority factors. For example, system 10 is operable to determine the following priority order for sorting the design variants in increasing order:

$$PO(R1) > PO(R2) > PO(Rclk)$$

System 10 sorts the design space based on the priority order in increasing order from top to bottom for power consumption parameter, as described in FIG. 12. For this example variant n is represented as $Vn=(NR1, NR2, NR3)$. The variables NR1, NR2 and NR3 indicate the number of adder/subtractors, multipliers and clock frequencies, respectively. Therefore according to resource constraints specified $1<=NR1<=3$, $1<=NR2<=4$, and $1<=NR3<=2$.

Referring now to FIG. 10, there is shown another example sorting method 130b for generating the universe of discourse set. This method sorts the variants in order (increasing or decreasing order depending on the optimization parameter) using a hierarchical tree structure.

At step 170, system 10 is operable to locally arrange the variants of each kind of resource Ri in decreasing order with respect to optimization parameter. For each kind of resource Ri, system 10 is operable to arrange the variants in increasing order by number of that kind of resource from 1 to $MaxN_{Ri}$.

At step 172, system 10 is operable to define an arrangement criterion function for arranging each kind of resource. In accordance with some embodiments, system 10 is operable to define one arrangement criterion function for use in relation to all types of optimization parameters. The arrangement criterion function may be based on a value of the optimization parameter with the maximum number of resources, a value of the optimization parameter with the minimum number of resources, and the number of variants of the respective kind of resource.

For example, for all types of optimization parameters and for each kind of resource, system 10 is operable to use the following arrangement criterion function (23):

$$K(Ri) = \frac{P_{smax}(Ri) - P_{smin}(Ri)}{mi - 1} \tag{23}$$

Where $P_{smax}$ represents the value of the optimization parameter with the maximum number of resources, $P_{smin}$ represents the value of the optimization parameter with a critical variant configuration, and mi is the number of variants of resource Ri. The critical variant configuration may be the minimum number of resource Ri with all the maximum number of the all others kinds of resources.

At step 174, system 10 is operable to calculate an arrangement criterion value for each kind of resource using the arrangement criterion function.

For the power consumption parameter, the calculated arrangement criterion are as follows:

For the kind of resource R1 adder/subtractor:

$$K(R1: \text{adder}) = \frac{|18.4 - 16.8|}{3 - 1} = 0.80$$

where the critical variant configuration is 1 Adder/Subtractor, 4 Multipliers and 200 MHz clock frequency. The value $P_{smin}$ is obtained based on $(1*20+4*100)*40=16,800$ mW or 16.8 W. The specifications of each resource may be based on table I described herein and the functions defining the optimization parameters.

For the kind of resource R2 multiplier:

$$K(R2: \text{multiplier}) = \frac{|18.4 - 6.4|}{4 - 1} = 4$$

Where the critical variant configuration is 3 Adder/Subtractor, 1 Multipliers and 200 MHz clock frequency. The value $P_{smin}$ is obtained based on $(3*20+1*100)*40=6,400$ mW or 6.4 W. The specifications of each resource may be based on table I described herein.

For the kind of resource Rclk clock:

$$K(Rclk: \text{clock frequency oscillator}) = \frac{|18.4 - 4.6|}{2 - 1} = 13.8$$

Where the critical variant configuration is 3 Adder/Subtractor, 4 Multipliers and 50 MHz clock frequency. The value $P_{smin}$ is obtained based on $(3*20+4*100)*10=4,600$ mW or 4.6 W. The specifications of each resource may be based on table I described herein.

At step 176, system 10 is operable to assign a level of a hierarchical tree structure to each kind of resource based on the relative magnitude of the arrangement criterion values. For example, system 10 is operable to assign the kind of resource with the highest value to level 1, the kind of resource with the second highest value to level 2, and so on. For this example, system 10 assigns resource Rclk clock to level 1, resource R2 multiplier to level 2, and resource R1 adder/substractor to level 3.

At step 178, system 10 is operable to generate a hierarchical tree structure based on the relative magnitude of the calculated arrangement criterion values. FIG. 11 illustrates the resultant tree structure 250 for the power consumption parameter. Each leaf node (node with no children branches) represents a variant of the design space (partial or full) that is sorted in increasing order of magnitude with respect to the power consumption optimization parameter from left to right. The branches from each level of nodes represent the variants of the kind of resource corresponding to that level in order as per the local arrangement determined at step 170, namely 1 to max-$N_{Ri}$. Each variant is determined based on the path from the root node at level 1 to the leaf node that corresponds to the variant, where each branch represents the number of a kind of resource that corresponds to the level of node the branch stems from in the hierarchical tree structure.

Figure 13:
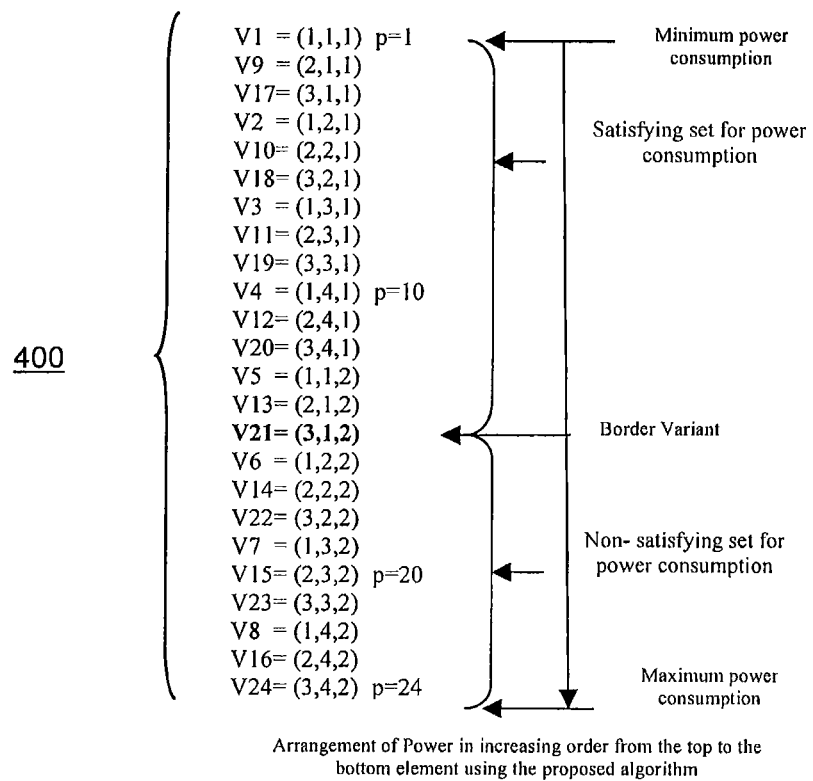
FIG. 13 illustrates a representation of a universe of discourse set in accordance with an example embodiment.

Referring now to FIG. 13, there is shown a universe of discourse set 400 generated by system 10 by sorting variants of the design space as described herein.

Referring back to FIG. 4, after system 10 generates a universe of discourse set, at step 132, system 10 is operable to assign a membership value to each variant in the universe of discourse set.

For this example power consumption optimization parameter, system 10 is operable to calculate a membership value (i) for each variant of the universe of discourse set created based on the function (1):

$$\tau = \frac{x - \alpha}{\beta - \alpha} \quad (1)$$

Where 'x' is the position of the variant in the universe of discourse set; 'τ' represents the assigned membership value of the variant which is the $x^{th}$ position in the universe of discourse set; 'α' and 'β' are the order of the first element and the last element in the universe of discourse set, where 'α' is equal to 1 and 'β' is equal to the total number of variants in the universe of discourse set.

System 10 assign the calculated membership to the variants in the universe of discourse set, where one membership value is assigned to each variant.

Referring back to the example for the power consumption optimization parameter, the following is an example universe of discourse set:

$$\left\{ \begin{array}{cccccccc} \overline{V1}, & \overline{V9}, & \overline{V17}, & \overline{V2}, & \overline{V10}, & \overline{V18}, & \overline{V3}, & \overline{V11}, \\ \overline{V19}, & \overline{V4}, & \overline{V12}, & \overline{V20}, & \overline{V5}, & \overline{V13}, & \overline{V21}, & \overline{V6}, \\ \overline{V14}, & \overline{V22}, & \overline{V7}, & \overline{V15}, & \overline{V23}, & \overline{V8}, & \overline{V16}, & \overline{V24} \end{array} \right\}$$

For each variant in the universe of discourse set, system 10 calculates a membership value (τ) using the function described above. For example, membership value (τ) for:

variant 1:

$$\tau = \frac{x - \alpha}{\beta - \alpha} = \frac{1 - 1}{24 - 1} = 0 \qquad \text{(Position 1)}$$

Variant 9:

$$\tau = \frac{x - \alpha}{\beta - \alpha} = \frac{2 - 1}{24 - 1} = 0.043 \qquad \text{(Position 2)}$$

Variant 17:

$$\tau = \frac{x - \alpha}{\beta - \alpha} = \frac{3 - 1}{24 - 1} = 0.087 \qquad \text{(Position 3)}$$

Variant 2:

$$\tau = \frac{x - \alpha}{\beta - \alpha} = \frac{4 - 1}{24 - 1} = 0.130 \qquad \text{(Position 4)}$$

Variant 10:

$$\tau = \frac{x - \alpha}{\beta - \alpha} = \frac{5 - 1}{24 - 1} = 0.174 \qquad \text{(Position 5)}$$

⋮

Variant 16:

$$\tau = \frac{x - \alpha}{\beta - \alpha} = \frac{23 - 1}{24 - 1} = 0.957 \qquad \text{(Position 23)}$$

Variant 24:

$$\tau = \frac{x - \alpha}{\beta - \alpha} = \frac{24 - 1}{24 - 1} = 1 \quad \text{(Position 24)}$$

After calculating a membership value for each variant in the universe of discourse set, system 10 assigns a calculated membership value to each corresponding variant, and for this example will obtain the following:

$$\left\{ \frac{0}{V1}, \frac{0.043}{V9}, \frac{0.087}{V17}, \frac{0.130}{V2}, \frac{0.174}{V10}, \frac{0.217}{V18}, \frac{0.261}{V3}, \frac{0.304}{V11}, \right.$$
$$\frac{0.348}{V19}, \frac{0.391}{V4}, \frac{0.435}{V12}, \frac{0.478}{V20}, \frac{0.522}{V5}, \frac{0.565}{V13}, \frac{0.609}{V21}, \frac{0.652}{V6},$$
$$\left. \frac{0.696}{V14}, \frac{0.739}{V22}, \frac{0.783}{V7}, \frac{0.826}{V15}, \frac{0.870}{V23}, \frac{0.913}{V8}, \frac{0.957}{V16}, \frac{1}{V24} \right\}$$

For this example, the variants of the design space shown are sorted in increasing order of magnitude from the north extreme to the south extreme. This sorted arrangement helps system 10 to search the universe of discourse set to identify the border variant for the power consumption parameter. The assigned membership values indicate the position of each variant in the universe of discourse set. For example, the first variant (position=1) in the sorted design space is the first element of the fuzzy set (the set of calculated membership values assigned to the variants of the universe of discourse set), the second variant (position=2) in the sorted design space is the second element of the fuzzy set and so on, until last variant of the sorted design space is the last element of the fuzzy set. The universe of discourse with the assigned membership values can be represented by the set shown above.

At step 134, system 10 is operable to determine a satisfying set of variants (or vectors) for the power consumption optimization parameter by determining a border variant. System 10 is operable to identify the border variant by conducting a fuzzy search of the universe of discourse set using the assigned membership values.

Referring to FIG. 5, there is shown a method 134 for conducting a fuzzy search of the universe of discourse set using the assigned membership values.

At step 140, system 10 calculates the initial membership value ($T_{ini}$) based on the minimum and the maximum value of power consumption optimization parameter.

In accordance with some embodiments, system 10 calculates the initial membership value based on equation (5) described above, and reproduced below:

$$\tau_{ini} = \frac{V_{Border} - \text{Min}}{\text{Max} - \text{Min}} \quad (5)$$

According to the specification provided for power consumption, $V_{Border}=8$ W (the constraint value for the optimization parameter), the minimum value is 1.2 W and the maximum value is 18.4 W are the calculated (according to equation 15) minimum and maximum values of the variants with minimum and maximum resources respectively.

The results of steps 140 to 154 of FIG. 4 are shown in Table I below.

TABLE I

The variants obtained for power consumption after applying Fuzzy search method on the arranged design space

| Equations for obtaining the calculated membership values | Calculated membership values($\tau$) | Variants corresponding in the set according to the calculated '$\tau$' | Power Consumption value of the variant | Decision based on the $V_{Border}$ |
|---|---|---|---|---|
| $\tau_{ini} = \frac{8 - 1.2}{18.4 - 1.2}$ | $\tau_{ini} = 0.395$ | 0.387/V4 | ((1 * 20) + (4 * 100)) * 10 mW = 4.2 W | $P^4 < V_{Border}$, search down in the design space |
| $\frac{1 - 0.387}{\tau_B - 0.387} = \frac{18.4 - 4.2}{8 - 4.2}$ | $\tau_B = 0.551$ | 0.565/V13 | ((2 * 20) + (1 * 100)) * 40 mW = 5.6 W | $P^{13} < V_{Border}$, search down in the design space |
| $\frac{1 - 0.565}{\tau_B - 0.565} = \frac{18.4 - 5.6}{8 - 5.6}$ | $\tau_B = 0.646$ | 0.642/V6 | ((1 * 20) + (2 * 100)) * 40 mW = 8.8 W | P6 $> V_{Border}$, search up in the design space |
| $\frac{0 - 0.642}{\tau_B - 0.642} = \frac{1.2 - 8.8}{8 - 8.8}$ | $\tau_B = 0.574$ | 0.609/V21 (Since V13 has been checked) | ((3 * 20) + (1 * 65)) * 40 mW = 6.4 W | stop |

System 10 implements the fuzzy search to find the border variant in four comparisons based on the calculation of power consumption using equation (15). The border variant obtained is variant 21. This value indicates the last variant in the universe of discourse set that satisfies the constraint value for the power consumption optimization parameter ($V_{Border}$).

Referring back to FIG. 3, at step 108, system 10 now determines a satisfying set of variants for the other optimization parameter, time of execution.

Referring back to FIG. 4, at step 130, system 10 generates a universe of discourse set for the time of execution optimization parameter. System 10 is operable to generate the universe of discourse set by sorting the variants of the design space using various sorting methodologies.

For example, FIG. 7 illustrates one example sorting method 130*a* for generating the universe of discourse set.

At step 150, system 10 is operable to define, for the time of execution optimization parameter, a priority factor function for each kind of resource.

As described above and reproduced below for ease of reference, as a specific example of such a priority factor function for the time of execution of the resources R1, ... Rn that is not a clock oscillator, system 10 is operable to use a priority factor function of the form:

$$PF(Rn) = \frac{T_{Rn}^{Max} - T_{Rn}^{Min}}{N_{Rn}}$$

System 10 is operable to use a priority factor function for resource Ri that is a clock oscillator of the form:

$$PF(Rclk) = \frac{T_{Rclk}^{Max} - T_{Rclk}^{Min}}{N_{Rclk}}$$

At step 152, system 10 calculates a priority factor for each resource using the priority factor functions. Specifically, system 10 calculates the following priority factors:
For resource adder/subtractor (R1):

$$PF(R1) = \frac{T_{R1}^{Max} - T_{R1}^{Min}}{N_{R1}} = \frac{(40.03 - 40.93)}{3} = 0$$

For resource multiplier (R2):

$$PF(R2) = \frac{T_{R2}^{Max} - T_{R2}^{Min}}{N_{R2}} = \frac{(100.01 - 40.03)}{4} = 14.995$$

For resource clock oscillator ($R_{clk}$):

$$PF(Rclk) = \frac{T_{Rclk}^{Max} - T_{Rclk}^{Min}}{N_{Rclk}} = \frac{(160.08 - 40.03)}{2} = 60.025$$

The priority factors determined above indicate the change in time of execution with change in number of a specific resource. For instance, according to the above analysis the change in number of divider affect the change in time of execution the least, while the change in clock frequency from 50 MHz to 200 MHz affects the change in time of execution the most.

At step 154, system sorts the variants of the design space based on the calculated priority factors to generate the universe of discourse set for the time of execution optimization parameter.

As one example, referring back to FIG. 8, at step 156, system 10 is operable to generate the universe of discourse set using a hierarchical tree structure, as described above in relation to the power consumption optimization parameter.

System 10 is operable to generate the hierarchical tree structure as described herein in relation to the power consumption optimization parameter. System 10 is operable to assign levels each resource based on the relative magnitude of the priority factor. For example, system 10 is operable to assign resource Rclk level L1 since it has the highest priority factor. Since, resource R2 multiplier is the next highest hence it is assigned level L2. Finally, resource R1 adder/subtractor is the lowest so it is assigned the last level in the tree.

System 10 constructs the complete hierarchical tree structure for time of execution optimization parameter. The resource adder/subtractor (R1) has 3 variants, resource multiplier (R2) has 4 variants, and the resource clock oscillator ($R_{clk}$) has 2 variants. Hence, resource adder/subtractor (R1) will have 3 branches, resource multiplier (R2) will have 4 branches and the resource clock oscillator ($R_{clk}$) will have 2 branches respectively.

Referring back to FIG. 11, the same example hierarchical tree structure 250 applies for the time of execution optimization parameter because the magnitude of the priority factors for each kind of resource for time of execution have a similar ranking as the magnitude of priority factors for power consumption (clock, multiplier, adder/substractor). If the ranking differs between optimization parameters then different universe of discourse sets may result. The hierarchical tree structure 250 illustrates the universe of discourse set as the sorted variants represented as leaves of the tree 250.

Referring now to FIG. 9, there is shown another method 154 of sorting the variants of the design space based on the priority factors.

At step 158, according to the above calculated priority factors, system 10 determines the following priority order by arranging the variants in increasing order:

$$PO(R1) > PO(R2) > PO(Rclk)$$

Figure 14:
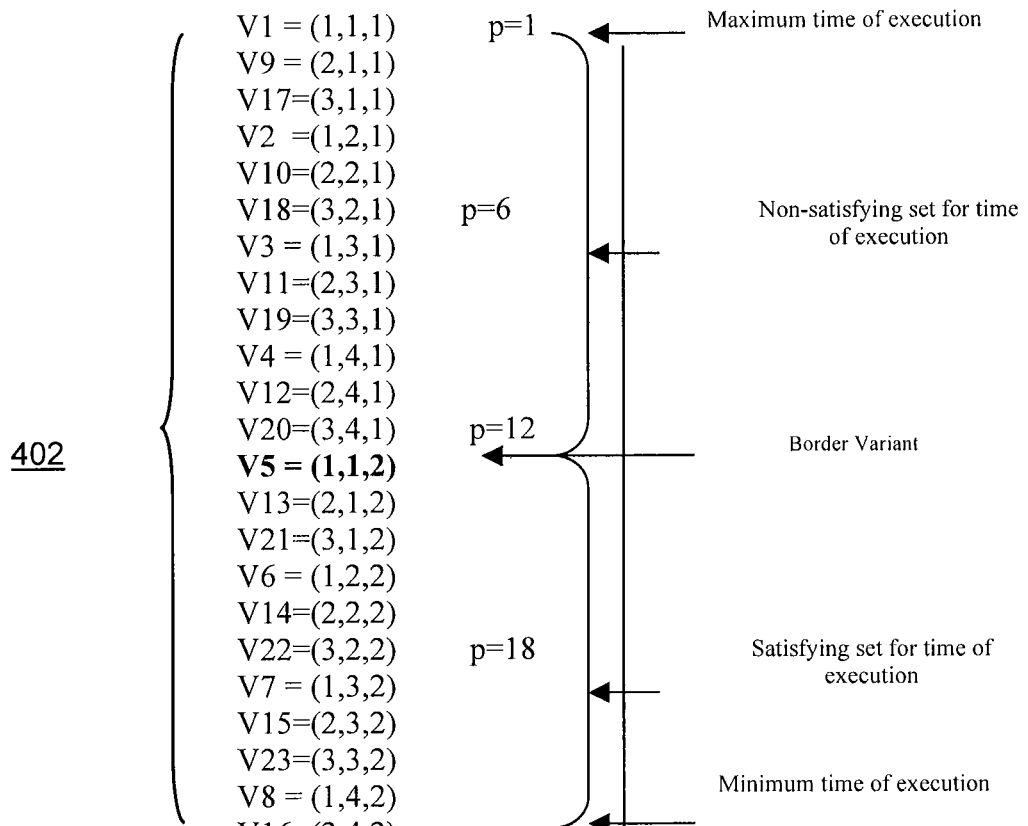
FIG. 14 illustrates a representation of a universe of discourse set in accordance with an example embodiment.

At step 160, system 10 using the priority order to sort the design space in decreasing order to generate the universe of discourse set 402 shown in FIG. 14.

Referring now to FIG. 10, there is shown another example sorting method 130b for generating the universe of discourse set.

System 10 is operable to implement steps 170 and 172 as described above in relation to the power consumption optimization parameter. That is, system 10 is operable to use the same arrangement criterion function for both optimization parameters (power consumption and time of execution).

At step 174, system 10 is operable to calculate the following arrangement criterion values for each kind of resource:
For kind of resource R1 adder/subtractor:

$$K(R1) = \frac{|40.02 - 40.02|}{3 - 1} = 0$$

Where the critical variant configuration is 1 Adder/Subtractor, 4 Multipliers and 200 MHz clock frequency. The value $P_{smin}$ is obtained based on $(12+(1000-1)*8)*1/200=40.02$ us (from $(L+(N-1)*Tc)*Tp)$. The specifications of each resource may be based on table I described herein.
For kind of resource R2 multiplier:

$$K(R2) = \frac{|40.02 - 100.01|}{4 - 1} = 19.99$$

Where the critical variant configuration is 3 Adder/Subtractor, 1 Multipliers and 200 MHz clock frequency. The value $P_{smin}$ is obtained based on $(22+(1000-1)*20)*1/200=100.01$ us (from $(L+(N-1)*Tc)*Tp)$. The specifications of each resource may be based on table I described herein.
For kind of resource Rclk clock:

$$K(Rclk) = \frac{|40.02 - 160.04|}{2 - 1} = 120.02$$

Where the critical variant configuration is 3 Adder/Subtractor, 4 Multipliers and 50 MHz clock frequency. The value $P_{smin}$ is obtained based on $(10+(1000-1)*8)*1/50=160.04$ us (from (L+(N−1)*Tc)*Tp). The specifications of each resource may be based on table I described herein.

System 10 is operable to implement steps 176 and 178 as above for power consumption optimization parameter in order to generate the hierarchical tree structure 250 shown in FIG. 11. As noted above, this is the same tree structure 250 used for the power consumption parameter as well (and the other sorting method based on priority factors) because the kind of resource clock is also assigned level 1, multiplier is assigned level 2, and adder/substractor is assigned level 3 based on the arrangement criterion values.

Referring back to FIG. 4, after system 10 generates a universe of discourse set for the time of execution optimization parameter, at step 132, system 10 is operable to assign a membership value to each variant in the universe of discourse set.

System 10 is operable to calculate a membership value ($\tau$) for each variant of the universe of discourse based on the function:

$$\tau = \frac{x - \beta}{\alpha - \beta}$$

Where 'x' is the position of the variant in the universe of discourse set; '$\tau$' represents the approximated membership value of the variant which is the $x^{th}$ position in the universe of discourse set; '$\alpha$' and '$\beta$' are the order of the first element and the last element in the universe of discourse set, thus '$\alpha$' is equal to 1 and '$\beta$' is equal to the total number of variants in the universe of discourse set.

System 10 then is operable to assign the calculated membership values to the corresponding variants in the universe of discourse set for execution time.

The following is an example representation of the universe of discourse set:

$$\{\overline{V1}, \overline{V9}, \overline{V17}, \overline{V2}, \overline{V10}, \overline{V18}, \overline{V3}, \overline{V11},$$
$$\overline{V19}, \overline{V4}, \overline{V12}, \overline{V20}, \overline{V5}, \overline{V13}, \overline{V21}, \overline{V6},$$
$$\overline{V14}, \overline{V22}, \overline{V7}, \overline{V15}, \overline{V23}, \overline{V8}, \overline{V16}, \overline{V24}\}$$

System 10 is operable to calculate the following membership values ($\tau$) to be assigned to each variant of the universe of discourse set:

(Position 1) $V1$: $\tau = \frac{x - \beta}{\alpha - \beta} = \tau = \frac{1 - 24}{1 - 24} = 1$ (Position 2) $V9$: $\tau = \frac{x - \beta}{\alpha - \beta} = \tau = \frac{2 - 24}{1 - 24} = .0957$ (Position 3) $V17$: $\tau = \frac{x - \beta}{\alpha - \beta} = \tau = \frac{3 - 24}{1 - 24} = 0.913$ (Position 4) $V2$: $\tau = \frac{x - \beta}{\alpha - \beta} = \tau = \frac{4 - 24}{1 - 24} = 0.870$ (Position 5) $V10$: $\tau = \frac{x - \beta}{\alpha - \beta} = \tau = \frac{5 - 24}{1 - 24} = 0.826$

...

(Position 23) $V16$: $\tau = \frac{x - \beta}{\alpha - \beta} = \frac{23 - 24}{1 - 24} = 0.043$ (Position 24) $V24$: $\tau = \frac{x - \beta}{\alpha - \beta} = \frac{24 - 24}{1 - 24} = 0$ System 10 then is operable to assign the calculated membership values to each corresponding variant of execution time optimization parameter, to obtain the following representation of the assigned membership values and the universe of discourse set:

$$\{\frac{1}{V1}, \frac{0.957}{V9}, \frac{0.913}{V17}, \frac{0.870}{V2}, \frac{0.826}{V10}, \frac{0.783}{V18}, \frac{0.739}{V3}, \frac{0.696}{V11},$$
$$\frac{0.652}{V19}, \frac{0.609}{V4}, \frac{0.565}{V12}, \frac{0.522}{V20}, \frac{0.478}{V5}, \frac{0.435}{V13}, \frac{0.391}{V21}, \frac{0.348}{V6},$$
$$\frac{0.304}{V14}, \frac{0.261}{V22}, \frac{0.217}{V7}, \frac{0.174}{V15}, \frac{0.130}{V23}, \frac{0.087}{V8}, \frac{0.073}{V16}, \frac{0}{V24}\}$$

At step 134, system 10 is operable to determine a satisfying set of variants by determining a border variant. System 10 is operable to determine the border variant by

TABLE II

The variants obtained for execution time after applying Fuzzy search method on the arranged design space

| Equations for obtaining the calculated membership values | Calculated membership values($\tau$) | Variants corresponding in the set according to the calculated '$\tau$' | Execution time | Decision based on the $V_{Border}$ |
|---|---|---|---|---|
| $\tau_{ini} = \frac{140 - 40.02}{400.04 - 40.02}$ | $\tau_{ini} = 0.277$ | 0.261/V22 | $T_{exe}^{22} = (16 + (1000 − 1) * 12) * 0.005 = 60.02$ µs | $T_{exe}^{22} < V_{Border}$, search up in the design space |
| $\frac{1 - 0.261}{\tau_B - 0.261} = \frac{400.04 - 60.02}{140 - 60.02}$ | $\tau_B = 0.435$ | 0.435/V13 | $T_{exe}^{13} = (22 + (1000 − 1) * 20) * 0.005 = 100.01$ µs | $T_{exe}^{13} < V_{Border}$, search up in the design space |
| $\frac{1 - 0.435}{\tau_B - 0.435} = \frac{400.04 - 100.01}{140 - 100.01}$ | $\tau_B = 0.510$ | 0.522/V20 | $T_{exe}^{20} = (12 + (1000 − 1) * 8) * 0.02 = 160.08$ µs | $T_{exe}^{20} > V_{Border}$, search down in the design space |
| $\frac{1 - 0.522}{\tau_B - 0.522} = \frac{40.02 - 160.08}{140 - 160.08}$ | $\tau_B = 0.435$ | 0.478/V5 (Since V13 has been checked so according to the algorithm check V5) | $T_{exe}^{5} = (22 + (1000 − 1) * 20) * 0.005 = 100.01$ µs | Stop | conducting a fuzzy search of the universe of discourse set based on the assigned membership values.

Referring now to FIG. 5, there is shown a method 134 of determining a satisfying set of variants by conducting a fuzzy search of the universe of discourse set based on the assigned membership values.

At step 140, system 10 calculates the initial membership value ($\tau_{ini}$) based on the minimum value and the maximum value of time of execution optimization parameter using the above described equations (5) (10) and the following values: $V_{Border}$ (the constraint value for the optimization parameter) =140 µs, minimum value=40.02 µs, maximum value=400.04 µs (calculated using equation 10). In the universe of discourse set 402 shown in FIG. 14, variant 'V1' and variant V24' correspond to the minimum and maximum variants respectively.

The results of steps 140 to 154 of FIG. 4 are shown in Table II below.

The proposed fuzzy search approach determines the border variant in four comparisons by analyzing the execution time according to equation (10). The border variant obtained is variant 5. This value indicates the first variant in the design space which satisfies the constraint value for execution time optimization parameter ($V_{Border}$).

Referring back to FIG. 2, after determining a satisfying set of variants for each optimization except the final optimization parameter, at step 110, system 10 is operable to determine a set of variants based on the intersection of the satisfying sets of variants. For this example, each variant of the set of variants should simultaneously satisfy the constraint values for both power consumption and execution time. For this example, the set of variants includes three variants V5, V13 and V21 that are common to each satisfying set of variants for the optimization parameters power consumption and time of execution. Hence these three variants (V5, V13 and V21) simultaneously satisfy both power consumed and execution time constraint values.

At step 112, system 10 is operable to select a variant from the set of variants (V5, V13, V21). System 10 is operable to select a vector by sorting the variants in the set of variants, ranking the vectors or otherwise evaluating the variants from the set of variants in order to generate an ordered list of variants. System 10 is operable to select a variant based on a position of the variant in the ordered list of variants.

In accordance with some embodiments, system 10 is operable to select the vector by defining a priority factor function for the final optimization parameter, which for this example is the hardware area of the total number of resources. System 10 is operable to use the priority factor for area defined by equations (8) (9) above. System 10 is operable to compute a priority factor for each kind of resource, which is R1 adder/subtractor, R2 multiplier, Rclk clock for this example. After computing the priority factors for each resource, system 10 is operable to determine a priority order by sorting the calculated priority factors in increasing order. Specifically, system 10 determines the following priority order: PO (Rclk)>PO (R1)>PO (R2). System 10 is operable to use the priority order to sort the variants V5, V13, V21 of the set of variants in increasing order of magnitude.

System 10 is operable to select variant number 'V5' of the set of variants based on the priority order. Variant 5 is the variant that concurrently satisfies the multiple constraint values for the optimization parameters hardware area, power consumption and time of execution.

At step 114, system 10 is operable to provide the selected variant 5. Alternatively or additionally, at step 116, system 10 is operable to develop a system architecture based on the selected variant 5.

System 10 is operable to determine and demonstrate the final variant (which satisfies all the three optimization parameters constraints values) from the intersection set of vectors. In accordance with some embodiments, system 10 is operable to determine the selected variant according to the following summary algorithm:
1. Determine the Border variant of power consumption and form the satisfying set of power consumption. In the example, based on the user constraint of 8 Watts, the border variant obtained was V21.
The satisfying set (A) was ={V1, V9, V17, V2, V10, V18, V3, V11, V19, V4, V12, V20, V5, V13, V21}
2. Determine the Border variant for execution time and form the satisfying set for execution time. In the example demonstrated in the paper, based on user constraints of 140 us, the border variant obtained was V5.
The satisfying set (B) was ={V5, V13, V21, V6, V14, V22, V7, V15, V23, V7, V15, V23, V8, V16, V24}
3. Find the Intersection Pareto set which is the intersection of set A and B. The Pareto set (P) was ={V5, V13, V21}
4. Calculate the Priority factor of different resources available for hardware area (equations 9-12) which in this case is the third optimization parameter.

$$PF(R1) = \frac{\Delta N_{R1} \cdot K_{R1}}{N_{R1}} = \frac{(3-1) \cdot 20}{3} = 13.33$$

$$PF(R2) = \frac{\Delta N_{R2} \cdot K_{R2}}{N_{R2}} = \frac{(4-1) \cdot 100}{4} = 75$$

$$PF(Rclk) = \frac{\Delta A(Rclk)}{N_{Rclk}} = \frac{10-4}{2} = 3$$

5. Obtain the priority order (PO) for the above resources. Since the resource which has the highest PF is given the lowest priority hence, PO of R2 is least while PO of Rclk is highest. Hence, the following PO sequence is obtained:

PO(Rclk)>PO(R1)>PO(R2)

6. Construct the architecture vector design space for hardware area using the PO.
7. Assign a pointer 'p' which indicates the position of the three variants (V5, V13, V21) obtained above.
8. Find the pointer which points to the least position p and yield the variant corresponding to that position as the final variant for the exploration process. The pointer pointing to the least position indicates the variant with the minimum hardware area (among the three variants), since the design space for hardware area is arranged in increasing order from top element to bottom element. Therefore, 'V5' in position p=2 is the final best variant of the exploration process.

Figure 15:
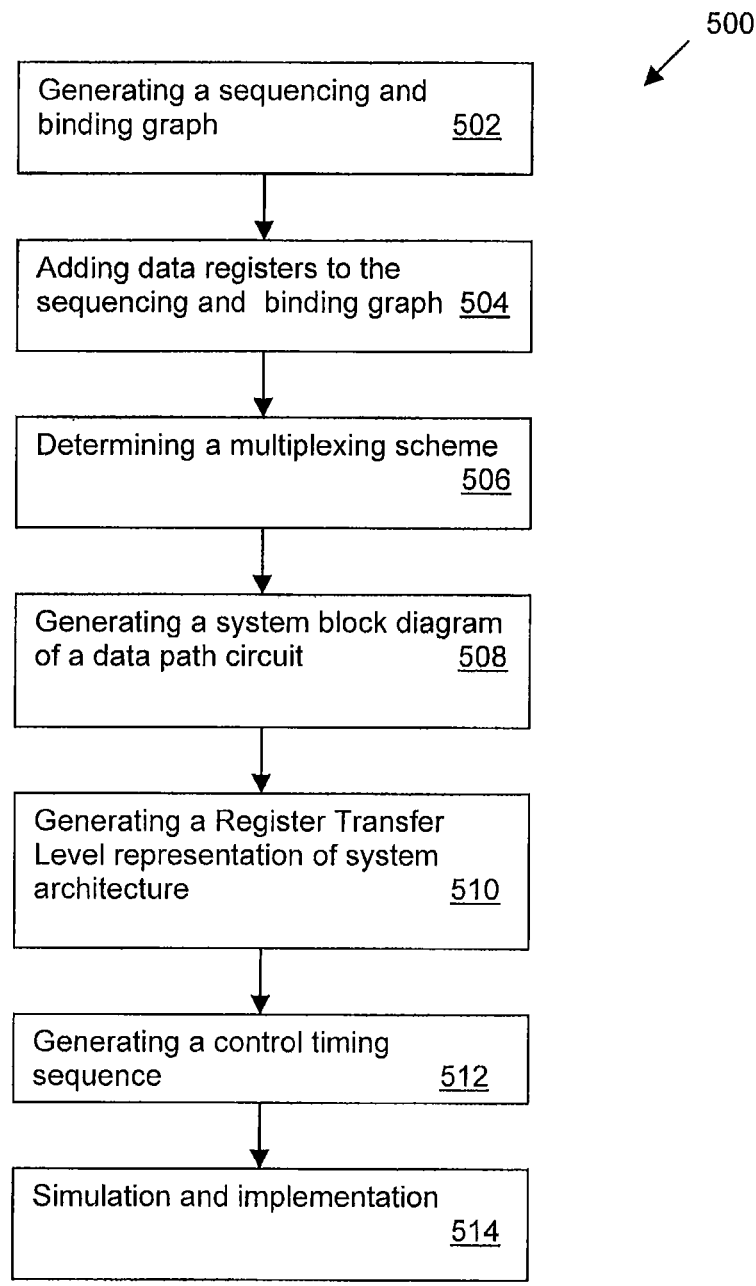
FIG. 15 illustrates a flow chart of a method for developing a system architecture using the selected variant in accordance with an example embodiment.

Referring now to FIG. 15, which shows a flow chart of a method 500 for developing a system architecture using the selected vector.

Figure 16:
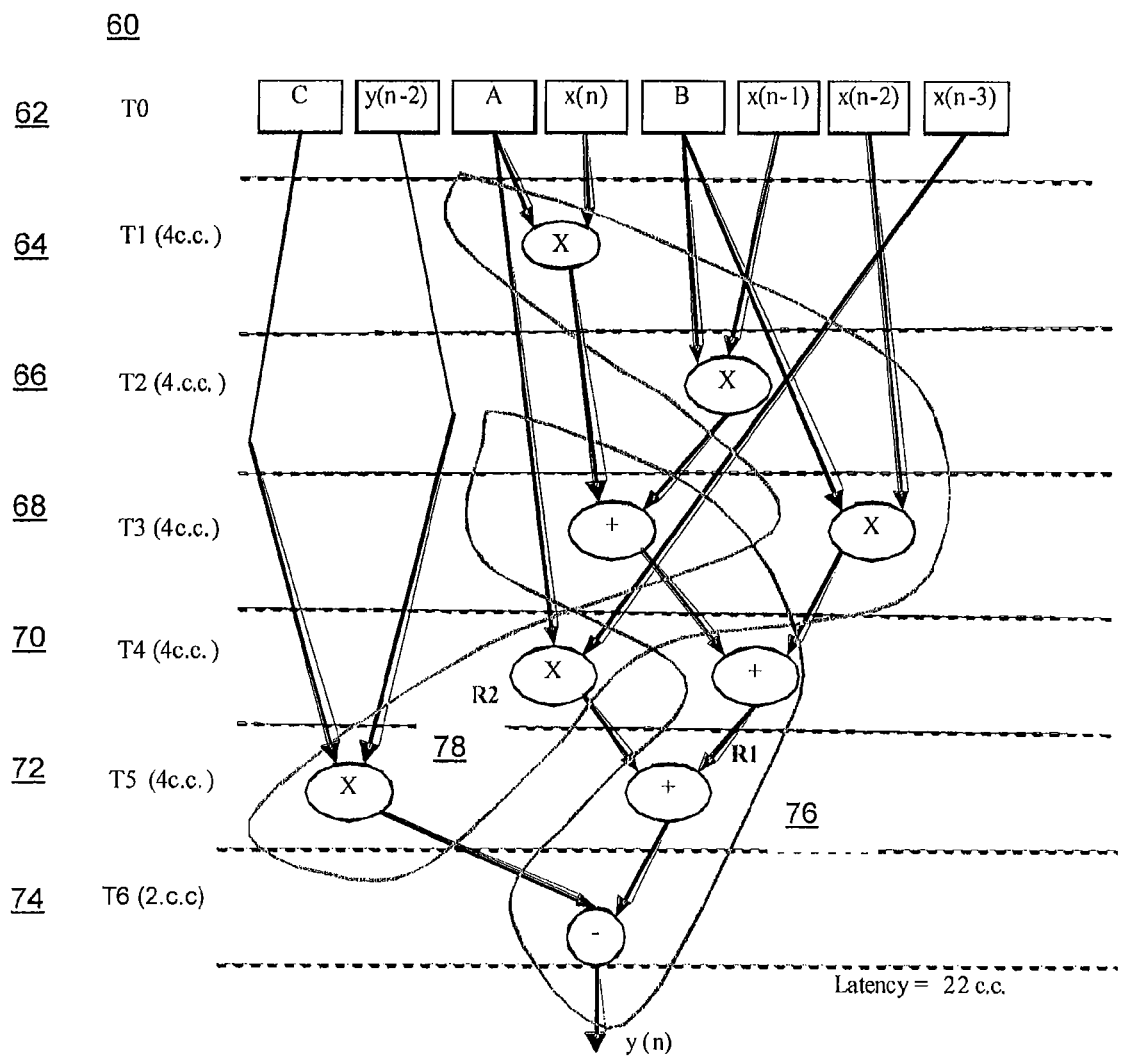
FIG. 16 illustrates a sequencing and binding graph in accordance with an example embodiment.

At step 502, system 10 generates a sequencing graph and a binding graph based on the selected vector. System 10 uses the aid of a sequencing graph and a binding graph to represent the combination of a number of each kind of resource specified by the selected vector in the temporal and spatial domain. The flow of data elements through different operators in the data path can be visualized with the help of sequencing graphs. This graphical representation of the application can distinctly underline the operations in discrete time steps while maintaining the precedence constraints specified. Referring now to FIG. 16, which shows a sequencing and binding graph 60 for the adder/subtractor (R1) 76 and the multiplier (R2) 78 specified by the selected variant V5 for time slots T0 62, T1 64, T2 66, T3 68, T4 70, T5 72, T6 74, in the context of the example problem.

Scheduling is a process that states the time slot for every operation while fixing the timing length (latency) in such a manner so that a synthesized hardware structure meets the timing restriction specified. A classical example of time constraint scheduling where the scheduler must achieve the goal with a minimum number of functional units possible to realize the behavior is shown. The scheduling of operations may be performed based on the As Soon As Possible (ASAP) algorithm. Though many algorithms may be used for scheduling operations such as the As Late as Possible (ALAP), List scheduling, Force Directed scheduling, ASAP, and so on. ASAP was selected because the operations should be done as soon as the resources R1 76 and R2 78 become free. As the processed data is ready the prepared data from the previous stage is used for the next operation. The binding graph will be used in further design stages to realize the function used as a benchmark application for demonstration of the optimized high level synthesis design flow.

Figure 17:
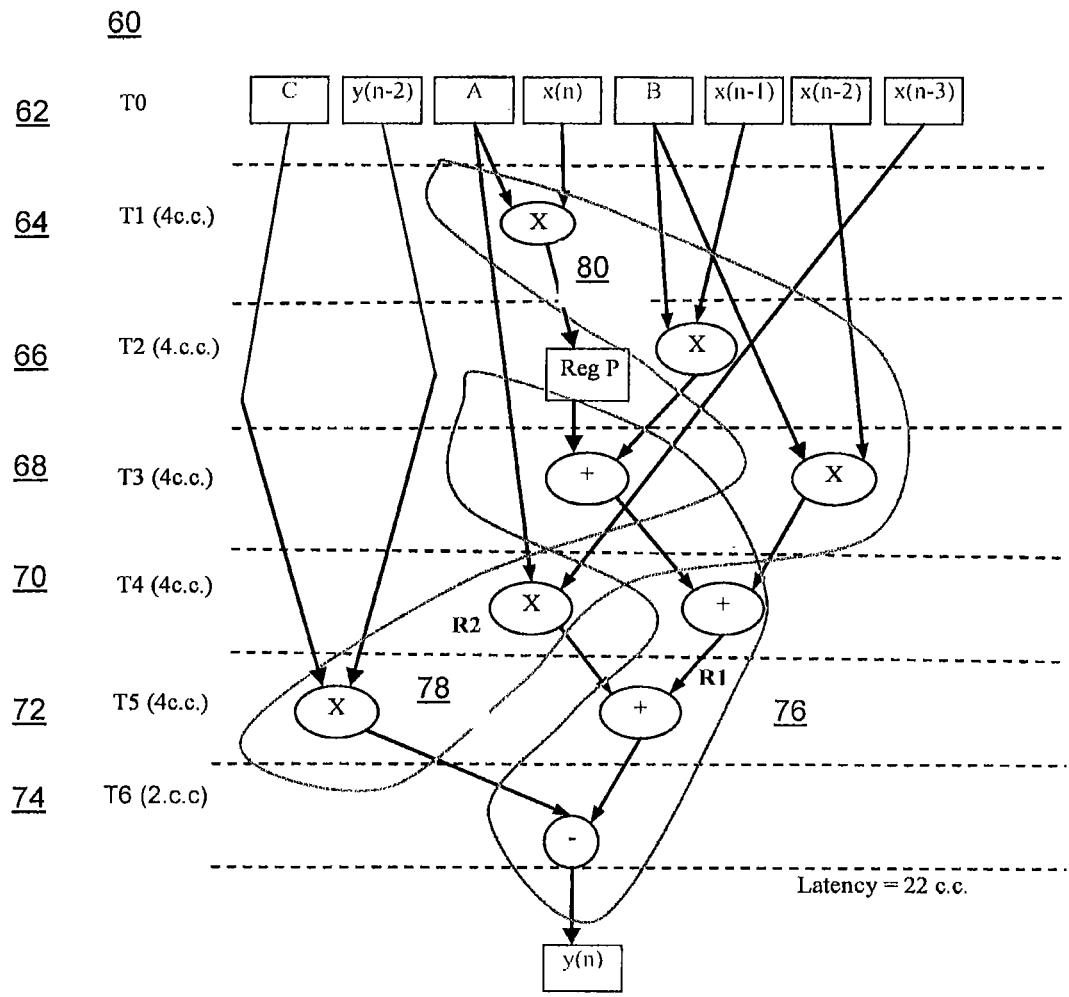
FIG. 17 illustrates a sequencing and binding graph with data registers in accordance with an example embodiment.
Figure 18:
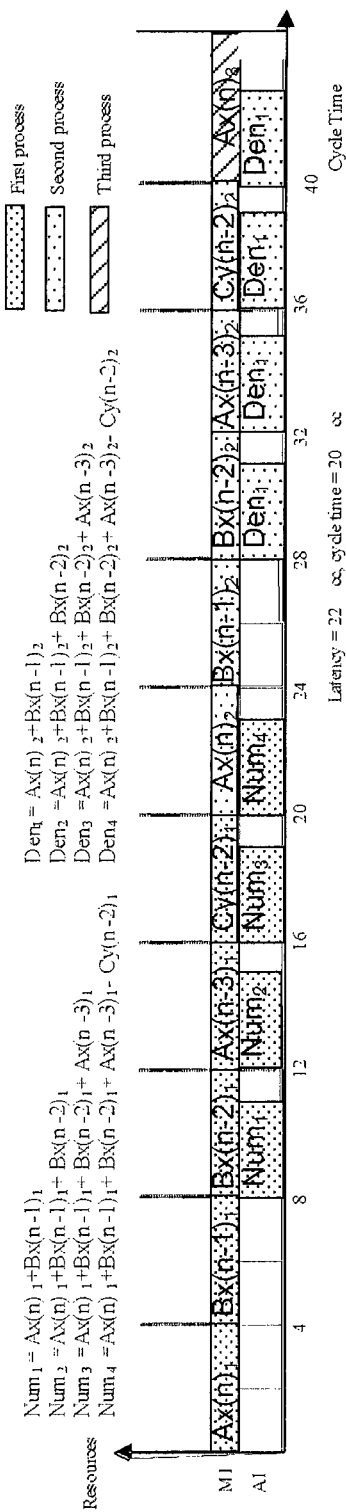
FIG. 18 illustrates the cycle time calculation for the combination of resources specified by the selected variant in accordance with an example embodiment.

Referring back to FIG. 15, at step 504, system 10 adds data registers to the sequencing and binding graph 60. In terms of architectural synthesis and optimization a circuit is generally specified by the following three dimensions. First a sequencing graph, second a set of functional resources described in the form of area and latency and, finally the operating constraints. The function of registers is to perform data storage and the wires interconnect the different discrete components. Referring now to FIG. 17, which illustrates the sequencing graph 60 with data registers 80. In the sequencing graph 60 of this example, Register P 80 has been added in time slot T2 66 because the results of the multiplier (R2) 78 at time slot T1 64 are not used until time slot T3 68. The latency for the function is calculated as 22 clock cycles. Referring now to FIG. 18, which illustrates a graph 51 for the cycle time calculation for the combination of resources specified by the selected vector, and in particular a multiplier 53 and an adder/subtractor 55.

Figure 19:
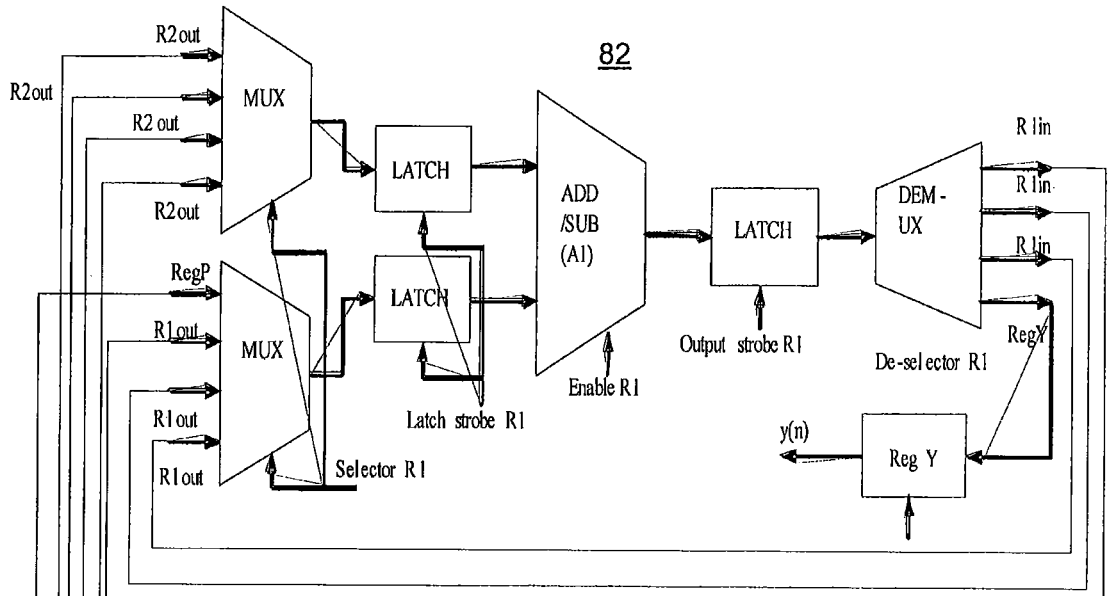
FIG. 19 illustrates a block diagram of the data path circuit for the resources specified in the selected vector in accordance with an example embodiment.
Figure 19:
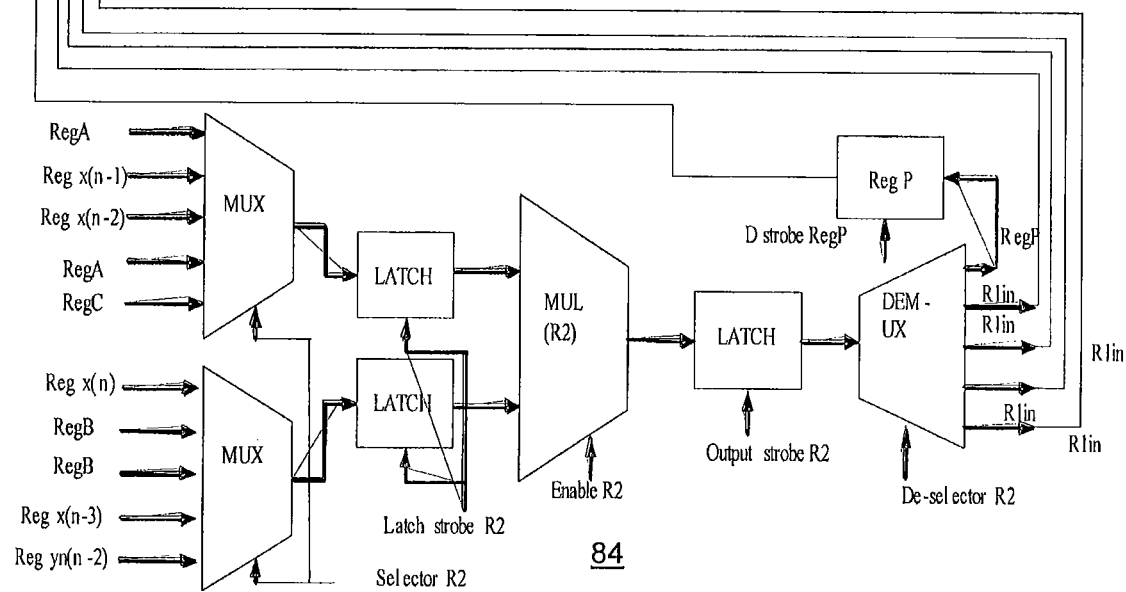
Figure 20:
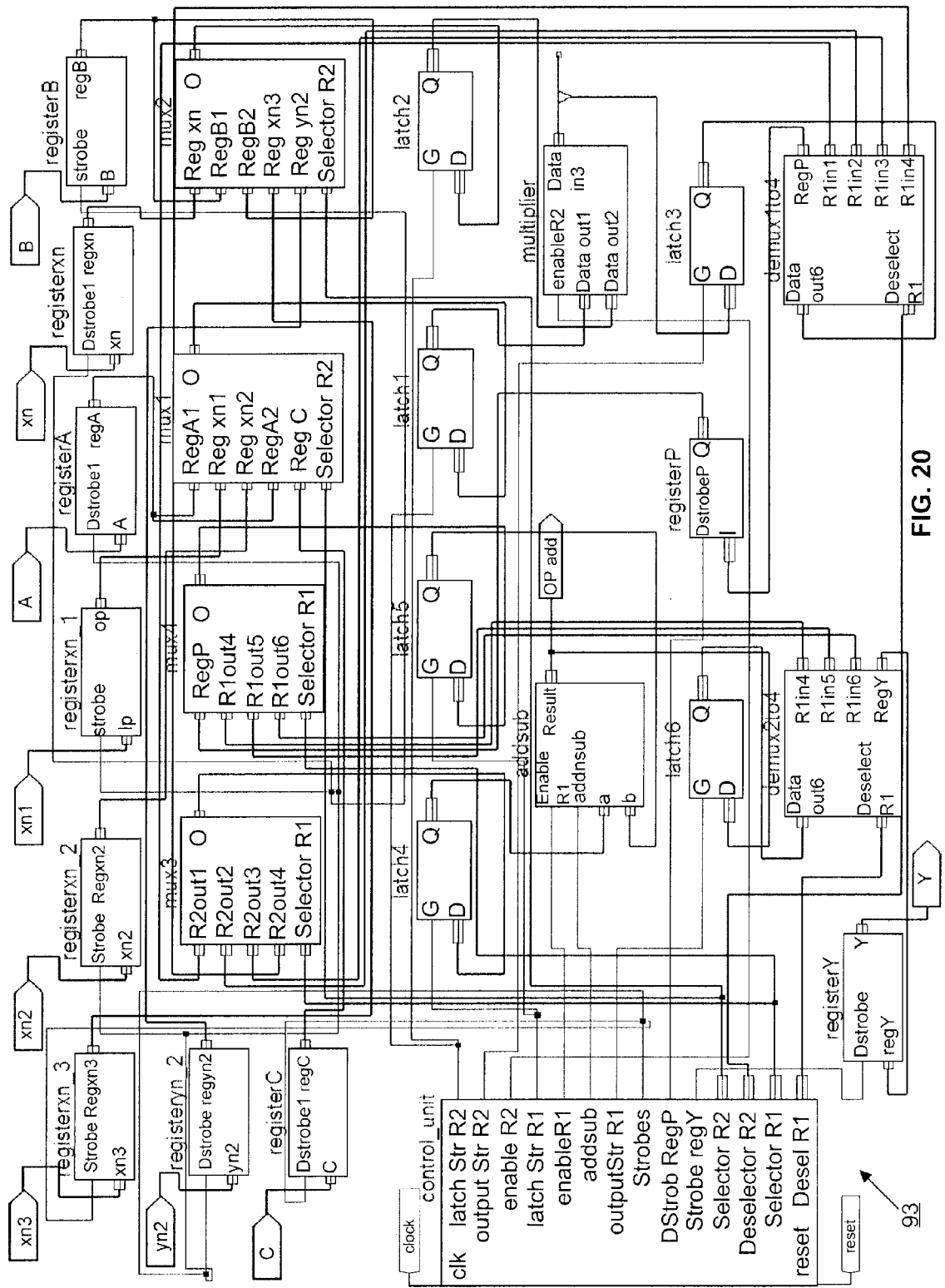
FIG. 20 illustrates a schematic structure of a device designed in accordance with an example embodiment.

Referring back to FIG. 15, at step 506, system 10 determines a multiplexing scheme for the resources specified in the selected vector. The binding of the resources as shown in FIGS. 19 and 20 enables a methodology to be formalized that incorporates the multiplexers and demultiplexers into the data path circuit of the system architecture. The multiplexing scheme is an important stage in high level synthesis design flow. Multiplexing scheme is a procedure for representing each system resource with respective inputs, outputs, operations, time steps and the necessary interconnections. Multiplexing scheme highlights the actual usage of resources by the operands at different times while strictly adhering to the data dependency present. The illustration provides a guide for developing system block diagrams before developing the control unit structure for the data path. This scheme prevents any errors in the final hardware structure that could result in catastrophic consequences. The control unit is responsible for the coordination of the data path of the system. Multiplexers and demultiplexers can be constructed and assigned to their respective inputs and outputs based on the multiplexing scheme, keeping in mind the dependency of the data. In this example, two functional resources one adder/subtractor R1 and one multiplier R2 perform different functions for the circuit. A multiplexing scheme table for each of the above mentioned resources is shown in Tables 3 and 4 respectively.

TABLE 3

Multiplexing scheme for Adder/subtractor resource (R1)

| Time | Operation | Input 1 | Input 2 | Output |
|---|---|---|---|---|
| 0 | — | — | — | — |
| 1 | — | — | — | — |
| 2 | — | R2out | RegP | — |
| 3 | + | R2out | R1out | R1in |
| 4 | + | R2out | R1out | R1in |
| 5 | + | R2out | R1out | R1in |
| 6 | − | — | — | RegY |
| 7 | — | — | — | — |

TABLE 4

Multiplexing scheme for Multiplier resource (R2)

| Time | Operation | Input 1 | Input 2 | Output |
|---|---|---|---|---|
| 0 | — | RegA | Resx(n) | — |
| 1 | * | Regx(n − 1) | RegB | RegP |
| 2 | * | Regx(n − 2) | RegB | R1in |
| 3 | * | RegA | Regx(n − 3) | R1in |
| 4 | * | RegC | Regy(n − 2) | R1in |
| 5 | * | — | — | R1in |
| 6 | — | — | — | — |
| 7 | — | — | — | — |

System 10 is operable to develop the multiplexing scheme table (MST) from the scheduling step (Sequencing Graph with data registers) by implementing the following algorithm.

Create a table with 5 columns and n rows (where n = number of time steps in the sequencing graph).
The $1^{st}$ column = the time step, $2^{nd}$ column = operation, $3^{rd}$ column = Input 1, $4^{th}$ column = Input 2 and $5^{th}$ column = Output.
Repeat for i = 0 to N
{
For time step i (0<=i<=N, where N is the total number of time steps in the sequencing graph), check if an operation exists. There could be the following three conditions:
If an (operation exists in the current time step and there also exists an operation in the next time step) then assign the respective operation for the current time step i in the column specifying the operation of the MST and assign input 1 and input 2 of next operation which would be used in the next time step (i+1) in the columns specifying the inputs of the MST. Finally, assign the output of the current operation in the column specifying the output of the MST.
Elseif, (there exists no operation in the current time step and there exists no operation in the next time step), then assign "-" for the operation in the column specifying the operation of the MST, assign "-" for the input 1, assign "-" for the input 2 in the columns specifying the inputs of the MST and assign "-" for the output of the current operation in the column specifying the output of the MST.

-continued

Elseif, (there exists no operation in the current time step but there exists an operation for the next time step), then assign "−" for the operation in the column specifying the operation of the MST, assign respective inputs for the input 1 and input 2 which would be used in the next time step (i+1), in the columns specifying the inputs of the MST. Also, assign "−" for the output of the current operation in the column specifying the output of the MST.
Elseif, (there exists an operation in the current time step but there exists no operation for the next time step), then assign the respective operation for the current time step i in the column specifying the operation of the MST, assign "−" for the input 1, assign "−" for the input 2 in the columns specifying the inputs of the MST (since there is no operation in time step i+1, hence no inputs are prepared). Finally, assign the respective output of the current operation in the column specifying the output of the MST.
}
STOP System 10 is operable to implement the algorithm mentioned above to create table 3 (multiplexing table for adder/subtractor):
Create a table with 5 columns and n rows (where n=number of time steps in the sequencing graph).
The $1^{st}$ column=the time step, $2^{nd}$ column=operation, $3^{rd}$ column=Input 1, $4^{th}$ column=Input 2 and $5^{th}$ column=Output.
At time step 0 of the sequencing graph, since there is no operation, hence, assign "−" for the operation, "−" for the input 1, "−" for the input 2 and "−" for the output in the multiplexing scheme table for $1^{st}$ row.
At time step 1 of the sequencing graph, since there is no addition operation as well, hence, assign "−" for the operations, "−" for the input 1, "−" for the input 2 and "−" for the output in the multiplexing scheme table for $2^{nd}$ row.
At time step 2 of the sequencing graph, since there is no addition operation as well, hence, assign "−" for the operations. But at this time step, the data for the addition operation in the next time step (time step 3) is getting ready hence assign "R2out" for the input 1, "RegP" for the input 2 and "−" for the output (as there is no operation performed in this step), in the multiplexing scheme table for $3^{rd}$ row.
At time step 3 of the sequencing graph, since there is an addition operation, hence, assign "+" for the operations. Also, at this time step, the data for the next addition operation for the next time step (time step 4) is getting ready hence assign "R2out" for the input 1, "R1out" for the input 2. Now the result of current addition at time step 3 is fed to next adder (binded as resource R1). Therefore assign "R1in" for the output, in the multiplexing scheme table for $4^{th}$ row.
At time step 4 of the sequencing graph, since there is an addition operation, hence, assign "+" for the operations. Also, at this time step, the data for the next addition operation for the next time step (time step 5) is getting ready hence assign "R2out" for the input 1, "R1out" for the input 2. Now the result of current addition at time step 4 is fed to next adder (binded as resource R1). Therefore assign "R1in" for the output, in the multiplexing scheme table for $5^{th}$ row.
At time step 5 of the sequencing graph, since there is an addition operation, hence, assign "+" for the operations. Also, at this time step, the data for the subtraction operation for the next time step (time step 6) is getting ready hence assign "R2out" for the input 1, "R1out" for the input 2. Now the result of current addition at time step 5 is fed to subtractor (binded as resource R1). Therefore assign "R1in" for the output, in the multiplexing scheme table for $5^{th}$ row.
At time step 6 of the sequencing graph, since there is a subtraction operation, hence, assign "−" for the operations. Now the result of current subtraction at time step 6 is fed to output register Y. Therefore assign "RegY" for the output, in the multiplexing scheme table for $6^{th}$ row.

At time step 7 of the sequencing graph, since there is no operation, hence, assign "−" for the operation, "−" for the input 1, "−" for the input 2 and "−" for the output in the multiplexing scheme table for $7^{th}$ row.
Similarly, Table 4, the multiplexing scheme table for multiplier can be obtained.
At step 508, system 10 generates a system block diagram. After the multiplexing scheme has been successfully performed, the next phase of the design flow is the development of the system block diagram. The system block diagram comprises two divisions, data path circuit and the control unit. The data path is responsible for the flow of data through the buses and wires after the operations have been performed by the components present in the data path circuit. Thus, the data path provides the sequence of operations to be performed on the arriving data based on the intended functionality. As an example, the data path can comprise registers for storage of data, memory elements such as latches for sinking of data in the next stage, as well as multiplexers and demultiplexers for preparation of data at run time by change of configuration. The data path circuit also consists of functional resources which are accountable for performing the operations on the incoming data. The block diagram for the benchmark application consists of two resources (an adder/subtractor and a multiplier) for executing their respective assigned operations. Another component of the system block diagram is the control unit or the controller. A centralized control unit controls the entire data path circuit and provides the necessary timing and synchronization required by data traversing through the data path circuit. The control unit acts as a finite state machine that changes its state according to the requirement of activating and deactivating the various elements of the data path at different instances of time. Based on the multiplexing scheme the block diagram of the data path circuit was constructed to demonstrate design flow for the benchmark application.
Referring now to FIG. 19, which shows a block diagram of the data path circuit 86 for the resources specified in the selected vector, which for this illustrative example, is a adder/subtractor 82 and a multiplier 84.
At step 510, system 10 generates a RTL level representation of the system architecture. System 10 is operable to create the RTL data path circuit diagram from Multiplexing Scheme as follows.
The Block diagram of the RTL data path circuit in FIG. 19 is obtained from the information extracted by the multiplexing scheme in table 3 and table 4 (In the tables, R1=adder/subtractor resource and R2=multiplier resource). The procedure implemented by system 10 for constructing the data path circuit of the RTL is discussed below:
Let the number of variables available for INPUT 1 of the multiplexing scheme table for resource R1 be denoted as $V_x$.

Therefore, from the multiplexing scheme table 3 for adder/subtractor, $V_x=4$, since there are 4 possible input variables (R2out, R2out, R2out and R2out) for INPUT 1 of adder/subtractor.

Let the number of possible variables available for INPUT 2 of the multiplexing scheme table for resource R1 be denoted as $V_y$. Therefore, from the multiplexing scheme table 3 for adder/subtractor, $V_y=4$, since there are 4 possible input variables (RegP, R1out, R1out and R1out) for INPUT 2 of adder/subtractor.

Based on the value of $V_x=4$, a 4-bit multiplexer (MUX 1) component is adopted from the module library. The inputs to the 4-bit MUX would be the 4 possible variables acting as inputs for INPUT 1 which are in this case R2out, R2out, R2out and R2out as mentioned in step 1.

Similarly, based on the value of $V_y=4$, a second 4-bit multiplexer (MUX 2) component is again adopted from the module library. The inputs to this second 4-bit MUX would be the 4 possible variables acting as inputs for INPUT 2 which are in this case RegP, R1out, R1out and R1out as mentioned in step 1. Selector signals are assigned to each multiplexer which selects different inputs based on the information of the select lines.

If the multiplexers obtained in step 2 are an N bit multiplexer then input storage elements are needed for each case to store the data from different inputs at different time instances.

Since for the applications discussed as example, the multiplexers (MUX 1 and MUX 2) obtained in step 2 are 4 bit Multiplexers hence there will be a sharing of the same mux unit at different time instances. This mandates the incorporation of storage latches to temporarily hold the data for various inputs until needed by the next component. Therefore, for each multiplexer formed in step 2, a corresponding latch is added. Strobe signals are assigned to each input latch which latches the data when needed. Thus this strobe maintains the synchronization process.

Else if the multiplexers obtained in step 2 is a 1 bit multiplexer then no input storage element is needed in the design.

Followed by the latch component, the main functional unit has to be added from the library which actually processes the data based on the inputs received at different time instances by the two multiplexers through the corresponding storage latches. In this case, the outputs of two latches act as inputs of the adder/subtractor resource. Hence, the same adder/subtractor resource performs the same functional operation but on different inputs at different time instances (as received from the latches). Enable signal is assigned to functional unit (resource) which activates the resource when both the inputs are ready. Thus enable also maintains the synchronization.

Now since the same adder/subtractor resource performs the same functional operation but on different inputs at different time instances, hence an output storage latch needs to be incorporated in the data path unit of the RTL circuit. This output storage latch holds different data from the functional resource based on the different outputs processed by the functional unit. Output Strobe signals is assigned to the output latch which latches the data when needed. Thus this strobe is also responsible for the synchronization process.

If an output storage latch is present in the data path unit, then a demultiplexer has to be added in the data path unit. This is because, based on the data stored by the output latch due to different output processing from functional unit, a structure is needed that can produce the output of all the data from the latch through parallel wires. Hence an N-bit demultiplexer is needed. In the case of example discussed so far, the value of the N bit width of the demultiplexer=value of N bit width of any input multiplexer. De-selector signal is assigned to the demultiplexer which outputs the different results of the latch through different wires.

TABLE 5

| Adder (R1) | | | | | | Multiplier (R2) | | | | | Strobes | | | |
|---|---|---|---|---|---|---|---|---|---|---|---|---|---|---|
| Latch stroke | enable | add_sub | Output strobe | Selector | De-selector | Latch strobe | enable | Output strobe | selector | De-selector | Stobes_register | Dstrobe_regP | Strobe_regY | Clock Cycles |
| 0 | 0 | 0 | 0 | 00 | 0 | 0 | 0 | 0 | 000 | 000 | 0 | 0 | 0 | 0 |
|  |  |  |  |  |  |  |  |  | 000 |  | 1 |  |  | 1 |
|  |  |  |  |  |  | 1 |  |  |  |  |  |  |  | 2 |
|  |  |  |  |  |  |  | 1 |  | 001 | 000 |  |  |  | 3 |
|  |  |  |  |  |  | 0 |  |  |  |  |  |  |  | 4 |
|  |  |  |  |  |  |  |  |  |  |  |  |  |  | 5 |
|  |  |  |  |  |  |  |  |  |  |  |  |  |  | 6 |
|  |  |  |  |  |  |  | 1 |  |  |  |  |  |  | 7 |
|  |  |  |  |  |  | 0 |  |  |  |  |  | 1 |  | 8 |
|  |  |  |  |  |  | 1 |  |  |  |  |  |  |  | 9 |
|  |  |  |  | 00 |  |  | 1 | 0 | 010 | 001 |  |  |  | 10 |
|  |  |  |  |  |  | 0 |  |  |  |  |  |  |  | 11 |
|  |  |  |  |  |  |  |  |  |  |  |  |  |  | 12 |
|  |  |  |  |  |  |  |  |  |  |  |  |  |  | 13 |
|  |  |  |  |  |  | 0 | 1 |  |  |  |  |  |  | 14 |
| 1 |  |  |  |  |  | 1 |  |  |  |  |  |  |  | 15 |
|  | 1 | 0 |  | 01 | 00 |  | 1 | 0 | 011 | 010 |  |  |  | 16 |
|  |  |  |  |  |  |  |  |  |  |  |  |  |  | 17 |
| 0 |  |  |  |  |  | 0 |  |  |  |  |  |  |  | 18 |
|  |  |  |  |  |  |  |  |  |  |  |  |  |  | 19 |
|  | 0 |  | 1 |  |  | 0 | 1 |  |  |  |  |  |  | 20 |
| 1 |  |  |  |  |  | 1 |  |  |  |  |  |  |  | 21 |
|  | 1 | 0 | 0 | 10 | 01 |  | 1 | 0 | 100 | 011 |  |  |  | 22 |
| 0 |  |  |  |  |  | 0 |  |  |  |  |  |  |  | 23 |
|  |  |  |  |  |  |  |  |  |  |  |  |  |  | 24 |
|  |  |  |  |  |  |  |  |  |  |  |  |  |  | 25 |
|  | 0 |  | 1 |  |  | 0 | 1 |  |  |  |  |  |  | 26 |

TABLE 5-continued

| Adder (R1) | | | | | | Multiplier (R2) | | | | | Strobes | | | |
|---|---|---|---|---|---|---|---|---|---|---|---|---|---|---|
| Latch strobe | enable | add_sub | Output strobe | Selector | Deselector | Latch strobe | enable | Output strobe | selector | deselector | Stobes_register | Dstrobe_regP | Strobe_regY | Clock Cycles |
| 1 | | | | | | 1 | | | | | | | | 27 |
|  | 1 | 0 | 0 | 11 | 10 |  | 1 | 0 | | | 100 | | | 28 |
| 0 | | | | | | 0 | | | | | | | | 29 |
|  | | | | | | | | | | | | | | 30 |
|  | | | | | | | | | | | | | | 31 |
|  | 0 | | 1 | | | | | 1 | 0 | 1 | | | | 32 |
| 1 | | | | | | | | | | | | | | 33 |
|  | 1 | 1 | 0 | | 11 | | | | | | | | | 34 |
|  | | | | | | | | | | | | | | 35 |
| 0 | | | 1 | | | | | | | | | | | 36 |
|  | 0 | | | | | | | | | | | | 1 | 37 |

Else if an output storage latch is not present in the data path unit then no demultiplexer needs to be added in the data path unit.

This process is repeated for all the multiplexing tables developed in the design process. In this case, the steps from 1-6 was repeated for multiplexing table for multiplier resource (R2).

Once all the connections mentioned in step 1-7 for the discrete components for a specific resource is complete, then the outputs of each resource stage are connected to the inputs of the other resource stage based on the information present in multiplexing scheme tables. For example, in this case, input 'R1out' of resource R1 results from the output 'R1in' of the same resource. Also, output 'R1in' of the second resource R2 acts as the input of the first resource R1 in the form of 'R2out' through the second MUX. Similarly, using the information from the multiplexing tables, the interconnected components of each resource is connected among each other to obtain a circuit in FIG. 13. Referring back to FIG. 15, at step 512, system 10 generates a control timing sequence, also referred to herein as a control unit. The next design stage is the development of the control unit structure, which is accountable for any mis-coordination in timing among the various elements of the data path. The function of the controller is to activate and deactivate the different elements of the data path based on the timing specification determined for the objective function. The control unit prepares the data path units for the incoming data by changing the configuration to perform the next assigned function. For synchronous functioning of all data elements in the system the controller must respond to the requirement at exactly the right moment. Failure to activate or deactivate any functional block in the data path will result in fatal consequences in the system output. The determination of the timing specification from the control unit helps to create an error free structure of the controller. As an example, VHDL was used here as the hardware description language for designing the control unit, but other hardware description languages may also be used. The timing specification data shown in Table 5 is developed with clock cycles placed in the Y-axis and the control signals placed in the X-axis. At every count the transition of the different control signals can be clearly observed. This facilitates in the description of the control structure in a hardware description language.

System 10 is operable to implement the following procedure for determination of the controller table.

The procedure for determination of controller table is to identify the various control signals that control the different components of the data paths. With the developed block diagram in the previous step (see the algorithm for development of block diagram of the data path from multiplexing scheme table), there can be 'm' # of control signals depending on the complexity of the data path unit architecture. For the example used, after development of the block diagram of the data path unit for the example as shown in FIG. 19, the control signals for the different components can be extracted. Examples of control signals are:

Latch strobe—Control signal of input latch for adder/subtractor (R1)
enable add_sub—Control signal of resource for adder/subtractor (R1)
Output strobe—Control signal of output latch for adder/subtractor (R1)
Selector—Control signal of multiplexer for adder/subtractor (R1)
Deselector—Control signal of de-multiplexer for adder/subtractor (R1)
Latch strobe—Control signal of input latch for multiplier (R2)
enable multiplier—Control signal of resource for multiplier (R2)
Output strobe—Control signal of output latch for multiplier (R2)
Selector—Control signal of multiplexer for multiplier (R2)
Deselector—Control signal of de-multiplexer for multiplier (R2)
Stobes_register—Control signal of Reg x(n−1), Reg x(n−2), RegA, RegC, Reg x(n), RegB, Reg x(n−3), Reg y(n−2).
Dstrobe_regP—Control signal of RegP.
Strobe_regY—Control signal of output register Y.

```
1. When count0, if (clock event and clock='1') then
   if(reset='0')then
   if count=0 then
   1.1 strobes<='0'; ----initialize strobe for the registers
   1.2 latch_strobe_R2 = 0;---initialize the latch strobe
   1.3 latch_strobe_R1 = 0;---initialize the latch strobe
   1.4 output_strobe_R2 =0;---initialize
   1.5 output_strobe_R1 =0;----initialize
   1.6 strobe regY =0; ---initialize
   1.7 Dstrobe_regP =0; ---initialize
   1.8 Increment count;
2. When count=1 then
   2.1 strobes<='1';
   2.2 selector_R2<="000";
   2.3 Increment count;
3. When count=2 then
   3.1 busy<='1';
   3.2 latch_strobe_R2<='1';
```

3.3 Increment count;
4. When count=3 then
4.1 enable_R2<='1';
4.2 selector_R2<="001";
4.3 Deselector_R2<="000";
4.4 Increment count;
5. When count=4 then
5.1 latch_strobe_R2<='0';--resetting
5.2 Increment count;
6. When count=5 then
6.1 Increment count;
7. When count=6 then
7.1 Increment count;
8. When count=7 then
8.1 output_strobe_R2<='1';
8.2 Increment count;
9. When count=8 then
9.1 enable_R2<='0';---resetting the value
9.2 Dstrobe_regP<='1';
9.3 Increment count;
10. When count=9 then
10.1 latch_strobe_R2<='1';
10.2 Increment count;
11. When count=10 then
11.1 enable_R2<='1';
11.2 selector_R2<="010";----preparing for the next input
11.3 selector_R1<="00";----preparing for the next input
11.4 Deselector_R2<="001";
11.5 output_strobe_R2<='0';----resetting
11.6 Increment count;
12. When count=11 then
12.1 latch_strobe_R2<='0';----resetting
12.2 Increment count;
13. When count=12 then
13.1 Increment count;
14. When count=13 then
14.1 Increment count;
15. When count=14 then
15.1 output_strobe_R2<='1';
15.3 enable_R2<='0'; -----resetting
15.4 Increment count;
16. When count=15 then
16.1 latch_strobe_R2<='1';
16.2 latch_strobe_R1<='1';
16.3 Increment count;
17. When count=16 then
17.1 enable_R2<='1';
17.2 add_sub<='0';--------------for the add operation
17.3 enable_R1<='1';
17.4 selector_R2<="011";
17.5 selector_R1<="01";
17.6 Deselector_R2<="010";
17.7 Deselector_R1<="00";
17.8 output_strobe_R2<='0';----resetting
17.9 Increment count;
18. When count=17 then
18.1 Increment count;
19. When count=18 then
19.1 latch_strobe_R2<='0';----resetting
19.2 latch_strobe_R1<='0';----resetting
19.3 Increment count;
20. When count=19 then
20.1 Increment count;
21. When count=20 then
21.1 output_strobe_R1<='1';
21.2 output_strobe_R2<='1';
21.2 enable_R2<='0'; -----resetting
21.3 enable_R1<='0'; -----resetting
21.4 Increment count;
22. When count=21 then
22.1 latch_strobe_R2<='1';
22.2 latch_strobe_R1<='1'
22.3 Increment count;
23. When count=22 then
23.1 enable_R2<='1';
23.2 add_sub<='0';
23.3 enable_R1<='1';
23.4 selector_R2<="100";
23.5 selector_R1<="10";
23.6 Deselector_R2<="011";
23.7 Deselector_R1="01";
23.8 output_strobe_R2<='0';----resetting
23.9 output_strobe_R1<='0';----resetting
23.10. Increment count;
24. When count=23 then
24.1 latch_strobe_R2<='0';----resetting
24.2 latch_strobe_R1<='0';----resetting
24.3 Increment count;
25. When count=24 then
25.1 Increment count;
26. When count=25 then
26.1 Increment count;
27. When count=26 then
27.1 output_strobe_R1<='1';
27.2 output_strobe_R2<='1';
27.3 enable_R2<='0'; -----resetting
27.4 enable_R1<='0'; -----resetting
27.5 Increment count;
28. When count=27 then
28.1 latch_strobe_R2<='1';
28.2 latch_strobe_R1<='1';
28.3 Increment count;
29. When count=28 then
29.1 enable_R2<='1';
29.2 add_sub<='0';
29.3 enable_R1<='1';
29.4 selector_R1="11";
29.5 Deselector_R2<="100";
29.6 Deselector_R1<="10";
29.7 output_strobe_R2<='0';----resetting
29.8 output_strobe_R1<='0';----resetting
29.9 Increment count;
30. When count=29 then
30.1 latch_strobe_R2<='0';----resetting
30.2 latch_strobe_R1<='0';----resetting
30.3 Increment count;
31 When count=30 then
31.1 Increment count;
32. When count=31 then
32.1 Increment count;
33. When count=32 then
33.1 output_strobe_R1<='1';
33.2 output_strobe_R2<='1';
33.3 enable_R2<='0'; -----resetting
33.4 enable_R1<='0'; -----resetting
33.5 Increment count;
34. When count=33 then
34.1 latch_strobe_R1<='1';
34.2 Increment count;
35. When count=34 then
35.1 add_sub<='1'; -----for subtraction
35.2 enable_R1<='1';
35.3 Deselector_R1<="11";
35.4 output_strobe_R1<='0';----resetting
35.5 Increment count;
36. When count=35 then
36.1 Increment count;
37. When count=36 then
37.1 latch_strobe_R1<='0';---resetting
37.2 output_strobe_R1<='1';
37.3 Increment count;
38. When count=37 then
38.1 strobe_regY<='1';
38.2 enable_R1<='0'; ----resetting the value
38.3 Increment count;

At step 514, system 10 simulates the schematic structure for testing and verification and then implements the schematic structure of the device may be developed in any of the synthesis tools available. Examples include Synopsys, Xilinx Integrated Software, Environment (ISE) and Altera Quartus II. For this example, components in the data path may be described and implemented in VHDL before verification. Then, as an example, the schematic structure of the whole device may be designed and implemented in Xilinx Integrated Software Environment (ISE) version 9.2i. Referring now to FIG. 20, there is shown a schematic structure 93 of the whole device in accordance with an example embodiment, which is designed in Xilinx ISE 9.2i as an illustrative example.

The described fuzzy search framework for design space exploration is efficient in architecture evaluation and exploration time. Example sizes of the design space consisting of variants for the benchmarks are indicated in Table III. For example, the total number of variants in the design space for Discrete Wavelet Transformation (DWT) is 288; while on the other hand, the total number of variants of the design space for EWF and FIR are 450 and 1200 respectively. The results of the comparison of the proposed design space exploration process with exhaustive analysis are shown in Table III. Results indicate that the proposed approach may be capable of achieving speedup compared to the exhaustive search. Speed up of up to 92.70% is achieved for the DWT high level synthesis benchmark. Moreover speedup of 94.22% and 97.75% for EWF and FIR benchmarks are obtained respectively when compared to exhaustive search as shown in Table III.

The described approach using a fuzzy search technique offers fast exploration of the architecture design space according to the system specifications provided. The method is based on the sorting of the architecture design space, such as for example in an increasing or decreasing order based on the calculation of the PF or by using a tree structure or another sorting method. It then uses the fuzzy search mechanism to find an optimal variant for the design. The speed up of the proposed fuzzy search method indicates improvement (or at least an alternative) in the speedup for finding the optimal variant of the design space. Moreover since the time to market pressure has led to growing attention for automation of DSE approaches, hence automations of the DSE methodology for multi objective designs has become significant. This fuzzy search method allows automation of the DSE methodology which is exceedingly important for the current generation of the VLSI designs which has multi objective requirement.

The present invention has been described here by way of example only. Various modification and variations may be made to these exemplary embodiments without departing from the spirit and scope of the invention, which is limited only by the appended claims.

We claim:

1. A computer implemented method of developing a system architecture, performed by at least one processor of at least one computing device, comprising:
    defining, by the at least one processor, a plurality of resources constraints max $N_{R1}$, . . . max $N_{Rn}$, for a plurality of kinds of resources R1 . . . Rn, wherein each resource constraint max$N_{Ri}$ is a maximum number of a kind of resource Ri available to construct the system architecture, wherein 1≤i≤n and n is an integer greater than 1;
    defining, by the at least one processor, a plurality of constraint values comprising a constraint value for each optimization parameter of at least three optimization parameters for the system architecture, wherein the at least three optimization parameters comprise a final optimization parameter;
    defining, by the at least one processor, a design space as a plurality of variants representing different combinations of a number of each kind of resource R1, Rn available to construct the system architecture, wherein each variant is a vector of the form:

$$V_n = (N_{R1}, \ldots N_{Rn})$$

wherein $N_{Ri}$ 1≤i≤n represents the number of the kind of resource Ri, wherein based on the resource constraints, 1≤$N_{Ri}$≤max $N_{Ri}$;
   determining, by the at least one processor, a plurality of satisfying sets of variants by, for each of the optimization parameters except for the final optimization parameter:
      generating a universe of discourse set by sorting the plurality of variants of the design space;
      assigning a membership value to each variant of the universe of discourse set, wherein each membership value is within an interval [0,1], wherein, for each respective variant of the universe of discourse set, the membership value assigned to said each respective variant indicates a position of said each respective variant in the universe of discourse set;
      determining a satisfying set of variants from the universe of discourse set by determining a border variant of the universe of discourse set, wherein each variant of the satisfying set substantially satisfies the constraint value for the optimization parameter, wherein the border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter, and wherein the border variant is determined by performing a fuzzy search of the universe of discourse set using the corresponding membership values;
   determining, by the at least one processor, a set of variants based on an intersection of the plurality of satisfying sets of variants for the optimization parameters except the final optimization parameter;
   for the final optimization parameter:
      generating an ordered list of variants by sorting the set of variants;
      selecting a variant from the set of variants based on a position of the variant in the ordered list of variants; and
   developing, using at least one of the at least one processor and at least one other computer hardware, the system architecture using the selected variant.

2. The method of claim 1 wherein the developed system architecture comprises, for each kind of resource Ri in the plurality of kinds of resources R1 . . . Rn, the number Ni of said each kind of resource Ri is defined by the selected variant.

3. The method of claim 1 wherein the membership value assigned to each variant of the universe of discourse set is determined by a membership function based on the position of said each variant in the universe of discourse set, and an order of the first element and last element of the universe of discourse set.

4. The method of claim 3 wherein if the optimization parameter represents a time of execution constraint then the membership function is of the form:

$$\tau_X = \frac{x - \beta}{\alpha - \beta}$$

or else the membership function is of the form:

$$\tau_X = \frac{x - \alpha}{\beta - \alpha}$$

wherein x is a position of the variant in the universe of discourse set, $\tau_x$ is the assigned membership value of the variant that is in the xth position in the universe of discourse set, $\alpha$ and $\beta$ are an order of the first element and last element of the universe of discourse set, wherein $\alpha$ is 1 and $\beta$ is a total number of the variants in the universe of discourse set.

5. The method of claim 1 wherein the performing a fuzzy search comprises:
calculating an initial membership value, wherein the initial membership value is a function of a maximum value of the optimization parameter, a minimum value of the optimization parameter, and a value for the border variant based on the constraint value of the respective optimization parameter;
determining a closest variant from the variants of the universe of discourse set, wherein the closest variant is a variant having a membership value that is closest to the initial membership value;
calculating an optimization parameter value for the closest variant;
calculating a new initial membership value;
determining a new closest variant from the variants of the universe of discourse set, wherein the closest variant is a variant having a membership value that is closest to the calculated new initial membership value;
if the new closest variant has already been checked then determining an unchecked variant having a membership value that is a next membership value and set the new closest variant to be the unchecked variant;
calculating an optimization parameter value for the new closest variant;
determining if the border variant is found;
if the border variant is still not found then return back to the step of calculating a new initial membership value, else end.

6. The method of claim 5 wherein the initial membership value is calculated based on the following function:

$$\tau_{ini} = \frac{V_{Border} - \text{Min}}{\text{Max} - \text{Min}}$$

wherein $\tau_{ini}$ is the initial membership value, $V_{Border}$ is a constraint value of the respective optimization parameter, Min and Max are the minimum and maximum values for the respective optimization parameter.

7. The method of claim 6 further comprising:
determining a priority order by sorting the calculated priority factors based on a relative magnitude of the calculated priority factors; and
wherein the universe of discourse set is sorted based on the priority order for the respective optimization parameter.

8. The method of claim 7 wherein the Register Transfer Level data path circuit is configured to generate output data as a result of performing a sequence of operations on data using Register Transfer Level modules, wherein the Register Transfer Level modules include the number of each kind of resources represented by the selected variant.

9. The method of claim 6 wherein the design space is sorted to construct the universe of discourse set using a tree as follows:

for each optimization parameter, assign to the kind of resource R1, . . . Rn available to construct the system architecture with the highest priority factor a level one of the tree with all its variants as branch nodes, wherein level one refers to a root node of the tree, the kind of resource R1, . . . Rn available to construct the system architecture with the next highest priority factor a level two of the tree with all its variants as branch nodes the kind of resource R1, . . . Rn available to construct the system architecture with the lowest priority factor a level n of the with all the variants as leaf nodes such that the leaf nodes are level n+1.

10. The method of claim 9 wherein the Register Transfer Level modules are selected from the group consisting of registers for storage of data, memory modules, latches for sinking of data, multiplexers and demultiplexers.

11. The method of claim 6 wherein the final optimization parameter is a hardware area of a total number of all kinds of resources R1, . . . Rn, and wherein, for the hardware area, the priority factor function of each kind of resource R1, . . . Rn is an indicator of a change of area contributed by a change in the number of the kind of resource Ri, wherein $1 \leq i \leq n$.

12. The method of claim 6 wherein the plurality of optimization parameters comprise a time of execution of a total number of all kinds resources R1, . . . Rn, and wherein, for the time of execution, the priority factor function for each kind of resource R1, . . . Rn is a function of the rate of change of a cycle time with a change in the number $N_{Ri}$ of the kind of resources Ri at a maximum clock period, wherein $1 \leq i \leq n$ and Ri is a member of the kinds of resources R1, . . . Rn.

13. The method of claim 6 wherein the plurality of optimization parameters comprise a time of execution of a total number of all kinds resources R1, . . . Rn, and wherein, for the time of execution, the priority factor function for each kind of resource R1, . . . Rn is a function of a difference between the time of execution when resource Ri, wherein i is of the interval [1,n], is at its minimum value when all other resources are at their maximum value and the time of execution when resource Ri is at its maximum value when all other resources are at their minimum values.

14. The method of claim 13 wherein the priority factor function for the power consumption of the resources R1, . . . Rn that is not a clock oscillator is of the form:

$$PF(Ri) = \frac{\Delta N_{Ri} \cdot K_{Ri}}{N_{Ri}} (p_c)^{max}$$

and wherein, for the power consumption, the priority factor function of resource Ri that is a clock oscillator is of the form:

$$PF(Rclk) = \frac{N_{R1} \cdot T_{R1} + N_{R2} \cdot T_{R2} \ldots + N_{Rn} \cdot T_{Rn}}{N_{Rclk}} (\Delta p_c).$$

15. The method of claim 6 wherein the plurality of optimization parameters comprise a power consumption of the resources R1, . . . Rn, and wherein, for the power consumption, the priority factor function for each kind of resource R1, . . . Rn is a function of a change in power consumption per unit area due to deviation of clock frequency from maximum to minimum and a change in the number $N_{Ri}$ of the kind of resource Ri at maximum clock frequency, wherein $1 \leq i \leq n$, and Ri is a member of the kinds of resources R1, . . . Rn.

16. The method of claim 15 wherein, for the cost, the priority factor function for each kind of the resources R1, ... Rn that is not a clock oscillator is of the form:

$$PF(Ri) = \frac{\Delta N_{Ri} \cdot K_{Ri} \cdot C_{Ri}}{N_{Ri}}$$

and wherein, for the cost, the priority factor function of resource Ri that is a clock oscillator is of the form:

$$PF(R_{clk}) = \frac{A(R_{clk}) \cdot C_{Rclk}}{N_{Rclk}}.$$

17. The method of claim 6 wherein the plurality of optimization parameters comprise a total cost of the total number of all kinds resources R1, ... Rn, and wherein, for the total cost, the priority factor function for each kind of resource R1, ... Rn is an indicator of change in total cost of the total number of all kinds resources R1, ... Rn with respect to a change in the number of the kind of resource Ri and the cost per unit resource, wherein 1≤i≤n.

18. The method of claim 5 wherein if the optimization parameter value for the closest variant is less than the constraint value of the respective optimization parameter then the new initial membership value is calculated using a function of the form:

$$\frac{\tau_{Max} - \tau_V}{\tau_B - \tau_V} = \frac{\text{Max} - V_{Variant}}{V_{Border} - V_{Variant}}$$

or else the new initial membership value is calculated using a function of the form:

$$\frac{\tau_{Min} - \tau_V}{\tau_B - \tau_V} = \frac{\text{Min} - V_{Variant}}{V_{Border} - V_{Variant}}$$

wherein $\tau_{Max}$ is the assigned membership value of the variant that is in the maximum position in the universe of discourse set, $\tau_{Min}$ is the assigned membership value of the variant that is the minimum position in the universe of discourse set, $\tau_V$ is the assigned membership value of the variant in the sorted universe of discourse, $\tau_B$ is the calculated new initial membership value, $V_{Border}$ is the constraint value of the respective optimization parameter, $V_{Variant}$ is the optimization parameter value and Max is the maximum value for the respective optimization parameter.

19. The method of claim 18 further comprising selecting the selected variant using the priority order for the final optimization parameter.

20. The method of claim 19 wherein the Register Transfer Level control timing sequence provides a control configuration for a data path circuit to provide timing and synchronization required by data traversing through the Register Transfer Level modules of the data path circuit.

21. The method of claim 20 wherein, for the hardware area, the priority factor for each kind of resource R1, ... Rn that is not a clock oscillator is of the form:

$$PF(Ri) = \frac{\Delta N_{Ri} \cdot K_{Ri}}{N_{Ri}}$$

and wherein, for the hardware area, the priority factor function of resource Ri that is a clock oscillator is of the form:

$$\frac{\Delta A(R_{clk})}{N_{Rclk}}.$$

22. The method of claim 21 wherein the priority factor function for the time of execution of the resources R1, ... Rn that is not a clock oscillator is of the form:

$$PF(R_i) = \frac{\Delta N_{Ri} T_{Ri}}{N_{Ri}} (T_p^{max})$$

and wherein, for the time of execution, the priority factor function of resource Ri that is a clock oscillator is of the form:

$$PF(R_{clk}) = \frac{N_{R1} \cdot T_{R1} + N_{R2} \cdot T_{R2} \ldots + N_{Rn} \cdot T_{Rn}}{N_{Rclk}} (\Delta T_p).$$

23. The method of claim 22 wherein the priority factor function for the time of execution of the resources R1, ... Rn that is not a clock oscillator is of the form:

$$PF(Rn) = \frac{T_{Rn}^{Max} - T_{Rn}^{Min}}{N_{Rn}}$$

and wherein, for the time of execution, the priority factor function of resource Ri that is a clock oscillator is of the form:

$$PF(Rclk) = \frac{T_{Rclk}^{Max} - T_{Rclk}^{Min}}{N_{Rclk}}.$$

24. The method of claim 23 wherein, for the cost, the priority factor function for each kind of the resources R1, ... Rn that is not a clock oscillator is calculated by $N_{Ri}$, $K_{Ri}$, $\Delta N_{Ri}$, $C_{Ri}$, wherein $N_{Ri}$ is the number of the kind of resource Ri, $K_{Ri}$ is an area occupied by the kind of resource Ri, $\Delta N_{Ri} \bullet K_{Ri}$ is a change of area contributed by the kind of resource Ri, $C_{Ri}$ is the cost per area unit of the kind of resource Ri; and
wherein, for the cost, the priority factor function of resource Ri that is a clock oscillator is calculated by $R_{clk}$, $N_{Rclk}$, $\Delta A(R_{clk})$, $C_{Rclk}$, wherein $R_{clk}$ is a clock oscillator used to provide necessary clock frequency to the system, $\Delta A(R_{clk})$ is a change of area occupied by clock oscillators, $N_{Rclk}$ is a total number of clock oscillators available to construct the system architecture, $C_{Rclk}$, is the cost per area unit of clock oscillators.

25. The method of claim 22 wherein the priority factor function for the power consumption of the resources R1, ... Rn that is not a clock oscillator is calculated by $N_{Ri}$, $K_{Rn}$, $\Delta N_{Ri}$, $(p_c)^{max}$, $p_c$ wherein $N_{Ri}$ is the number of resource Ri, $K_{Rn}$ is an area occupied by resource Ri, $\Delta N_R \bullet K_{Rn}$ is a change of area contributed by resource Ri, $p_c$ is power consumed per area unit resource at a particular frequency of operation, $(p_c)^{max}$ is power consumed per area unit resource at a maximum clock frequency; and wherein, for the power consumption, the priority factor function of resource Ri that is a clock oscillator is calculated by $N_{Ri}$, $T_{Ri}$, $R_{clk}$, $N_{Rclk}$, $p_c$ where $R_{clk}$ is a clock oscillator used to provide necessary clock frequency to the system, $N_{Ri}$ is the number of the kind of resource Ri, $T_{Rn}$ a number of clock cycles required by resource Ri to finish each operation, $p_c$ is power consumed per area unit of resource at a particular frequency of operation.

26. The method of claim 21 further comprising producing a Register Transfer Level data path circuit using the multiplexing scheme.

27. The method of claim 1 further comprising:
for each of the plurality of optimization parameters:
defining a priority factor function for each kind of resource R1, . . . Rn, wherein a priority factor function defines a rate of change of the optimization parameter with respect to a change in a number $N_{Ri}$ of the corresponding kind of resource Ri, $1 \le i \le n$;
calculate a priority factor for each kind of resource R1, . . . Rn available to construct the system architecture, using the corresponding priority factor function for the respective optimization parameter; and
wherein the universe of discourse set is generated by sorting the variants of the design space based on a relative magnitude of the calculated priority factors.

28. The method of claim 1 wherein the system architecture comprises a Register Transfer Level data path circuit.

29. The method of claim 1 wherein the system architecture comprises a Register Transfer Level control timing sequence.

30. The method of claim 1 wherein the kinds of resources R1, . . . Rn are selected from the group consisting of adders, subtractors, clock oscillators, multipliers, divider, comparator, Arithmetic Logic Unit (ALU), integrator, summer and other functional modules.

31. The method of claim 1 wherein the optimization parameters are selected from the group consisting of hardware area, cost, time of execution, and power consumption.

32. The method of claim 31 wherein, for the hardware area, the priority factor for each kind of resource R1, . . . Rn that is not a clock oscillator is calculated from $N_{Ri}$, $\Delta N_{Ri}$, $K_{Ri}$, wherein $N_{Ri}$ is the number of the kind of resource Ri, $K_{Ri}$ is an area occupied by the kind of resource Ri, $\Delta N_{Ri} \bullet K_{Ri}$ is a change of area contributed by the kind of resource Ri, wherein Ri is a member of the kinds of resources R1, . . . Rn; and wherein, for the hardware area, the priority factor function of resource Ri that is a clock oscillator is calculated from $\Delta A(R_{clk})$, $N_{Rclk}$, $R_{clk}$, wherein $R_{clk}$ is a clock oscillator used to construct the system architecture, $\Delta A(R_{clk})$ is a change of area occupied by clock oscillators, $N_{Rclk}$ is a number of clock oscillators.

33. The method of claim 32 wherein the priority factor function for the time of execution of the resources R1, . . . Rn that is not a clock oscillator is calculated by $N_{Ri}$, $T_{Ri}$, $T_p^{max}$, wherein $N_{Ri}$ is the number of the kind of resource Ri, $T_{Ri}$ a number of clock cycles required by the kind of resource Ri to finish each operation, $T_p$ is the time period of the clock, $T_p^{max}$ the maximum clock period; and wherein, for the time of execution, the priority factor function of resource Ri that is a clock oscillator is calculated by $R_{clk}$, $N_{Ri}$, $T_{Ri}$, $R_{clk}$, $N_{Rclk}$, where $R_{clk}$ is a clock oscillator used to provide necessary clock frequency to the system, $N_{Ri}$ is the number of the kind of resource Ri, $N_{Rclk}$ is the number of clock oscillators, $T_{Ri}$ a number of clock cycles required by the kind of resource Ri to finish each operation.

34. The method of claim 33 wherein the priority factor function for the time of execution of the resources R1, . . . Rn that is not a clock oscillator is calculated by $N_{Ri}$, $T_{Rn}^{Max}$, $T_{Rn}^{Min}$ wherein $N_{Ri}$ is the number of the kind of resource Ri, $T_{Rn}^{Max}$ and $T_{Rn}^{Min}$ are the maximum and minimum value of the execution time when resource Rn is maximum and minimum, respectively, at maximum clock frequency all other resources being maximum wherein, for the time of execution, the priority factor function of resource Ri that is a clock oscillator is calculated by $N_{Rclk}$, $T_{Rclk}^{Max}$, $T_{Rclk}^{Min}$ where $N_{Rclk}$ is the number of clock oscillators $T_{Rclk}^{Max}$ and $T_{Rclk}^{Min}$ are maximum and minimum values of execution time when the clock period is maximum and minimum respectively, and all available resources have a maximum value.

35. The method of claim 32 further comprising determining a multiplexing scheme for the resources R1, . . . Rn of the selected variant, with inputs, outputs, operations, interconnections and time steps.

36. The method of claim 1 further comprising, for each optimization parameter, determining the satisfying set of variants from the universe of discourse set using the border variant.

37. The method of claim 1 further comprising, for each of the plurality of optimization parameters, determining whether the constraint value for the optimization parameter is valid by:
determining a minimum value for the optimization parameter;
determining a maximum value for the optimization parameter;
determining whether the constraint value is greater than or equal to the minimum value for the optimization parameter and whether the constraint value is less than or equal to the maximum value for the optimization parameter;
if the constraint value is greater than or equal to the minimum value for the optimization parameter and the constraint value is less than equal than or equal to the maximum value for the optimization parameter, determining that the constraint value is valid; and
otherwise, determining that the constraint value is invalid and prompting for correction.

38. The method of claim 1 further comprising determining whether the set of variants is valid by determining whether the set of variants is null; and upon determining that the set of variants is not valid, relaxing the constraint values for each optimization parameter by predetermined percentage.

39. The method of claim 1 further comprising representing the combination of the number of resources R1, . . . Rn of the selected variant in a temporal and a spatial domain using a sequencing and binding graph and a plurality of registers.

40. The method of claim 1 further comprising producing an integrated circuit using the system architecture.

41. The method of claim 1 wherein the set of variants based on the intersection of the satisfying sets of variants is a pareto set of variants.

42. A non-transitory computer-readable storage medium comprising instructions for execution on a computing device, wherein the instructions, when executed, perform acts of a method of developing a system architecture, wherein the method comprises:
defining a plurality of resources constraints max $N_{R1}$, . . . max $N_{Rn}$, for a plurality of kinds of resources R1 . . . Rn, wherein each resource constraint max $N_{Ri}$ is a maximum number of a kind of resources Ri available to construct the system architecture, wherein $1 \leq i \leq n$ and n is an integer greater than 1;

defining a plurality of constraint values comprising a constraint value for each optimization parameter of at least three optimization parameters for the system architecture, wherein the at least three optimization parameters comprise a final optimization parameter;

defining a design space as a plurality of variants representing different combinations of a number of each kind of resource R1, . . . Rn available to construct the system architecture, wherein each variant is a vector of the form:

$$V_n = (N_{R1}, \ldots N_{Rn})$$

wherein $N_{Ri}$ $1 \leq i \leq n$ represents the number of the kind of resource Ri, wherein based on the resource constraints, $1 \leq N_{Ri} \leq \max N_{Ri}$;

determining a plurality of satisfying sets of variants by, for each of the optimization parameters except for the final optimization parameter:

generating a universe of discourse set by sorting the plurality of variants of the design space;

assigning a membership value to each variant of the universe of discourse set, wherein each membership value is within an interval [0,1], wherein, for each respective variant of the universe of discourse set, the membership value assigned to said each respective variant indicates a position of said each respective variant in the universe of discourse set;

determining a satisfying set of variants from the universe of discourse set by determining a border variant of the universe of discourse set, wherein each variant of the satisfying set substantially satisfies the constraint value for the optimization parameter, wherein the border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter, and wherein the border variant is determined by performing a fuzzy search of the universe of discourse set using the corresponding membership values;

determining a set of variants based on an intersection of the plurality of satisfying sets of variants for the optimization parameters except the final optimization parameter;

for the final optimization parameter:

generating an ordered list of variants by sorting the set of variants;

selecting a variant from the set of variants based on a position of the variant in the ordered list of variants; and developing the system architecture using the selected variant.

43. A system of developing a system architecture comprising:

a resource constraint module defining a plurality of resources constraints max $N_{R1}$, max $N_{Rn}$, for a plurality of kinds of resources R1 . . . Rn, wherein each resource constraint $\max N_{Ri}$ is a maximum number of a kind of resource Ri available to construct the system architecture, wherein $1 \leq i \leq n$ and n is an integer greater than 1;

an optimization parameter constraint module for defining a plurality of constraint values comprising a constraint value for each optimization parameter of at least three optimization parameters for the system architecture, wherein the at least three optimization parameters comprise a final optimization parameter;

a design space module for defining a design space as a plurality of variants representing different combinations of a number of each kind of resource R1, . . . Rn available to construct the system architecture, wherein each variant is a vector of the form:

$$V_n = (N_{R1}, \ldots N_{Rn})$$

wherein $N_{Ri}$ $1 \leq i \leq n$ represents the number of the kind of resource Ri, wherein based on the resource constraints, $1 \leq N_{Ri} \leq \max N_{Ri}$;

a satisfying set module for determining a plurality of satisfying sets of variants by, for each of the optimization parameters except for the final optimization parameter:

generating a universe of discourse set by sorting the plurality of variants of the design space;

assigning a membership value to each variant of the universe of discourse set, wherein each membership value is within an interval [0,1], wherein, for each respective variant of the universe of discourse set, the membership value assigned to said each respective variant indicates a position of said each respective variant in the universe of discourse set;

determining a satisfying set of variants from the universe of discourse set by determining a border variant of the universe of discourse set, wherein each variant of the satisfying set substantially satisfies the constraint value for the optimization parameter, wherein the border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter, and wherein the satisfying set module interacts with a fuzzy search module for determining the border variant by performing a fuzzy search of the universe of discourse set using the corresponding membership values;

an intersection module for determining a set of variants based on an intersection of the plurality of satisfying sets of variants for the optimization parameters except the final optimization parameter;

a selection module for selecting a variant for use in developing the system architecture by, for the final optimization parameter:

generating an ordered list of variants by sorting the set of variants;

selecting a variant from the set of variants based on the ordered list of variants; and a system architecture module for developing the system architecture using the selected variant.

44. A computer implemented method of determining a variant representing a combination of a number of each kind of resource R1, . . . Rn available for constructing a system architecture, performed by at least one processor of at least one computing device, comprising:

defining, by the at least one processor, a plurality of resources constraints max $N_{R1}$, max $N_{Rn}$, for a plurality of kinds of resources R1 . . . Rn, wherein each resource constraint $\max N_{Ri}$ is a maximum number of a kind of resource Ri available to construct the system architecture, wherein $1 \leq i \leq n$ and n is an integer greater than 1;

defining, by the at least one processor, a plurality of constraint values comprising a constraint value for each optimization parameter of at least three optimization parameters for the system architecture, wherein the at least three optimization parameters comprise a final optimization parameter;

defining, by the at least one processor, a design space as a plurality of variants representing different combinations of a number of each kind of resource R1, . . . Rn available to construct the system architecture, wherein each variant is a vector of the form:

$$V_n = (N_{R1}, \ldots N_{Rn})$$

wherein $N_{Ri}$ $1 \leq i \leq n$ represents the number of the kind of resource Ri, wherein based on the resource constraints, $1 \leq N_{Ri} \leq \max N_{Ri}$;

determining, by the at least one processor, a plurality of satisfying sets of variants by, for each of the optimization parameters except for the final optimization parameter:

generating a universe of discourse set by sorting the plurality of variants of the design space;

assigning a membership value to each variant of the universe of discourse set, wherein each membership value is within an interval [0,1], wherein for each respective variant of the universe of discourse set, the membership value assigned to said each respective variant indicates a position of said each respective variant in the universe of discourse set;

determining a satisfying set of variants from the universe of discourse set by determining a border variant of the universe of discourse set, wherein each variant of the satisfying set substantially satisfies the constraint value for the optimization parameter, wherein the border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter, and wherein the border variant is determined by performing a fuzzy search of the universe of discourse set using the corresponding membership values;

determining, using at least one of the at least one processor and at least one other computer hardware, a set of variants based on an intersection of the plurality of satisfying sets of variants for the optimization parameters except the final optimization parameter;

for the final optimization parameter:
generating an ordered list of variants by sorting the set of variants; and
selecting a variant from the set of variants based on a position of the variant in the ordered list of variants.

45. A method of developing a system architecture, performed by at least one processor of at least one computing device, comprising:

defining, by the at least one processor, a plurality of resources constraints max $N_{R1}$, . . . max $N_{Rn}$, for a plurality of kinds of resources R1 . . . Rn, wherein each resource constraint $\max N_{Ri}$ is a maximum number of a kind of resource Ri available to construct the system architecture, wherein $1 \leq i \leq n$ and n is an integer greater than 1;

defining, by the at least one processor, a plurality of constraint values comprising a constraint value for each optimization parameter of at least three optimization parameters for the system architecture, wherein the at least three optimization parameters comprise a final optimization parameter;

defining, by the at least one processor, a design space as a plurality of variants representing different combinations of a number of each kind of resource R1, . . . Rn available to construct the system architecture, wherein each variant is a vector of the form:

$$V_n = (N_{R1}, \ldots N_{Rn})$$

wherein $N_{Ri}$ $1 \leq i \leq n$ represents the number of the kind of resource Ri, wherein based on the resource constraints, $1 \leq N_{Ri} \leq \max N_{Ri}$;

determining, by the at least one processor, a plurality of satisfying sets of variants by, for each of the optimization parameters except for the final optimization parameter:

generating, by the at least one processor, a universe of discourse set by sorting the plurality of variants of the design space;

determining, by the at least one processor, a satisfying set of variants from the universe of discourse set by determining a border variant of the universe of discourse set, wherein each variant of the satisfying set substantially satisfies the constraint value for the optimization parameter, wherein the border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter;

determining, by the at least one processor, a set of variants based on an intersection of the plurality of satisfying sets of variants for the optimization parameters except the final optimization parameter;

for the final optimization parameter:
generating an ordered list of variants by sorting the set of variants;
selecting a variant from the set of variants based on a position of the variant in the ordered list of variants; and developing, using at least one of the at least one processor and at least one other computer hardware, the system architecture using the selected variant;

wherein the design space is sorted to construct the universe of discourse set using a tree having n+1 level of nodes as follows:

for each optimization parameter, assigning to each kind of resource R1, . . . Rn available to construct the system architecture a level 1 to n of the tree based on the relative magnitude of its priority factor, wherein level 1 is a root node in the tree;

a level one of the tree with all its variants as branches, wherein level one refers to a root node of the tree, the kind of resource R1, . . . Rn available to construct the system architecture with the next highest priority factor a level two of nodes of the tree with all its variants as branches the kind of resource R1, . . . Rn available to construct the system architecture with the lowest priority factor a level n of nodes of the tree with all the variants as branches; and generating a tree structure by representing the kind of resource Ri assigned level i 1≤i≤n as one or more nodes in the tree based on the number of branches from the one or more nodes of the level i−1 except for level one which is a root node, wherein each node in level i has a number of branches maxN$_{Ri}$ and representing all variants of the design space as leaf nodes at a level n+1 of the tree, each leaf node connected by a branch to a node of the level n of the tree, wherein each variant corresponds to a path from the root node at level one of the tree to the leaf node representing that variant at level n+1 of the tree.

46. A method of developing a system architecture, performed by at least one processor of at least one computing device, comprising:

defining, by the at least one processor, a plurality of resources constraints max N$_{R1}$, . . . max N$_{Rn}$, for a plurality of kinds of resources R1 . . . Rn, wherein each resource constraint maxN$_{Ri}$ is a maximum number of a kind of resources Ri available to construct the system architecture, wherein 1≤i≤n and n is an integer greater than 1;

defining, by the at least one processor, a plurality of constraint values comprising a constraint value for each optimization parameter of at least three optimization parameters for the system architecture, wherein the at least three optimization parameters comprise a final optimization parameter;

defining, by the at least one processor, a design space as a plurality of variants representing different combinations of a number of each kind of resource R1, . . . Rn available to construct the system architecture, wherein each variant is a vector of the form:

$$V_n = (N_{R1}, \ldots N_{Rn})$$

wherein N$_{Ri}$ 1≤i≤n represents the number of the kind of resource Ri, wherein based on the resource constraints, 1≤N$_{Ri}$≤max N$_{Ri}$;

determining, by the at least one processor, a plurality of satisfying sets of variants by, for each of the optimization parameters:

generating a universe of discourse set by sorting the plurality of variants of the design space;

assigning a membership value to each variant of the universe of discourse set, wherein each membership value is within an interval [0,1], wherein, for each respective variant of the universe of discourse set, the membership value assigned to said each respective variant indicates a position of said each respective variant in the universe of discourse set;

determining a satisfying set of variants from the universe of discourse set by determining a border variant of the universe of discourse set, wherein each variant of the satisfying set substantially satisfies the constraint value for the optimization parameter, wherein the border variant is the last variant of the universe of discourse set to satisfy the constraint value for the optimization parameter such that all variants to one side of the border variant in the universe of discourse set satisfy the constraint value for the optimization parameter and all variants to the other side of the border variant in the universe of discourse set do not satisfy the constraint value for the optimization parameter, and wherein the border variant is determined by performing a fuzzy search of the universe of discourse set using the corresponding membership values;

determining, by the at least one processor, a set of variants based on an intersection of the plurality of satisfying sets of variants for the optimization parameters;

generating, by the at least one processor, an ordered list of variants by sorting the set of variants;

selecting, by the at least one processor, a variant from the set of variants based on a position of the variant in the ordered list of variants; and developing, using at least one of the at least one processor and at least one other computer hardware, the system architecture using the selected variant.

* * * * *